United States Patent
Sasaki et al.

(10) Patent No.: US 9,025,941 B2
(45) Date of Patent: *May 5, 2015

(54) DATA CREATION DEVICE AND PLAYBACK DEVICE FOR VIDEO PICTURE IN VIDEO STREAM

(75) Inventors: Taiji Sasaki, Osaka (JP); Hiroshi Yahata, Osaka (JP); Tomoki Ogawa, Osaka (JP); Tadamasa Toma, Osaka (JP)

(73) Assignee: Panasonic Intellectual Property Management Co., Ltd, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/983,657

(22) PCT Filed: Feb. 10, 2012

(86) PCT No.: PCT/JP2012/000899
§ 371 (c)(1),
(2), (4) Date: Aug. 5, 2013

(87) PCT Pub. No.: WO2012/108210
PCT Pub. Date: Aug. 16, 2012

(65) Prior Publication Data
US 2013/0315573 A1    Nov. 28, 2013

Related U.S. Application Data

(60) Provisional application No. 61/441,383, filed on Feb. 10, 2011.

(51) Int. Cl.
*H04N 13/00* (2006.01)
*H04N 19/597* (2014.01)
(Continued)

(52) U.S. Cl.
CPC ......... *H04N 13/0048* (2013.01); *H04N 19/597* (2014.11); *H04N 19/70* (2014.11); *H04N 19/30* (2014.11); *H04N 19/59* (2014.11); *H04N 19/577* (2014.11)

(58) Field of Classification Search
None
See application file for complete search history.

(56) References Cited

U.S. PATENT DOCUMENTS

2002/0034248 A1* 3/2002 Chen .................. 375/240.08
2004/0057457 A1* 3/2004 Ahn et al. ................ 370/466
(Continued)

FOREIGN PATENT DOCUMENTS

EP    2 357 842    8/2011
JP    2004-40455    2/2004
(Continued)

OTHER PUBLICATIONS

International Search Report issued May 1, 2012 in corresponding International Application No. PCT/JP2012/000899.
(Continued)

*Primary Examiner* — Hung Dang
*Assistant Examiner* — Sunghyoun Park
(74) *Attorney, Agent, or Firm* — Wenderoth, Lind & Ponack, L.L.P.

(57) ABSTRACT

A data creation device performing compression encoding on first frame images showing a view from a first viewpoint and second frame images showing a view from a second viewpoint generates a stream in an MPEG-2 format, and base-view/dependent-view video streams in a format conforming to an MPEG-4 MVC format. The stream in the MPEG-2 format is generated by performing compression encoding on the first frame images. The base-view video stream is a stream of dummy data having the same number of frames as and a smaller data amount than the stream in the MPEG-2 format. The dependent-view video stream is obtained by performing compression encoding on each frame of the second frame images, with reference to a frame of the stream in the MPEG-2 format to be presented at the same time as a frame of the base-view video stream corresponding to the frame of the second frame images.

17 Claims, 45 Drawing Sheets

(51) Int. Cl.
*H04N 19/70* (2014.01)
*H04N 19/30* (2014.01)
*H04N 19/59* (2014.01)
*H04N 19/577* (2014.01)

(56) References Cited

U.S. PATENT DOCUMENTS

2006/0171463 A1* 8/2006 Hanamura et al. ....... 375/240.13
2008/0089596 A1* 4/2008 Choi et al. .................... 382/238
2010/0260484 A1* 10/2010 Hattori .......................... 386/108

FOREIGN PATENT DOCUMENTS

| JP | 2008-500790 | 1/2008 |
| WO | 2005/114998 | 12/2005 |
| WO | 2010/067810 | 6/2010 |

OTHER PUBLICATIONS

Information Technology—Coding of audio-visual objects—Part 10: Advanced Video Coding, International Standard, ISO/IEC 14496-10, Second Edition, Oct. 1, 2004.

* cited by examiner

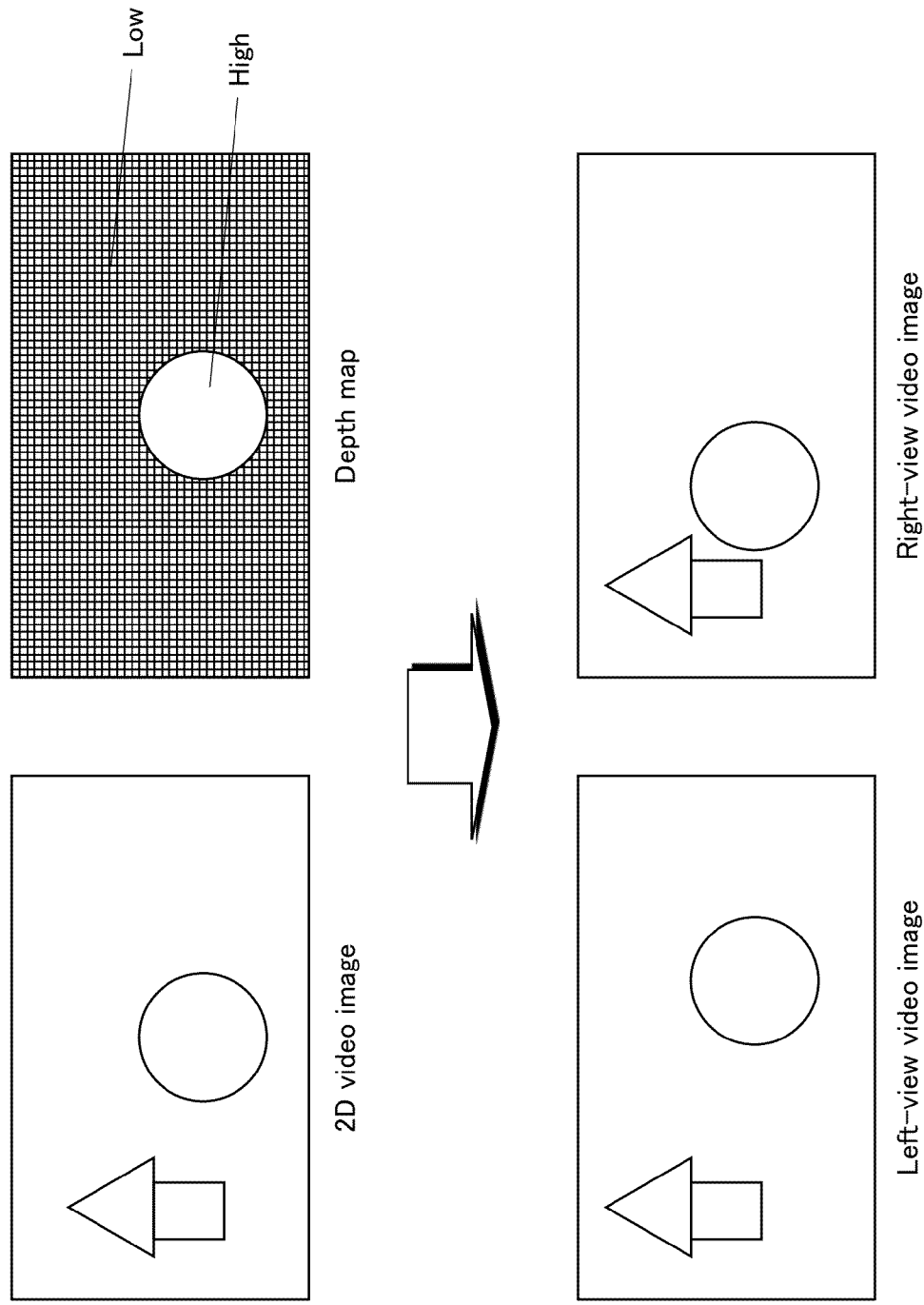

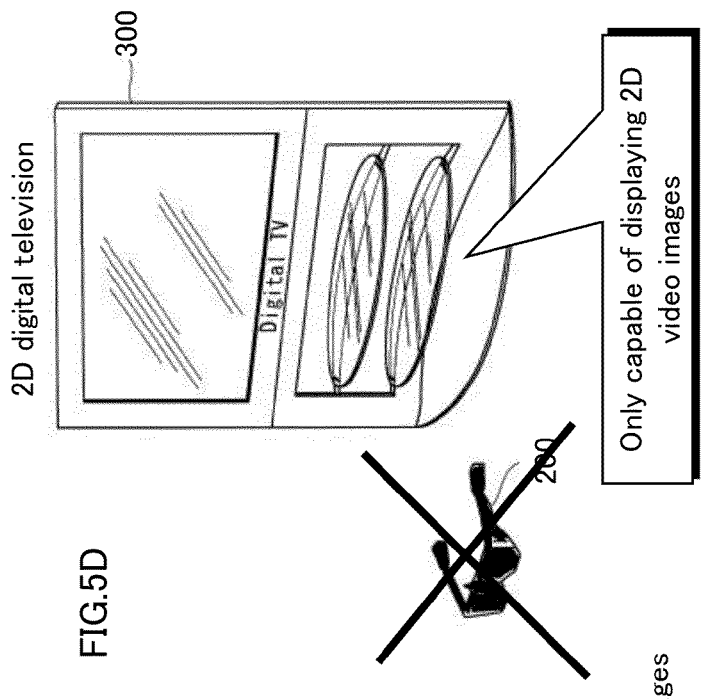
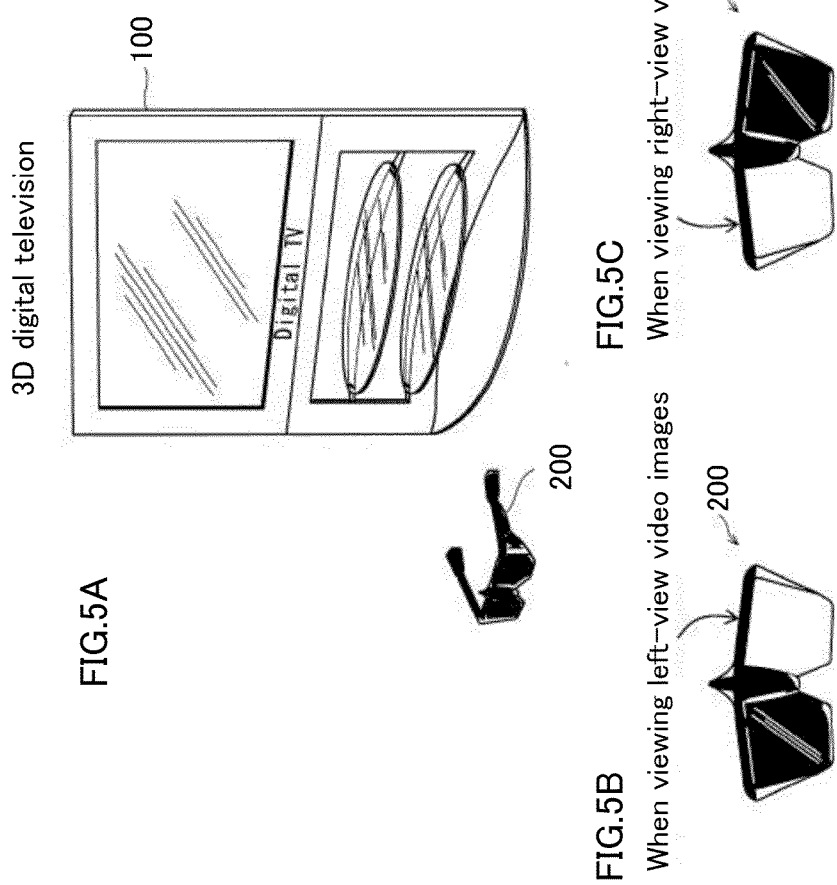
FIG.5A 3D digital television
FIG.5B When viewing left-view video images
FIG.5C When viewing right-view video images
FIG.5D 2D digital television — Only capable of displaying 2D video images FIG. 20
Access unit at top of GOP
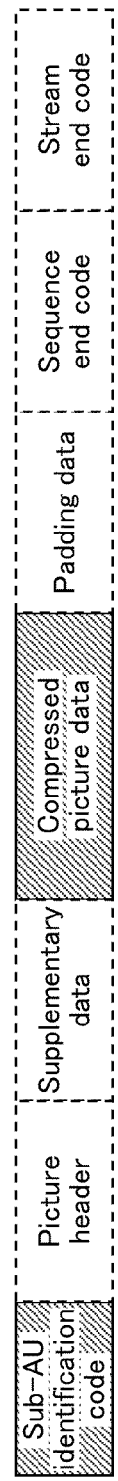
Access unit other than at top of GOP

FIG. 22

Specific example of video attributes to be made identical between the 2D compatible video stream and the base-view/dependent-view video stream, as well as fields indicating these attributes.

| Video attributes to be made identical | Specific example of fields indicating video attributes | |
|---|---|---|
| | 2D compatible video stream (MPEG-2) | Base-view/dependent-view video stream (MPEG-4 MVC) |
| Resolution | horizontal_size_value, vertical_size_value, | pic_width_in_mbs_minus1, pic_height_in_map_units_minus1 |
| Aspect ratio | aspect_ratio_information | aspect_ratio_idc |
| Frame rate | frame_rate_value | time_scale/num_units_in_tick/2 |
| Interlaced or progressive | progressive_sequence | frame_mbs_only_flag |

FIG. 37

3D information descriptor

| Field name | Meaning |
|---|---|
| Playback format | Signals the playback method<br>0: 2D video image playback from 2D compatible video<br>1: 3D video image playback from 2D compatible video and dependent-view video<br>2: 3D video image playback from base-view video and dependent-view video<br>3: 3D video image playback by doubling |
| Left-view video image type | Type of video stream of left-view video images during 3D video image playback<br>0: 2D compatible video<br>1: Base-view video<br>2: Dependent-view video |
| 2D compatible video PID | PID of TS packets in which 2D compatible video stream is stored |
| Base-view video PID | PID of TS packets in which base-view video stream is stored |
| Dependent-view video PID | PID of TS packets in which dependent-view video stream is stored |

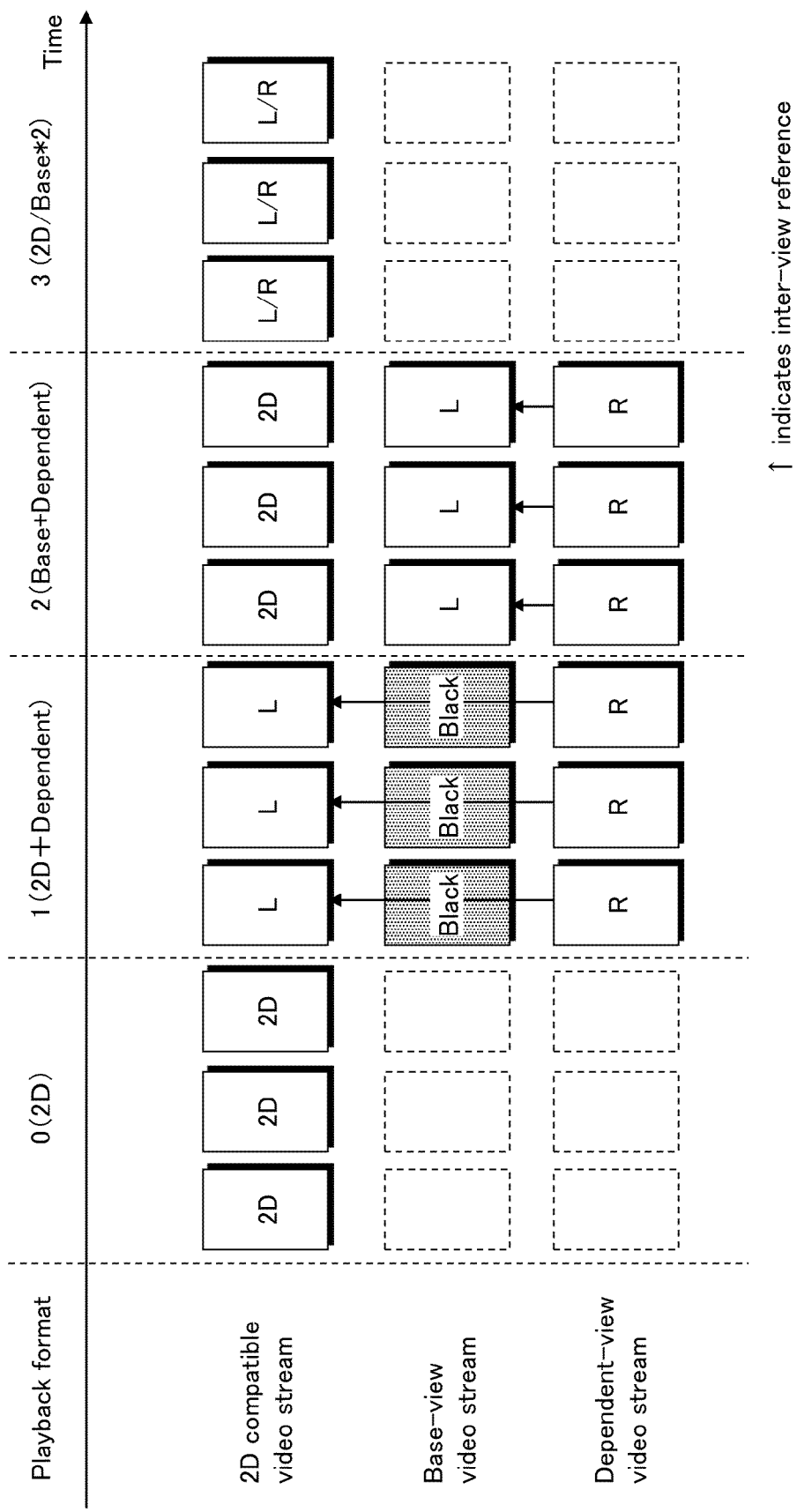

FIG. 39

3D stream descriptor

| Field name | Meaning |
|---|---|
| Base-view video type | Indicates type of video images included in base-view video stream<br>0: Video storing one half of 3D video images<br>1: Dummy video to be replaced by 2D compatible video |
| Reference target type | Reference target of dependent view<br>0: Refers to base view<br>1: Refers to 2D compatible video |
| Referenced type | Indicates whether the video stream is referred to during inter-view reference<br>0: Referred to<br>1: Not referred to | though dal# DATA CREATION DEVICE AND PLAYBACK DEVICE FOR VIDEO PICTURE IN VIDEO STREAM This application is the National Stage of International Application No. PCT/JP2012/000899, filed Feb. 10, 2012, which claims the benefit of U.S. Provisional Application No. 61/441,383, filed Feb. 10, 2011.

TECHNICAL FIELD

The present invention relates to encoding technology for recording or transmitting video images and decoding technology for playing back the video images, and in particular to a data creation device and a playback device for 3D video images.

BACKGROUND ART

One example of a method for performing compression encoding on 3D video images is MPEG-4 MVC (Multi-view Video Coding), which is the revised MPEG-4 AVC/H.264 standard (Non-Patent Literature 1). Using the compression encoding method in the MPEG-4 MVC format allows for creation of video streams for 3D video images with a high compression rate.

Video streams in the MPEG-2 format are currently used in digital television broadcasting in Japan and the United States of America. In order to provide 3D video images in digital television broadcasting while ensuring playback of 2D video images in existing playback devices, one option is to deliver video streams in the MPEG-4 MVC format in addition to video streams in the MPEG-2 format, for example.

CITATION LIST

Non-Patent Literature

Non-Patent Literature 1

"MPEG-4 Part 10 Advanced Video Coding", ISO/IEC, 14496-10, 2003

SUMMARY OF INVENTION

Technical Problem

The amount of data, however, increases when the video streams in the MPEG-4 MVC format are delivered in addition to the video streams in the MPEG-2 format, leading to an increase in bandwidth occupied by video streams as a whole. The bandwidth available for broadcast waves is limited. In order for the broadcast waves to fall within the available bandwidth, the amount of data for video streams as a whole is required to be reduced.

The present invention has been conceived in view of the above-mentioned problem, and aims to provide a data creation device for creating video streams for 3D video images with a reduced data amount while ensuring playback in existing playback devices supporting video streams in the MPEG-2 format, and a playback device for playing back such video streams.

Solution to Problem

In order to solve the above-mentioned problem, a data creation device pertaining to the present invention is a data creation device that performs compression encoding on first frame images chronologically showing a view from a first viewpoint and second frame images chronologically showing a view from a second viewpoint, including: a first encoding unit configured to generate a stream in an MPEG-2 format by performing compression encoding on the first frame images; a second encoding unit configured to generate a base-view video stream and a dependent-view video stream in a format conforming to an MPEG-4 MVC format; and a transmission unit configured to transmit the stream in the MPEG-2 format, the base-view video stream, and the dependent-view video stream, wherein the second encoding unit generates, for use as the base-view video stream, a stream of dummy data having the same number of frames as the stream in the MPEG-2 format and having a smaller total data amount than the stream in the MPEG-2 format, and generates, for use as the dependent-view video stream, a stream obtained by performing compression encoding on each frame of the second frame images, with reference to a frame of the stream in the MPEG-2 format to be presented at the same time as a frame of the base-view video stream corresponding to the frame of the second frame images.

A playback device pertaining to the present invention includes: an acquisition unit configured to acquire, from the data creation device, the stream in the MPEG-2 format, the base-view video stream, and the dependent-view video stream; a first decoding unit configured to acquire the first frame images by decoding the stream in the MPEG-2 format; a second decoding unit configured to acquire the second frame images by decoding the base-view video stream, and by decoding each frame of the dependent-view video stream with reference to a frame of the stream in the MPEG-2 format to be presented at the same time as a frame of the base-view video stream corresponding to the frame of the dependent-view video stream; and a playback unit configured to play back the acquired first frame images and second frame images.

Advantageous Effects of Invention

With the above-mentioned structure, the data creation device pertaining to the present invention creates video streams for 3D video images with a reduced data amount while ensuring playback in existing playback devices supporting video streams in the MPEG-2 format.

The playback device pertaining to the present invention can play back the above-mentioned video streams for 3D video images.

BRIEF DESCRIPTION OF DRAWINGS

FIG. 4 is a conceptual diagram showing an example of generating parallax images consisting of a left-view image and a right-view image from a 2D video image and a depth map.

FIGS. 5A to 5D illustrate use of a playback device.

FIG. 20 illustrates the structure of the video access unit included in a dependent GOP.

FIG. 22 shows video attributes that are made identical, as well as names of fields for the video attributes, in Embodiment 1 when a compression encoding method used is MPEG-2 video for the 2D compatible video stream and MPEG-4 MVC for the multi-view video stream.

FIG. 37 illustrates the structure of a 3D information descriptor.

FIG. 38 illustrates the playback format in the 3D information descriptor.

FIG. 39 illustrates the structure of a 3D stream descriptor.

DESCRIPTION OF EMBODIMENTS

<1. Embodiment 1>
<1-1. Overview>

A broadcast system pertaining to Embodiment 1 of the present invention generates, as 2D video images, streams in the MPEG-2 format, which is the conventional technology, and, as 3D video images, base-view video streams and dependent-view video streams in a new format (referred to as a format conforming to the MPEG-4 MVC format in the present description) obtained by extending the MPEG-4 MVC format, and transmits these streams.

At a receiving end, a 2D playback unit included in the playback device decodes the streams in the MPEG-2 format by using a conventional decoding method for playback, and a 3D playback unit included in the playback device decodes the base-view video streams and the dependent-view video streams in the format conforming to the MPEG-4 MVC format by using a decoding method supporting the new encoding method for playback.

Figure 21:
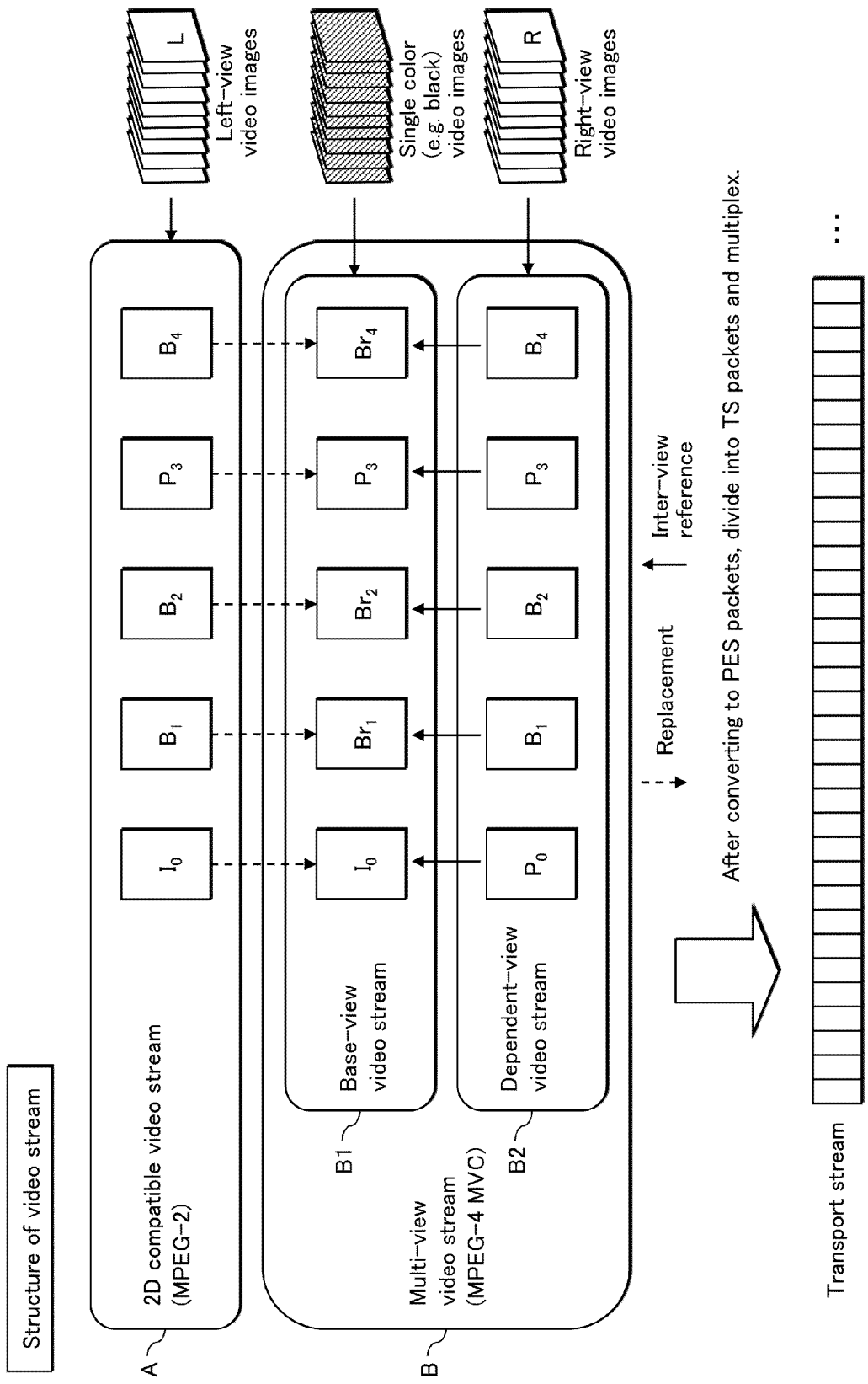
FIG. 21 illustrates the data structure of the transport stream.

FIG. 21 illustrates the data structure of a transport stream generated by the broadcast system pertaining to Embodiment 1. As illustrated in FIG. 21, the transport stream includes a 2D compatible video stream A and a multi-view video stream B. The multi-view video stream B includes a base-view video stream B1 and a dependent-view video stream B2.

The 2D compatible video stream A is generated by performing compression encoding on left-view images, and the base-view video stream B1 is generated by performing compression encoding on images of a single color, such as black, (hereinafter, referred to as "black images").

Furthermore, the dependent-view video stream B2 is generated by performing compression encoding on the difference between the left-view images and right-view images. The base-view video stream B1 cannot be used as reference images for generating the dependent-view video stream B2, as the base-view video stream B1 has been generated by performing compression encoding on the black images as described above. The format conforming to the MPEG-4 MVC is different from the existing MPEG-4 MVC format in this respect, and the reference images are set to frame images, at the same time, of the 2D compatible video stream A.

By using such streams in the format conforming to the MPEG-4 MVC format, it is possible to transmit both of the 2D video images and the 3D video images, and to reduce the bit rate significantly as the base-view video stream B1 has been generated by performing compression encoding on the black images. As a result, both of the 2D video images and the 3D video images can be transmitted within a conventionally allocated frequency band.

When streams generated by performing compression encoding in the MPEG-4 MVC format are decoded, the dependent-view video stream is decoded by referring to the frame images of the base-view video stream. In Embodiment 1, however, the dependent-view video stream is decoded by using the frame images of the MPEG-2 compatible stream, i.e. left-view images, as the reference images.

Specifically, the format conforming to the MPEG-4 MVC stipulates a descriptor and the like for instructing a playback end to switch a reference target for decoding from the base-view video stream to the MPEG-2 compatible video stream.

The following describes the data creation device and the playback device pertaining to Embodiment 1 of the present invention with reference to the drawings.

<1-2. Data Creation Device>
<1-2-1. Structure>

The following describes the data creation device pertaining to Embodiment 1 of the present invention with reference to the drawings.

Figure 26:
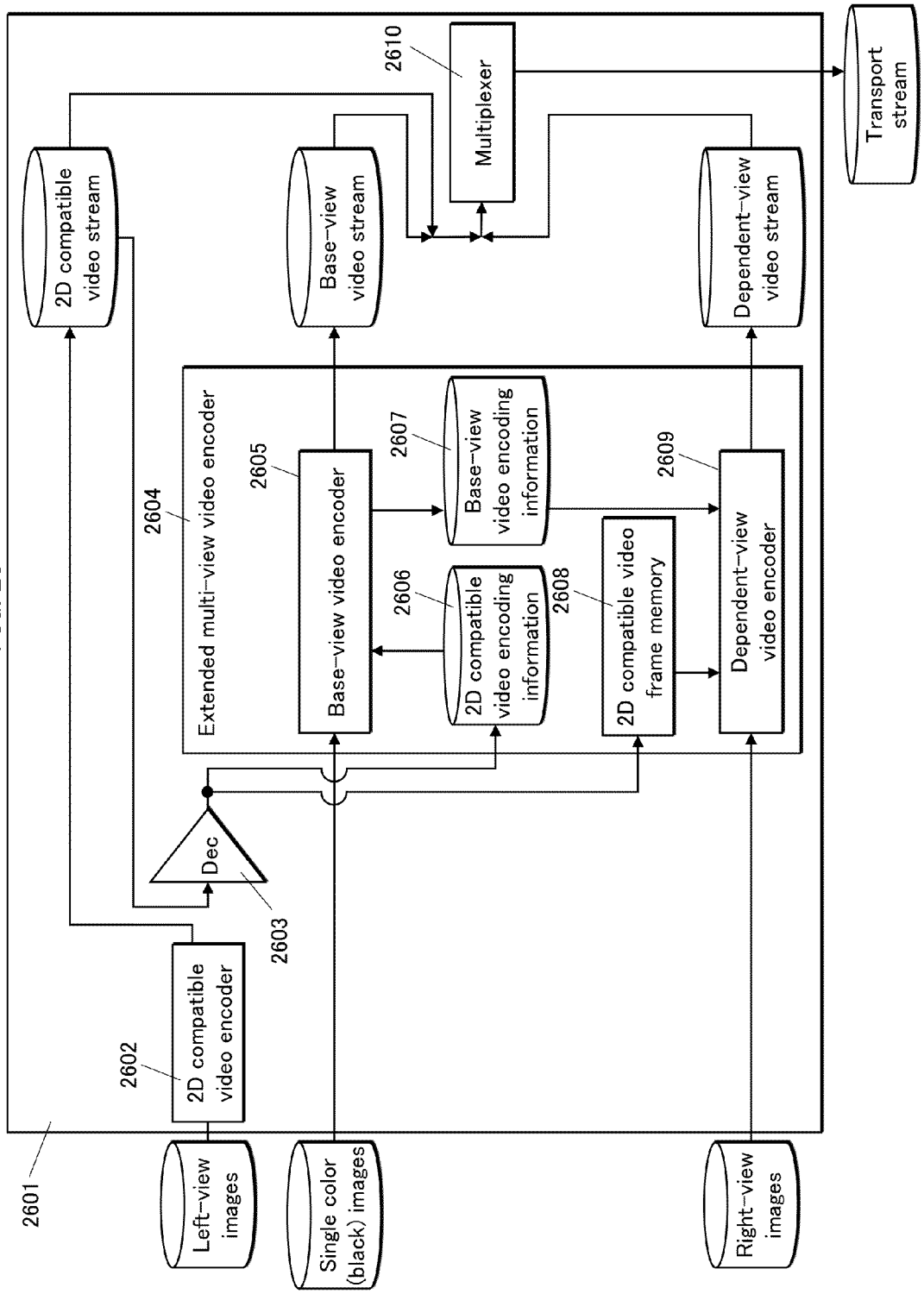
FIG. 26 illustrates a data creation device pertaining to Embodiment 1.

FIG. 26 is a block diagram showing the functional structure of a data creation device 2601 pertaining to Embodiment 1.

The data creation device 2601 receives input of left-view images and right-view images constituting 3D video images, and black images, and outputs a transport stream including a 2D compatible video stream, a base-view video stream, and a dependent-view video stream in a data format described later.

The data creation device 2601 includes a 2D compatible video encoder 2602, a Dec (2D compatible video decoder) 2603, an extended multi-view video encoder 2604, and a multiplexer 2610.

The extended multi-view video encoder 2604 includes a base-view video encoder 2605, a 2D compatible video frame memory 2608, and a dependent-view video encoder 2609.

The 2D compatible video encoder 2602 receives input of left-view images, performs compression encoding on the left-view images in the MPEG-2 format to generate a 2D compatible video stream, and outputs the 2D compatible video stream.

The Dec 2603 decodes compression encoded pictures in the 2D compatible video stream, and outputs the resulting decoded pictures and 2D compatible video encoding information 2606. Pictures refer to images constituting a frame or a field, and are units of encoding.

The decoded pictures are stored in the 2D compatible video frame memory 2608 included in the extended multi-view video encoder 2604. The 2D compatible video encoding information 2606 is input into the base-view video encoder 2605.

The 2D compatible video encoding information 2606 includes therein attribute information on the decoded 2D compatible video stream (resolution, aspect ratio, frame rate, progressive/interlaced, and the like), picture attribute information for the picture (picture type and the like), GOP (Group of Pictures) structure, 2D compatible video frame memory management information, and the like.

The 2D compatible video frame memory management information is information for associating a memory address of each decoded picture stored in the 2D compatible video frame memory 2608 with information on a presentation order of the picture (PTS (Presentation Time Stamp) or temporal_reference) and information on an encoding order (encoding order of the file or a DTS (Decoding Time Stamp))".

The extended multi-view video encoder 2604 receives input of the decoded pictures and the 2D compatible video encoding information output from the Dec 2603, right-view images, and black images, performs compression encoding, and outputs the base-view video stream and the dependent-view video stream.

The base-view video encoder 2605 has a function to output, as the base-view video stream, data generated by performing compression encoding in the format conforming to the MPEG-4 MVC format. The base-view video encoder 2605 performs compression encoding on the black images in accordance with the 2D compatible video encoding information 2606, and outputs the base-view video stream and base-view video encoding information 2607.

The base-view video encoding information 2607 includes therein attribute information (resolution, aspect ratio, frame rate, progressive/interlaced, and the like) on the base-view video stream, picture attribute information for the picture (picture type and the like), GOP structure, base-view video frame memory management information, and the like.

When outputting the base-view video encoding information 2607, the base-view video encoder 2605 sets, as a value of the attribute information on the base-view video stream, the same value as the attribute information on a video included in the 2D compatible video encoding information 2606. Furthermore, in accordance with the picture attribute information (picture type and the like) and the GOP structure included in the 2D compatible video encoding information 2606, the base-view video encoder 2605 determines the picture type when compression encoding is performed on pictures at the same presentation time and performs compression encoding on the black images. For example, if the picture type of a picture indicated by the 2D compatible video encoding information 2606 at time "a" is an I picture and the picture is at the top of a GOP, the base-view video encoder 2605 performs compression encoding on a black image having the same presentation time so that the black image is an I picture and a video access unit at the top of a GOP in the base-view video stream.

If, for example, the picture type of a picture indicated by the 2D compatible video encoding information 2606 at time "b" is a B picture, the base-view video encoder 2605 performs compression encoding on a black image having the same presentation time so that the black image is a B picture. In this case, the DTS and the PTS of the base-view video stream are respectively made identical to the DTS and the PTS of pictures corresponding to a view having the same presentation time in the 2D compatible video stream.

The base-view video frame memory management information is information obtained by converting syntax elements indicating a memory address of the frame memory 2608 storing therein the decoded pictures obtained by decoding the 2D compatible video stream based on the 2D compatible video frame memory management information and the information on a presentation order and an encoding order of the decoded pictures into syntax elements conforming to the compression encoding method for the base-view video stream, and associating these elements with each other. The syntax elements stipulate attribute information necessary for encoding in the compression encoding method in the MPEG-2 format and the MPEG-4 MVC format, and indicate, for example, header information, a motion vector, a conversion factor, and the like of a macroblock type etc.

The dependent-view video encoder 2609 has a function to perform compression encoding in the format conforming to the MPEG-4 MVC format to generate the dependent-view video stream. The dependent-view video encoder 2609 performs compression encoding on right-view images based on information included in the base-view video encoding information 2607, and outputs the dependent-view video stream. In this case, the dependent-view video encoder 2609 performs compression encoding by using the decoded pictures stored in the 2D compatible video frame memory as inter-view reference. The inter-view reference indicates reference of a picture showing a view from a different viewpoint.

The dependent-view video encoder 2609 determines reference picture IDs for inter-view reference based on the base-view video frame memory management information in the base-view video encoding information 2607. The dependent-view video encoder 2609 also sets, as a value of the video attribute information on the dependent-view video stream, the same value as the attribute information on the base-view video stream in the base-view video encoding information 2607.

Furthermore, the dependent-view video encoder 2609 determines the picture type of an image as a target of encoding, based on the picture attribute information (picture type and the like) and the GOP structure included in the base-view video encoding information 2607, and performs compression encoding on right-view images. For example, if the picture type of a picture indicated by the base-view video encoding information 2607 at time "a" is an I picture and the picture is at the top of a GOP, then the dependent-view video encoder 2609 performs compression encoding on the right-view images by setting the picture type of the picture at the same time "a" to an anchor picture so that the anchor picture is the video access unit at the top of a dependent GOP. The anchor picture is a picture that does not refer to a picture earlier than itself, i.e. a picture from which interrupt playback is possible. If, for example, the picture type of a picture indicated by the base-view video encoding information 2607 at time "b" is a B picture, the dependent-view video encoder 2609 performs compression encoding on the right-view images by setting the picture type of the picture at the same time "b" to a B picture.

In this case, the DTS and the PTS of the dependent-view video stream are respectively made identical to the DTS and the PTS of pictures corresponding to a view to be displayed at the same presentation time in the base-view video stream.

The multiplexer 2610 converts the output 2D compatible video stream, base-view video stream, and dependent-view video stream into PES (Packetized Elementary Stream) packets, divides the PES packets into TS packets, and outputs the TS packets as a multiplexed transport stream.

Separate PIDs are set to the 2D compatible video stream, the base-view video stream, and the dependent-view video stream, so that the playback device can identify each of the video streams from data of the multiplexed transport stream.

<1-2-2. Data Format>

The following describes a data format with reference to the drawings.

FIG. 22 shows video attributes that are made identical in each compression encoding format in compression encoding in the MPEG-2 format and in the MPEG-4 MVC format, and the name of the fields for the video attributes.

Video attributes indicating resolution, aspect ratio, frame rate, and progressive/interlaced of the video stream shown in FIG. 22 are set to have the same value among pictures in different encoding methods, so that, when pictures in the dependent-view video stream are decoded, pictures in the 2D compatible video stream in a different compression encoding format are easily referred to.

Figure 25:
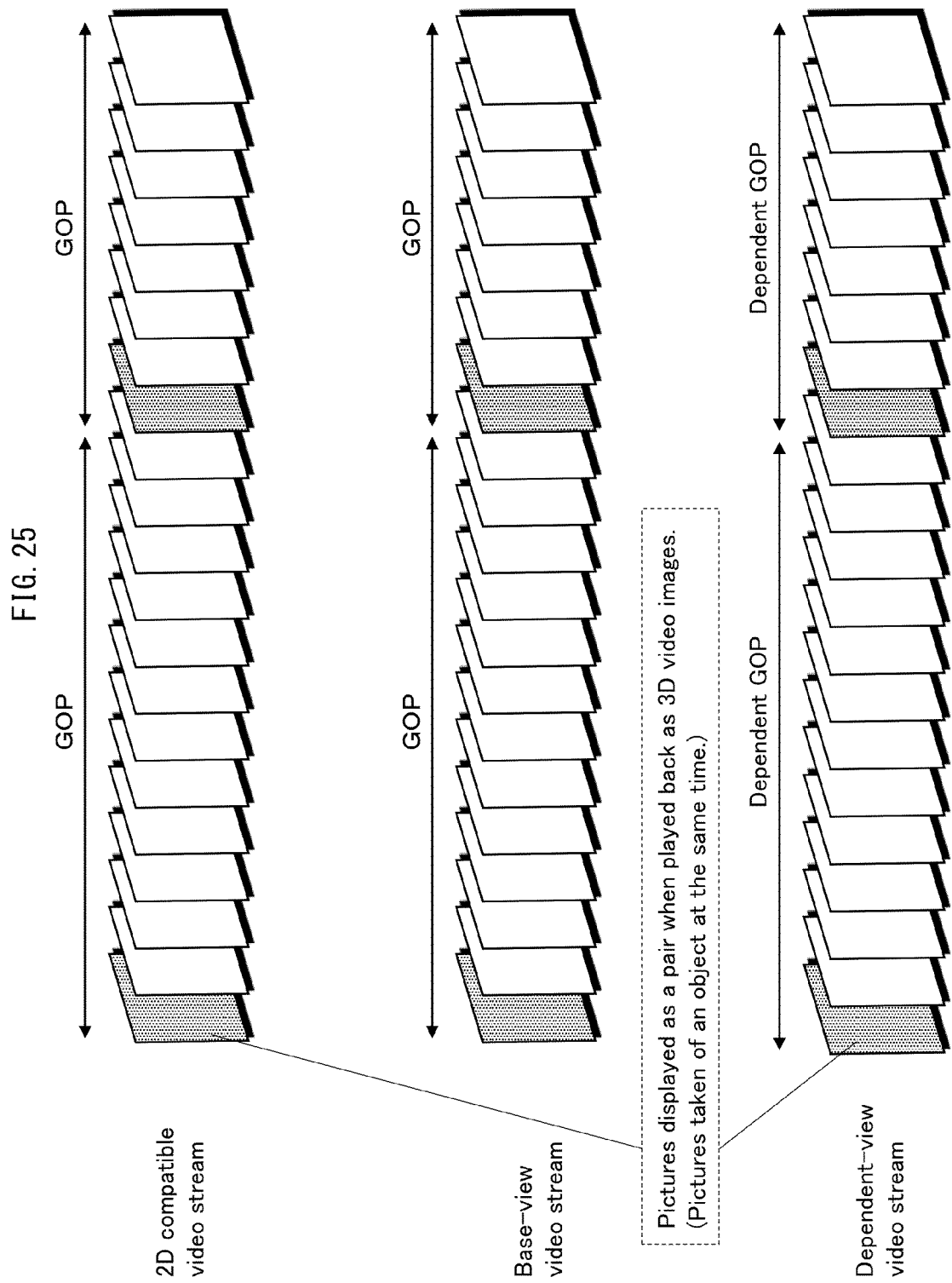
FIG. 25 illustrates the GOP structure of the 2D compatible video stream, the base-view video stream, and the dependent-view video stream.

FIG. 25 illustrates the GOP structure of the 2D compatible video stream, the base-view video stream, and the dependent-view video stream in Embodiment 1.

As illustrated in FIG. 25, GOPs in the 2D compatible video stream, the base-view video stream, and the dependent-view video stream are configured to have the same number of pictures. In other words, when a picture in the 2D compatible video stream is at the top of a GOP, a picture in the base-view video stream having the same PTS and a picture in the dependent-view video stream having the same PTS must be at the top of the respective GOP and dependent GOP.

With this structure, when interrupt playback is performed, decoding of all of the video streams is possible starting from a certain presentation time if the 2D compatible video stream is an I picture, thus simplifying the processing for interrupt playback.

When the transport stream is stored as a file, entry map information may be stored as management information to indicate where the picture at the top of a GOP is stored in the file. For example, in the Blu-ray Disc format, the entry map information is stored in a separate file as a management information file.

In the transport stream of Embodiment 1, when the position of the picture at the top of each GOP in the 2D compatible video stream is registered in an entry map, the position of the base view and the dependent view at the same presentation time is also registered in the entry map. With this structure, interrupt playback of 3D video images is made simple by referring to the entry map.

Figure 36:
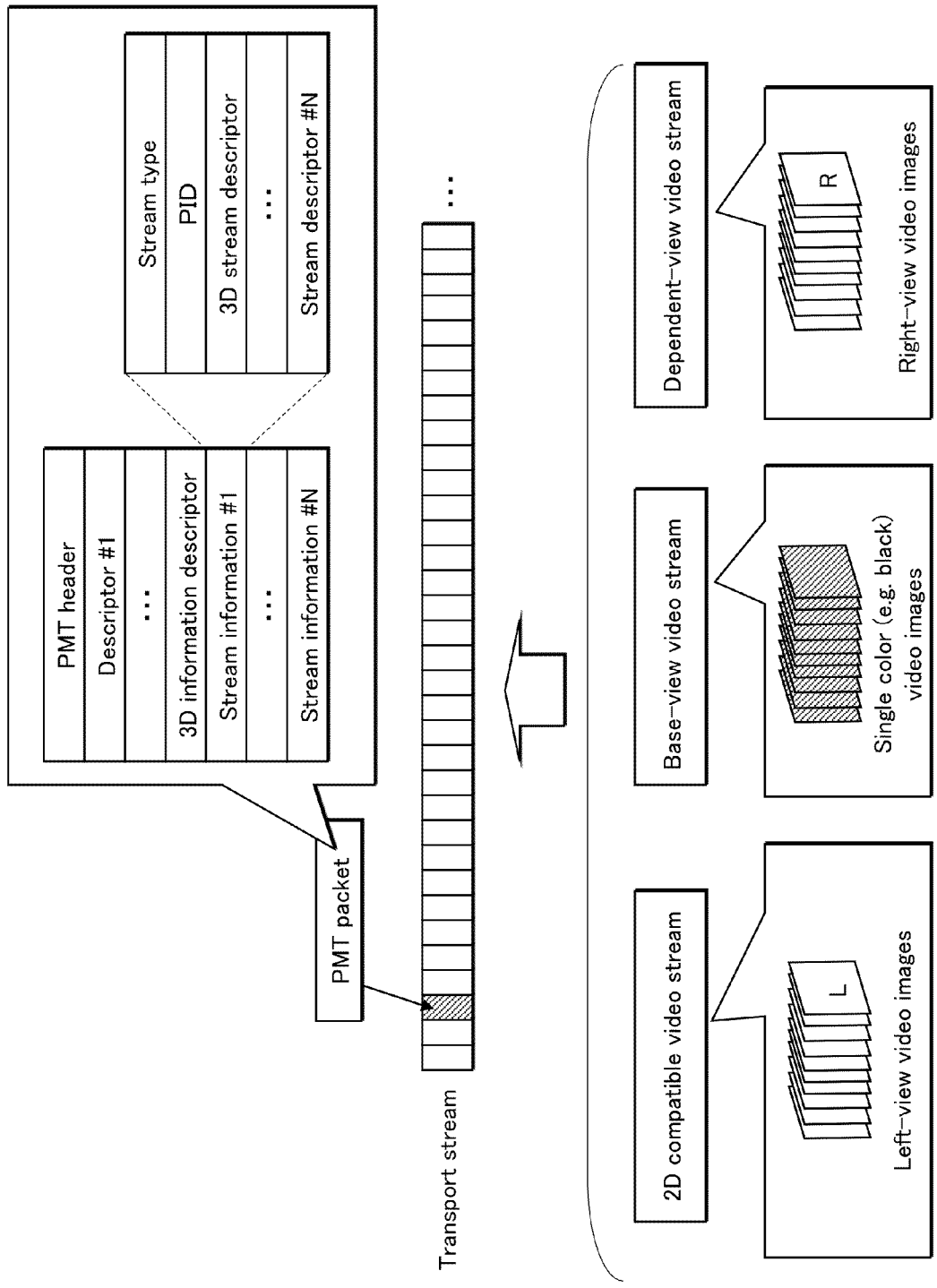
FIG. 36 illustrates the relationship between the structure of the transport stream and PMT packets.

FIG. 36 shows the relationship between the structure of the transport stream and PMT (Program Map Table) packets. In the transport stream including a stream for 3D video images, signaling information for decoding of the 3D video images is included in system packets, such as PMT packets. As shown in FIG. 36, descriptors include a 3D information descriptor for signaling the relationship between video streams, the start and end of 3D video images playback under the present format and a 3D stream descriptor set for each video stream, and the like.

FIG. 37 shows the structure of the 3D information descriptor.

The 3D information descriptor includes a playback format, a left-view video image type, a 2D compatible video PID, a base-view video PID, and a dependent-view video PID.

The playback format is information for signaling the playback method of the playback device.

The playback format is described with reference to FIG. 38.

A playback format of "0" indicates playback of 2D video images from 2D compatible videos. In this case, the playback device performs 2D video image playback of the 2D compatible video stream only.

A playback format of "1" indicates playback of 3D video images from 2D compatible videos and the dependent-view videos (i.e., the 3D video image playback format described in Embodiment 1). In this case, the playback device performs 3D video image playback of the 2D compatible video stream, the base-view video stream, and the dependent-view video stream using the playback method described in Embodiment 1. The 3D video image playback method of Embodiment 1 is described below.

A playback format of "2" indicates 3D video image playback from the base-view video stream and the dependent-view video stream. In other words, a value of "2" indicates that the 2D compatible video stream and the multi-view video stream constituting the 3D video images have been generated by performing compression encoding on different video images, and are not in a reference relationship. In this case, the playback device performs 3D video image playback of the video stream as the video stream compression encoded in the regular MPEG-4 MVC format.

A playback format of "3" indicates doubling playback of the 2D compatible video stream or the base-view video stream. The playback device performs doubling playback. Doubling playback refers to outputting one of a right-view picture and a left-view picture at a given time "a" to both the L and R planes. Doubling playback is equivalent to 2D video image playback in terms of the screen the viewer sees. Since no change occurs in the frame rate during 3D video image playback, however, doubling playback has advantages that no reauthentication occurs when the playback device is connected to a display and the like via an HDMI (High-Definition Multimedia Interface) or the like, thus allowing for a seamless playback connection between a 2D video playback section and a 3D video playback section.

The left-view video image type is information indicating which stream, between the multi-view video streams, includes the compression encoded left-view video images (the other video stream including the right-view video images). If the playback format is "0", there is no need to refer to this field. If the playback format is "1", this field indicates which of the 2D compatible video and the dependent-view video represents the left-view video images. That is to say, the playback format of "1" and the left-view video image type of "0" indicate that the 2D compatible video stream corresponds to the left-view video images. When the playback format is "2" or "3", the playback device can determine the video stream corresponding to the left-view video images in a similar manner by referring to the left-view video image type.

The 2D compatible video PID, the base-view video PID, and the dependent-view video PID indicate the PID of each video stream included in the transport stream. This information allows for identification of the stream to be decoded.

FIG. 39 shows the 3D stream descriptor.

The name of fields for the 3D descriptor includes a base-view video type, a reference target type, and a referenced type.

The base-view video type indicates the type of video images compression encoded in the base-view video stream. A base-view video type of "0" indicates that either left-view video images or right-view video images of 3D video images are compression encoded. A base-view video type of "1" indicates that black images are compression encoded as dummy images that are replaced by the 2D compatible video stream and are not output to a plane.

The reference target type indicates the type of the video stream that the dependent-view video stream refers to for inter-view reference. A reference target type of "0" indicates that pictures in the base-view video stream are referred to for inter-view reference, whereas a reference target type of "1" indicates that pictures in the 2D compatible video stream are referred to for inter-view reference. In other words, the reference target type of "1" indicates the reference method in the 3D video image format of the present embodiment.

The referenced type indicates whether the video stream is referred to in inter-view reference. If the video stream is not referred to, processing for inter-view reference can be skipped, thus reducing the burden of decoding processing. Note that all or a portion of the information in the 3D information descriptor and the 3D stream descriptor may be stored in supplementary data or the like for each video stream rather than being stored in PMT packets.

Figure 23:
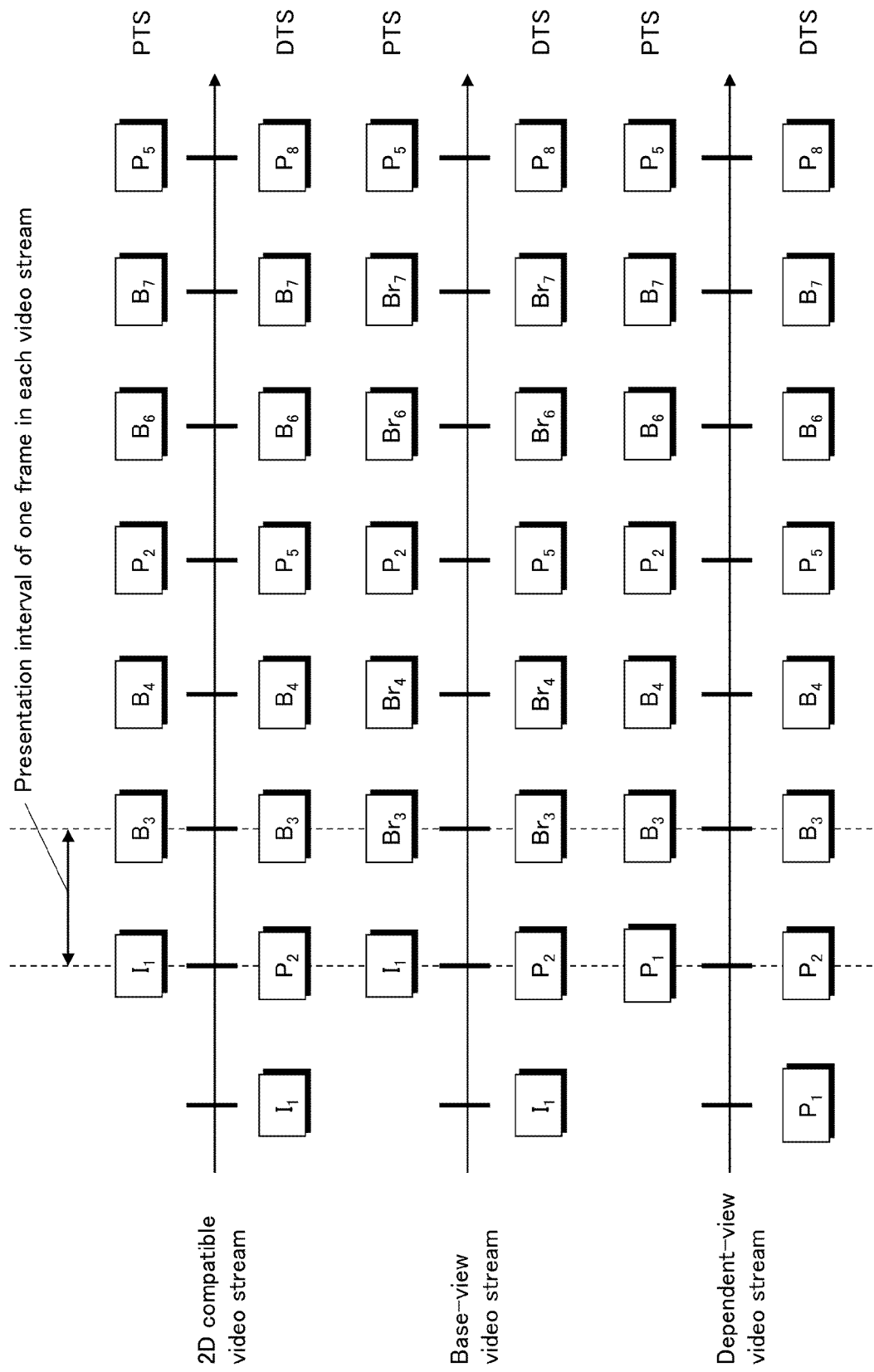
FIG. 23 shows an example of the relationship between a picture type, and the PTS and the DTS allocated to each video access unit in the 2D compatible video stream, the base-view video stream, and the dependent-view video stream in the transport stream.

FIG. 23 shows an example of the relationship between a picture type, and the PTS and the DTS allocated to each video access unit in the 2D compatible video stream, the base-view video stream, and the dependent-view video stream in the transport stream.

The data creation device 2601 sets pictures in the 2D compatible video stream and pictures in the dependent-view video stream having been generated by performing compression encoding on the left-view images at the same presentation time to have the same DTS/PTS. The pictures in the base-view video stream to be played back at the same time are provided with the same PTS/DTS/POC as the pictures in the dependent-view video stream.

During inter-view reference of the pictures in the dependent-view video stream, the pictures in the base-view video stream provided with the same PTS/DTS/POC are referred to. Specifically, during inter-view reference of the pictures in the dependent-view video stream, the picture reference ID (ref_idx_10 or ref_idx_11) designated by each macroblock in the picture of the dependent-view video stream is configured to indicate the base-view picture with the same POC.

<1-2-3. Operations>

Figure 27:
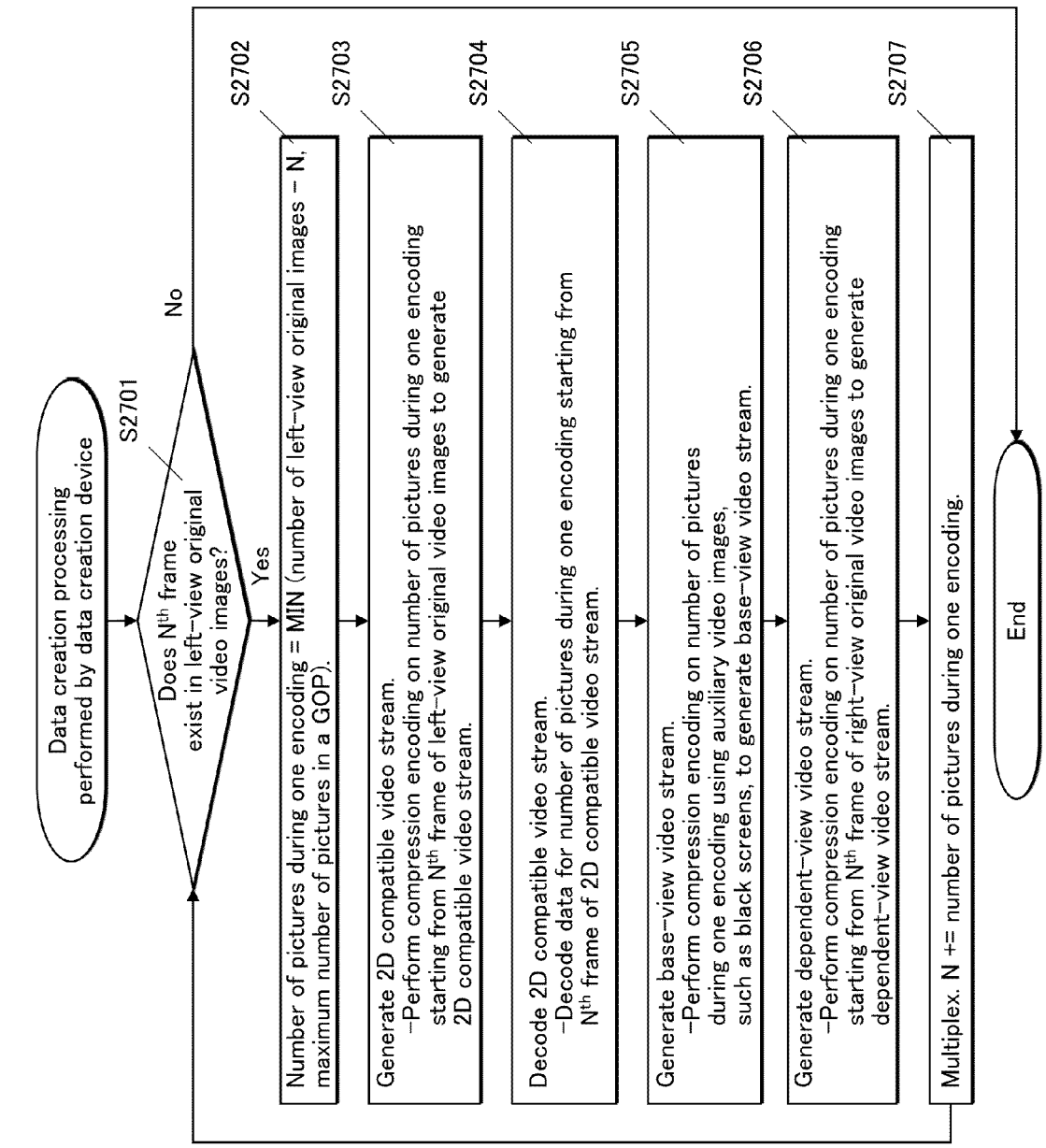
FIG. 27 illustrates a data creation flow for the data creation device pertaining to Embodiment 1.

FIG. 27 shows the data creation flow of the data creation device 2601. The following describes the data creation flow.

N is a variable for storing the frame number of the frame image as the target of encoding.

First, the variable N is initialized (N=0). The data creation device 2601 then checks whether the Nth frame exists in the left-view video images (step S2701). If not (step S2701: No), the data creation device 2601 determines that no more data requiring compression encoding exists, and terminates processing.

If Yes in step S2701, the data creation device 2601 determines the number of pictures (hereinafter, referred to as "the number of pictures in one encoding") to be compression encoded in one compression encoding flow (steps S2702 to S2706) (step S2702). The maximum number of video access units included in one GOP (the maximum number of frames in one GOP, e.g. 30 frames) is set as the number of pictures in one encoding. Depending on the length of the video stream to be input, it is expected that the number of frames included in the last GOP in the video stream is less than the maximum number of frames in one GOP. In such a case, the remaining number of frames is set as the number of pictures in one encoding.

The 2D compatible video encoder 2602 then generates a portion of the 2D compatible video stream for the number of pictures in one encoding (step S2703). Starting from the Nth frame of the left-view video images, the 2D compatible video encoder 2602 performs compression encoding on the number of pictures in one encoding in accordance with the compression encoding method for the 2D compatible video stream to generate and output the 2D compatible video stream.

Furthermore, the 2D compatible video decoder 2603 decodes a portion of the 2D compatible video stream for the number of pictures in one encoding (step S2704). The 2D compatible video decoder 2603 decodes the number of pictures in one encoding starting from the Nth frame in the 2D compatible video stream output in step S2703, and then outputs decoded pictures, which are obtained by decoding compressed picture data, and 2D compatible video encoding information.

The base-view video encoder 2605 generates a portion of the base-view video stream for the number of pictures in one encoding (step S2705). Specifically, based on the 2D compatible video encoding information, the attribute information on the base-view video stream (resolution, aspect ratio, frame rate, progressive/interlaced, and the like), the picture attribute information (picture type and the like) for each picture in the GOP, the GOP structure, 2D compatible video frame memory management information, and the like are set as the base-view encoding information 2607, and black images are compression encoded for the number of pictures in one encoding to generate the base-view video stream. The set base-view encoding information 2607 is output.

The dependent-view video encoder 2609 then generates a portion of the dependent-view video stream for the number of pictures in one encoding (step S2706). Specifically, based on the base-view video encoding information output in step S2705, the attribute information on the dependent-view video stream (resolution, aspect ratio, frame rate, progressive/interlaced, and the like), the picture attribute information (picture type and the like) for each picture in the GOP, the GOP structure, 2D compatible video frame memory management information, and the like are set.

Furthermore, when encoding is performed using inter-picture predictive encoding, the dependent-view video stream encoder 2609 performs compression encoding on the right-view video images starting from the Nth frame using inter-picture predictive encoding by referring to pictures obtained by decoding the 2D compatible video stream provided with the same presentation time in the 2D compatible video frame memory 2608, rather than referring to pictures in the base-view video stream, to generate the dependent-view video stream.

The multiplexer 2610 converts the 2D compatible video stream, base-view video stream, and dependent-view video stream into PES packets. The multiplexer 2610 then divides the resulting PES packets into TS packets, and multiplexes the TS packets into a transport stream. N is then incremented by the number of pictures in one encoding (S2707).

When processing in step S2707 terminates, processing is repeated, starting from step S2701.

Note that the number of pictures may be changed for each flow. When the number of pictures is to be reduced, it suffices to set the number of pictures in one encoding in step S2702 to a lower value. For example, if the number of pictures reordered in video encoding is two, then setting the number of pictures in compression encoding to four eliminates the effect of reordering. Suppose, for example, that, in the compression encoding method, the number of reordered pictures is two, and that the picture types are $I_1, P_4, B_2, B_3, P_7, B_5, B_6, \ldots$ (the numbers indicating a presentation order). If the number of pictures in one encoding is three, then the $P_4$ picture cannot be processed, thus preventing compression encoding on pictures $B_2$ and $B_3$. If on the other hand the number of pictures in one encoding is set to four, then the $P_4$ picture can be processed, thus allowing encoding of the pictures $B_2$ and $B_3$. Depending on image characteristics, the number of pictures may be set, for each compression encoding flow, to the optimum number as long as the number of pictures in one encoding does not exceed the maximum number of frames in one GOP.

<1-3. Playback Device>
<1-3-1. Structure>

The following describes the structure of a playback device 2823, pertaining to the present embodiment, that plays back 3D video images, with reference to the drawings.

Figure 28:
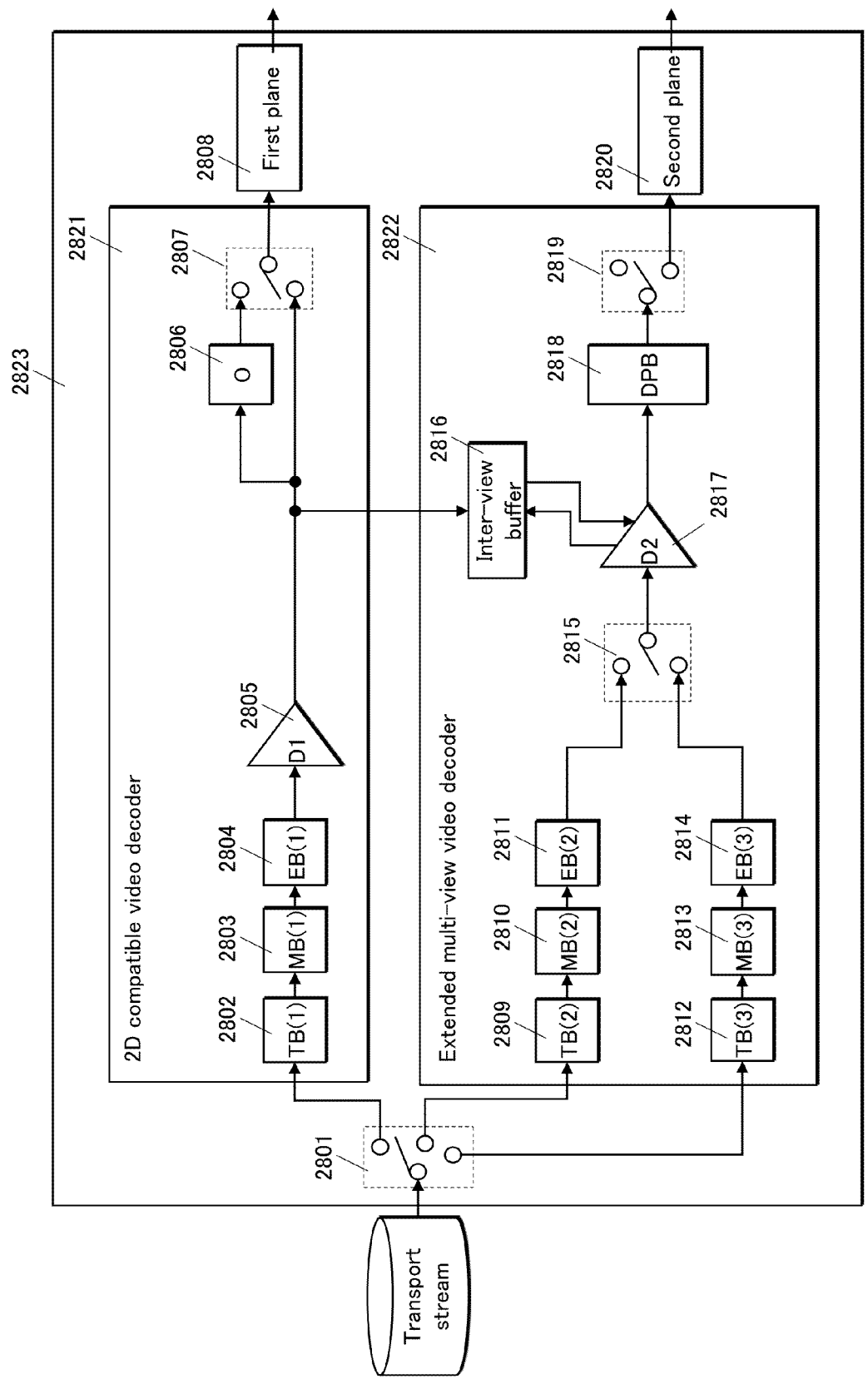
FIG. 28 illustrates the structure of a playback device, pertaining to Embodiment 1, for playing back 3D video images.

FIG. 28 is a block diagram showing the functional structure of the playback device 2823.

The playback device 2823 includes a PID filter 2801, a 2D compatible video decoder 2821, an extended multi-view video decoder 2822, a first plane 2808, and a second plane 2820.

The PID filter 2801 filters an input transport stream. From among the TS packets, the PID filter 2801 transmits TS packets whose PID matches a PID necessary for playback to the 2D compatible video decoder 2821 and the extended multi-view video decoder 2822 in accordance with the PID.

Stream information on the PMT packet indicates which stream corresponds to which PID. For example, if the PID of the 2D compatible video stream is 0x1011, the PID of the base-view video stream in the multi-view video stream is 0x1012, and the PID of the dependent-view video stream in the multi-view video stream is 0x1013, the PID filter 2801 refers to the PID of the TS packet and, if the PID of the TS packet matches one of the predetermined PIDs shown above, transmits the TS packet to the corresponding decoder.

The first plane 2808 is a plane memory storing a picture that the 2D compatible video decoder 2821 decodes and outputs in accordance with the PTS.

The second plane 2820 is a plane memory storing a picture that the extended multi-view video decoder 2822 decodes and outputs in accordance with the PTS.

Next, the 2D compatible video decoder 2821 and the extended multi-view video decoder 2822 are described.

The 2D compatible video decoder 2821 has basically the same decoding function as a decoder in the MPEG-2 format, which is a compression encoding method for 2D video images. The extended multi-view video decoder 2822 has basically the same decoding function as a decoder in the MPEG-4 MVC format, which is a compression encoding method for the 3D video images for achieving inter-view reference. In this embodiment, a regular decoder in the MPEG-2 format is referred to as a video decoder 2901, and a regular decoder in the MPEG-4 MVC format is referred to as a multi-view video decoder 2902.

The video decoder 2901 and the multi-view video decoder 2902 are first described with reference to FIG. 29. Subsequently, description focuses on the differences between the 2D compatible video decoder 2821 and the video decoder 2901 and between the extended multi-view video decoder 2822 and the multi-view video decoder 2902.

Figure 29:
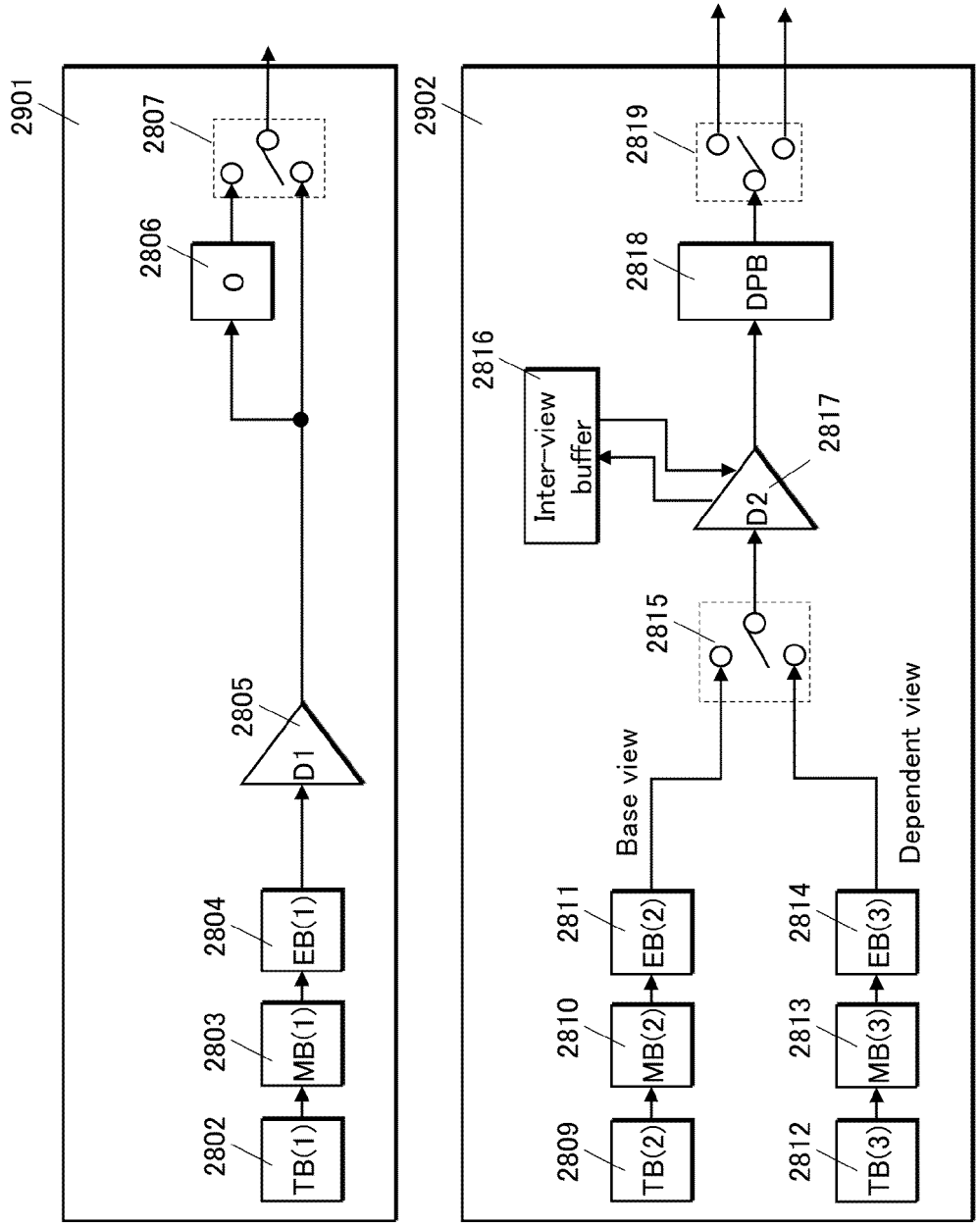
FIG. 29 is a block diagram showing the functional structures of a video decoder and a multi-view video decoder.

As illustrated in FIG. 29, the video decoder 2901 includes a TB (Transport Stream Buffer) (1) 2802, a MB (Multiplexing Buffer) (1) 2803, an EB (Elementary Stream Buffer) (1) 2804, D1 (2D compatible video compressed image decoder) 2805, and an O (Re-ordering Buffer) 2806.

The TB(1) 2802 is a buffer that temporarily stores TS packets constituting the video stream when the TS packets are output from the PID filter 2801.

The MB(1) 2803 is a buffer for temporarily storing PES packets when the video stream is output from the TB(1) 2802 to the EB(1) 2804. When data is transferred from the TB(1) 2802 to the MB(1) 2803, the TS header and adaptation field are removed from TS packets.

The EB(1) 2804 is a buffer in which compression encoded pictures (I pictures, B pictures, and P pictures) are stored.

When data is transferred from the MB(1) 2803 to the EB(1) 2804, the PES headers are removed.

The D1 2805 creates pictures of frame images by decoding each video access unit in the video elementary stream at a time of the DTS.

The pictures decoded by the D1 2805 are output to the plane 2808 or to the O 2806. When the DTS and the PTS differ from each other, as with P pictures and I pictures, the pictures are output to the O 2806. When the DTS and the PTS are the same, as with B pictures, the pictures are directly output to the plane 2808.

The O 2806 is a buffer for reordering when the DTS and the PTS of decoded pictures differ from each other, i.e. when the decoding order and the presentation order of decoded pictures differ from each other. The D1 2805 performs decoding by referring to the picture data stored in the O 2806.

When decoded pictures are output to the plane 2808, a switch 2807 performs switching between outputting buffered images to the O 2806 and directly outputting the pictures from the D1 2805.

The multi-view video decoder 2902 is described next.

As illustrated in FIG. 29, the multi-view video decoder 2902 includes a TB(2) 2809, a MB(2) 2810, an EB(2) 2811, a TB(3) 2812, a MB(3) 2813, an EB(3) 2814, a decoding switch 2815, an inter-view buffer 2816, a D2 (multi-view video compressed image decoder) 2817, a DPB (Decoded Picture Buffer) 2818, and an output plane switch 2819.

The TB(2) 2809, the MB(2) 2810, and the EB(2) 2811 respectively have the same functions as the TB(1) 2802, the MB(1) 2803, and the EB(1) 2804, but differ from these buffers in that the buffered data is from the base-view video stream.

The TB(3) 2812, the MB(3) 2813, and the EB(3) 2814 respectively have the same functions as the TB(1) 2802, the MB(1) 2803, and the EB(1) 2804, but differ from these buffers in that the buffered data is from the dependent-view video stream.

In accordance with a DTS, the switch 2815 extracts data from the EB(2) 2811 and the EB(3) 2814 for the video access unit bearing the DTS in order to construct a 3D video access unit, and transfers the 3D video access unit to the D2 2817.

The D2 2817 decodes the 3D video access units transferred via the switch 2815 to create pictures of frame images.

Pictures in the base-view video stream, decoded by the D2 2817, are temporarily stored in the inter-view buffer 2816. The D2 2817 decodes pictures in the dependent-view video stream by referring to decoded pictures from the base-view video stream having the same PTSs and stored in the inter-view buffer 2816.

The multi-view video decoder 2902 creates a reference picture list for designating pictures to perform inter-view reference based on the picture type and syntax elements of the pictures in the base-view video stream and the pictures in the dependent-view video stream.

The D2 2817 transfers the decoded picture for the base-view, stored in the inter-view buffer 2816, and the decoded picture for the dependent-view to the DPB 2818, and outputs the pictures via the output plane switch 2819 in accordance with the PTS.

The DPB 2818 is a buffer for temporarily storing the decoded pictures. When decoding a video access unit for a P picture, a B picture, or the like using an inter-picture predictive encoding mode, the D2 2817 uses the DPB 2818 to refer to pictures that have already been decoded.

The output plane switch 2819 outputs the decoded pictures to an appropriate plane. For example, if the base-view video stream represents left-view video images and the dependent-view video stream represents right-view video images, the output plane switch 2819 outputs pictures in the base-view video stream to the plane for left-view video images and outputs pictures in the dependent-view video stream to the plane for right-view video images.

Next, the 2D compatible video decoder 2821 and the extended multi-view video decoder 2822 are described.

The 2D compatible video decoder 2821 has basically the same structure as the video decoder 2901. Therefore, a description of common functions is omitted, and only the differences are described.

The 2D compatible video decoder 2821 as illustrated in FIG. 28 transfers pictures decoded by the D1 2805 not only to the O 2806 or the switch 2807 but also to the inter-view buffer 2816 of the extended multi-view video decoder 2822 in accordance with the DTS.

The extended multi-view video decoder 2822 has basically the same structure as the multi-view video decoder 2902. Therefore, a description of common functions is omitted, and only the differences are described.

The extended multi-view video decoder 2822 overwrites decoded pictures in the base-view video stream having the same PTS/DTS, which are stored in a region within the inter-view buffer 2816, with pictures transferred from the 2D compatible video decoder 2821 in accordance with the DTS. With this structure, when pictures in the dependent-view video stream are decoded, the extended multi-view decoder 2822 can refer to the decoded pictures in the 2D compatible video stream as though they were decoded pictures in the base-view video stream. Address management of the inter-view buffer 2816 is not necessarily made different from management of decoded pictures in a conventional base-view video stream.

The extended multi-view video decoder 2822 controls the output plane switch 2819 so as to output only pictures from the dependent-view video stream, among the video images stored in the DPB 2818, to the second plane 2820 in accordance with the PTS. Pictures in the base-view video stream are not output to any plane as they have nothing to do with display.

With this structure, pictures in the 2D compatible video stream are output from the 2D compatible video decoder 2821 to the first plane 2808 in accordance with the PTS, and pictures in the dependent-view video stream in the multi-view video stream are output from the extended multi-view video decoder 2822 to the second plane 2820 in accordance with the PTS.

Adopting such structure allows for decoding of the dependent-view video stream in the multi-view video stream by referring to pictures in the 2D compatible video stream with a different video compression encoding method.

<1-3-2. Operations>

Figure 30:
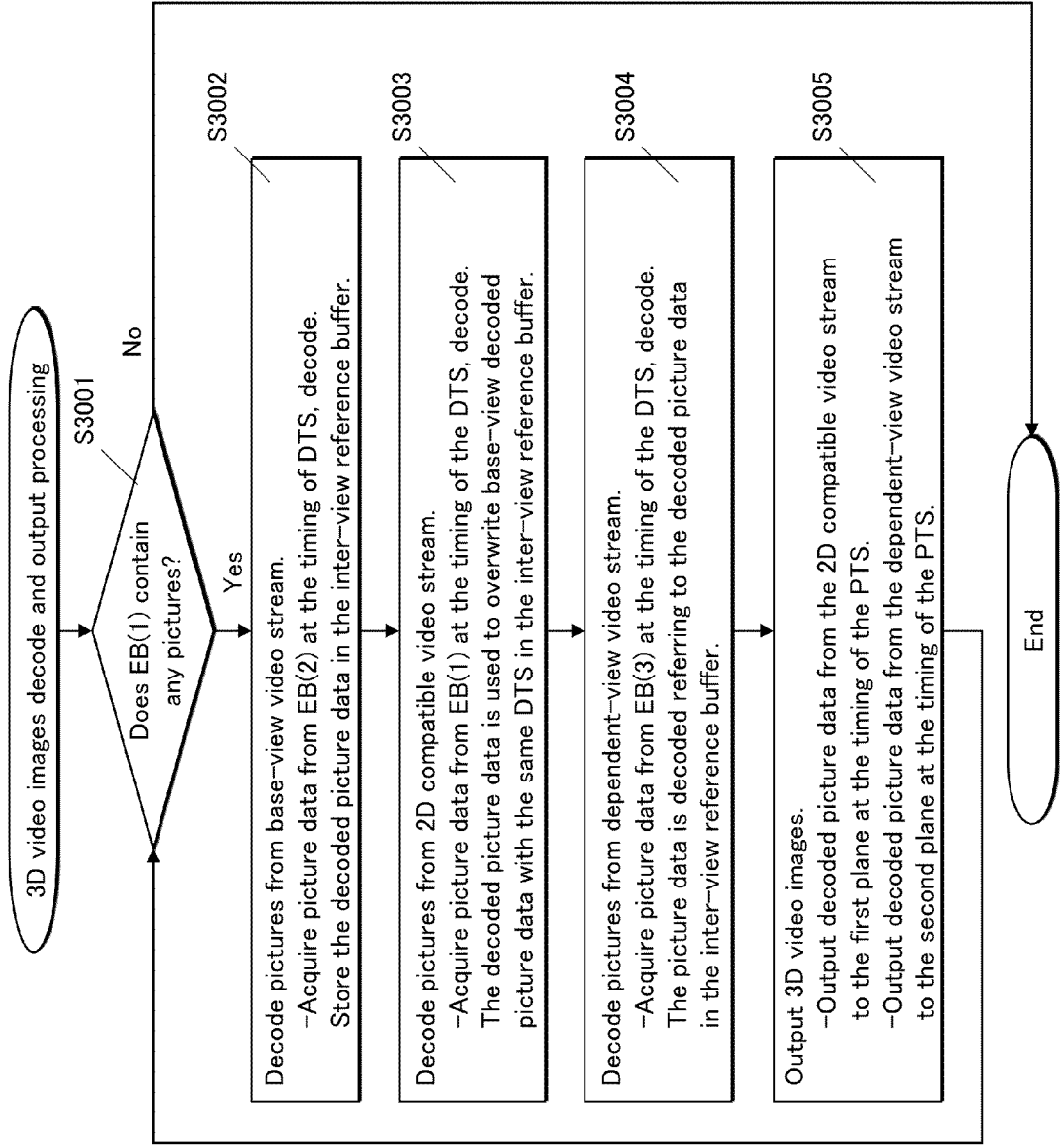
FIG. 30 is a flow chart showing the flow of decoding and outputting of 3D video images in the playback device pertaining to Embodiment 1.

FIG. 30 shows the flow of decoding and output of 3D video images in the playback device 2823.

The playback device 2823 determines whether or not there is a picture in the EB(1) 2804 (step S3001). If there is no picture (step S3001: No), the playback device 2823 determines that transfer of the video stream has terminated, and processing terminates.

If there is any picture in the EB(1) (step S3002: Yes), the playback device 2823 uses the extended multi-view video decoder 2822 to decode the base-view video stream (step S3002). Specifically, in accordance with each DTS, the picture bearing the DTS is extracted from the EB (2) and decoded to be stored in the inter-view buffer 2816. Since management of the pictures in the inter-view buffer 2816 is the same as conventional management in the MPEG-4 MVC format, a description thereof is omitted. For example, pictures are managed by internally storing, as management information for creation of a reference picture list, table information associating PTSs/POCs with data addresses of the inter-view buffer 2816 showing a reference target of a decoded picture.

The playback device 2823 uses the 2D compatible video decoder 2821 to decode the 2D compatible video stream (step S3003). Specifically, in accordance with each DTS, the 2D compatible video decoder 2821 extracts a picture bearing the DTS from the EB (1) and decodes the picture. In this case, the decoded picture is transferred to the O 2806 and the switch 2807. The decoded picture is also transferred to the inter-view buffer 2816.

The extended multi-view video decoder overwrites the base-view picture bearing the same DTS/PTS in the inter-view buffer 2816 with the transferred picture.

Details of the overwriting are described with reference to FIG. 31.

Figure 31:
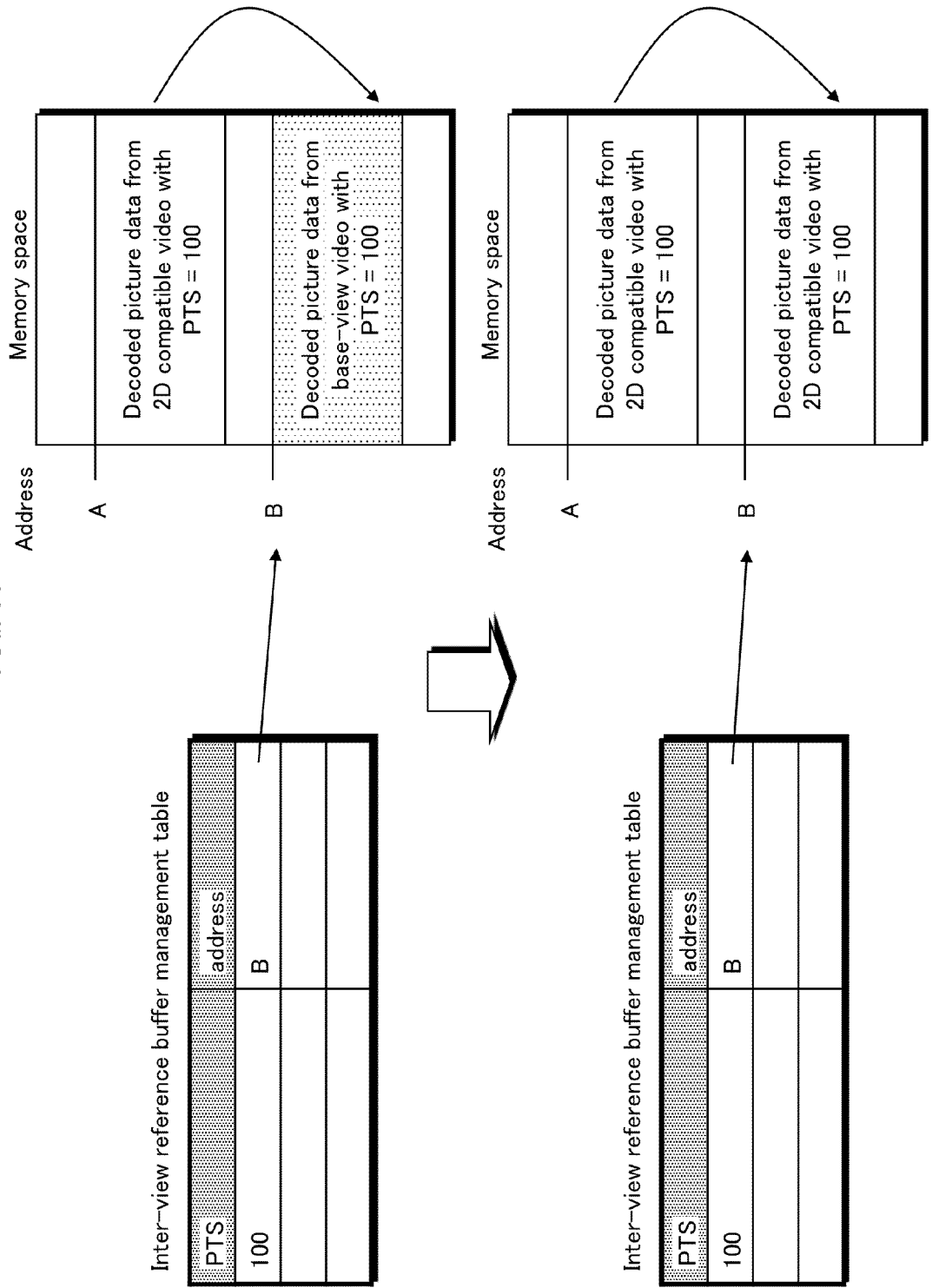
FIG. 31 illustrates management of an inter-view buffer in the playback device, pertaining to Embodiment 1, for playing back 3D video images.

As in the upper tier of FIG. 31, pictures in the inter-view buffer 2816 are managed by, for example, PTSs and memory addresses in the Inter-view buffer 2816. The upper tier of FIG. 31 shows the state immediately after the picture in the base-view video stream whose PTS=100 has been decoded, and indicates that the decoded picture for the base-view whose PTS=100 is stored in a memory region starting from an address B.

When the processing in step S3003 is performed, the management table becomes as shown in the lower tier of FIG. 31. The base-view video picture whose PTS=100 and which is stored at address B is overwritten with the decoded picture in the 2D compatible video stream having the same PTS. This allows for the picture data alone to be overwritten, without a need to change the management information (e.g. the PTS) for managing pictures in the buffer. As a result, D2 2817 can perform decoding while referring to a picture obtained by decoding the 2D compatible video stream in the same manner as conventional decoding of the dependent-view video stream in the MPEG-4 MVC format.

The extended multi-view video decoder 2822 then decodes the dependent-view video stream (step S3004). Specifically, in accordance with each DTS, the extended multi-view video decoder 2822 extracts the picture bearing the DTS from the EB (3) and decodes the picture in the dependent-view video stream while referring to pictures stored in the inter-view buffer 2816.

The picture to be referred to is not the pictures in the base-view video stream, but rather the pictures in the 2D compatible video stream yielded by the overwriting in step S3003.

The playback device 2823 outputs the decoded picture in the 2D compatible video stream in accordance with the PTS to the first plane 2808 and outputs the decoded picture data in the dependent-view video stream in accordance with the PTS to the second plane 2820 (step S3005).

Since decoding performed by the D1 2805 included in the playback device 2823 is the same as conventional decoding of the video stream in the MPEG-2 format, an LSI (Large Scale Integration) and software of a conventional playback device for videos in the MPEG-2 format can be used. Since decoding in the MPEG-4 MVC format performed by the D2 2817 is also the same as conventional decoding in the MPEG-4 MVC format, an LSI and software of a conventional playback device for videos in the MPEG-4 MVC format can be used.

<Example of Use of Playback Device 2823>

Use of the playback device is described with reference to FIGS. 5A through 5D by taking, as examples, a 3D digital television 100 that can play back 3D video images in the video stream created by the data creation device 2823 and a 2D digital television 300 that can only play back 2D video images and does not support playback of 3D video images.

As illustrated in FIG. 5A, a user views 3D video images by using the 3D digital television 100 and 3D glasses 200.

The 3D digital television 100 is capable of displaying both 2D video images and 3D video images, and displays video images by playing back a stream included in received broadcast waves. Specifically, the 3D digital television 100 plays back the 2D compatible video stream compression encoded in the MPEG-2 format, and the base-view video stream and the dependent-view video stream compression encoded in the format conforming to the MPEG-4 MVC format.

The 3D digital television 100 alternately displays a left-view image obtained by decoding the 2D compatible video stream and a right-view image obtained by decoding the dependent-view video stream.

Video images thus played back can be viewed as stereoscopic images by having the viewer wear the 3D glasses 200.

FIG. 5B shows the state of the 3D glasses 200 upon presentation of left-view images.

At the moment at which a left-view image is displayed on the screen, the 3D glasses 200 cause the liquid crystal shutter corresponding to the left eye to be transparent, while causing the liquid crystal shutter corresponding to the right eye to block light.

FIG. 5C shows the state upon presentation of right-view images.

At the moment at which a right-view image is displayed on the screen, the 3D glasses 200 conversely cause the liquid crystal shutter corresponding to the right eye to be transparent, while causing the liquid crystal shutter corresponding to the left eye to block light.

The 2D digital television 300 illustrated in FIG. 5D supports playback of 2D video images, and can play back 2D video images obtained by decoding the 2D compatible video stream among video streams included in the transport stream created by the data creation device 2601.

<2. Modifications>

Embodiments of the data creation device and the playback device pertaining to the present invention have been described thus far, but the present invention is in no way limited to the data creation device and the playback device as described in the above-mentioned embodiments. The exemplified data creation device and the playback device may be modified as described below.

Figure 32:
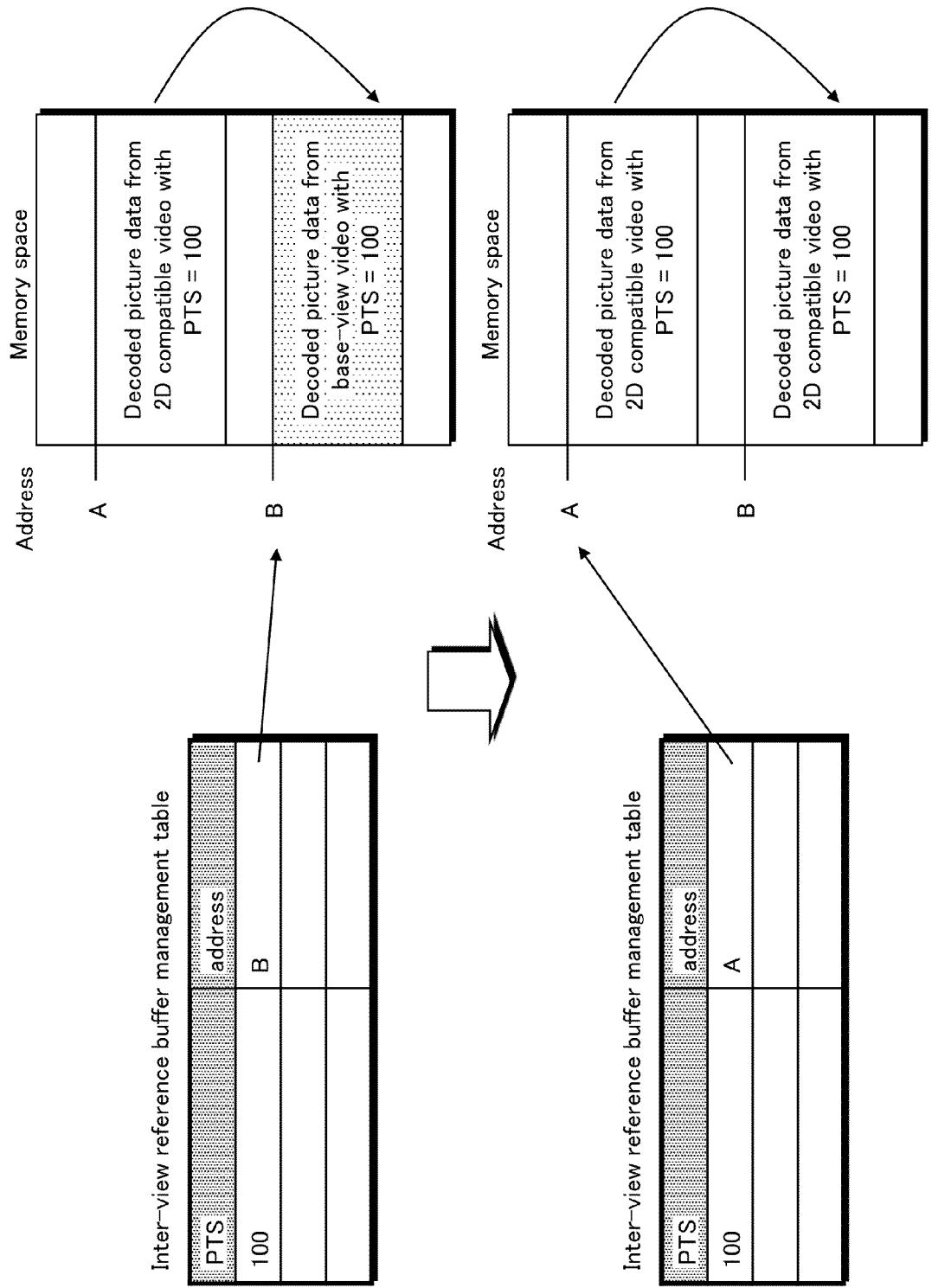
FIG. 32 illustrates a modification to the management of the inter-view buffer in the playback device, pertaining to Embodiment 1, for playing back 3D video images.

(1) In the playback device in the present embodiment, in step S3003, the decoded picture from the base-view video stream in the inter-view buffer 2816 is overwritten with decoded picture in the 2D compatible video stream having the same PTS. As shown in the lower tier of FIG. 32, however, a reference target address may be changed without performing overwriting.

Performing processing in this way reduces the burden as overwriting can be omitted.

(2) In the playback device in the present embodiment, the decoded picture data for the base-view is stored in the DPB 2818. The decoded picture for the base-view video stream needs not be stored in the DPB 2818 as it is not referred to. This allows for a reduction in the size of the DPB 2818 corresponding to the amount of memory used for storage of pictures from the base-view video stream.

(3) In the present embodiment, the transport stream is generated so as to include the base-view video stream, and pictures in the base-view video stream are then decoded. Decoding of the pictures in the base-view video stream, however, may be omitted.

The extended multi-view video decoder 2822 analyzes the header information (for example, acquires the POC, the picture type, the View ID, information on referencing, and the like) and reserves a region in the inter-view buffer 2816 for storage of one picture, without decoding pictures in the base-view video stream. The extended multi-view video decoder 2822 stores, in the region, the decoded pictures output from the 2D compatible video decoder that have the same PTS/DTS obtained by the analysis of the header information.

This allows for decoding of pictures to be skipped, thus reducing the overall burden of playback processing.

The 2D compatible video stream may be generated so as to include information necessary for performing inter-view reference from pictures in the dependent-view video stream to pictures in the 2D compatible video stream, i.e. information allowing the extended multi-view video decoder to manage the inter-view buffer 2816.

Specifically, all or a portion of the syntax elements of the base-view video stream is stored in the supplementary data in the 2D compatible video stream. That is to say, information for management of pictures in the inter-view buffer 2816 (in the case of MPEG-4 MVC, POC to indicate a presentation order, slice type to indicate the picture type, nal_ref_idc to indicate reference to/by a picture, ref_pic_list_mvc modification, which is information for creating a base reference picture list, the View ID of the base-view video stream, and MMCO commands) is stored in the supplementary data for each picture in the 2D compatible video stream.

If a structure to directly refer to data in the 2D compatible video stream from the dependent-view video stream is thus adopted, the base-view video stream need not be multiplexed into the transport stream.

Figure 3:
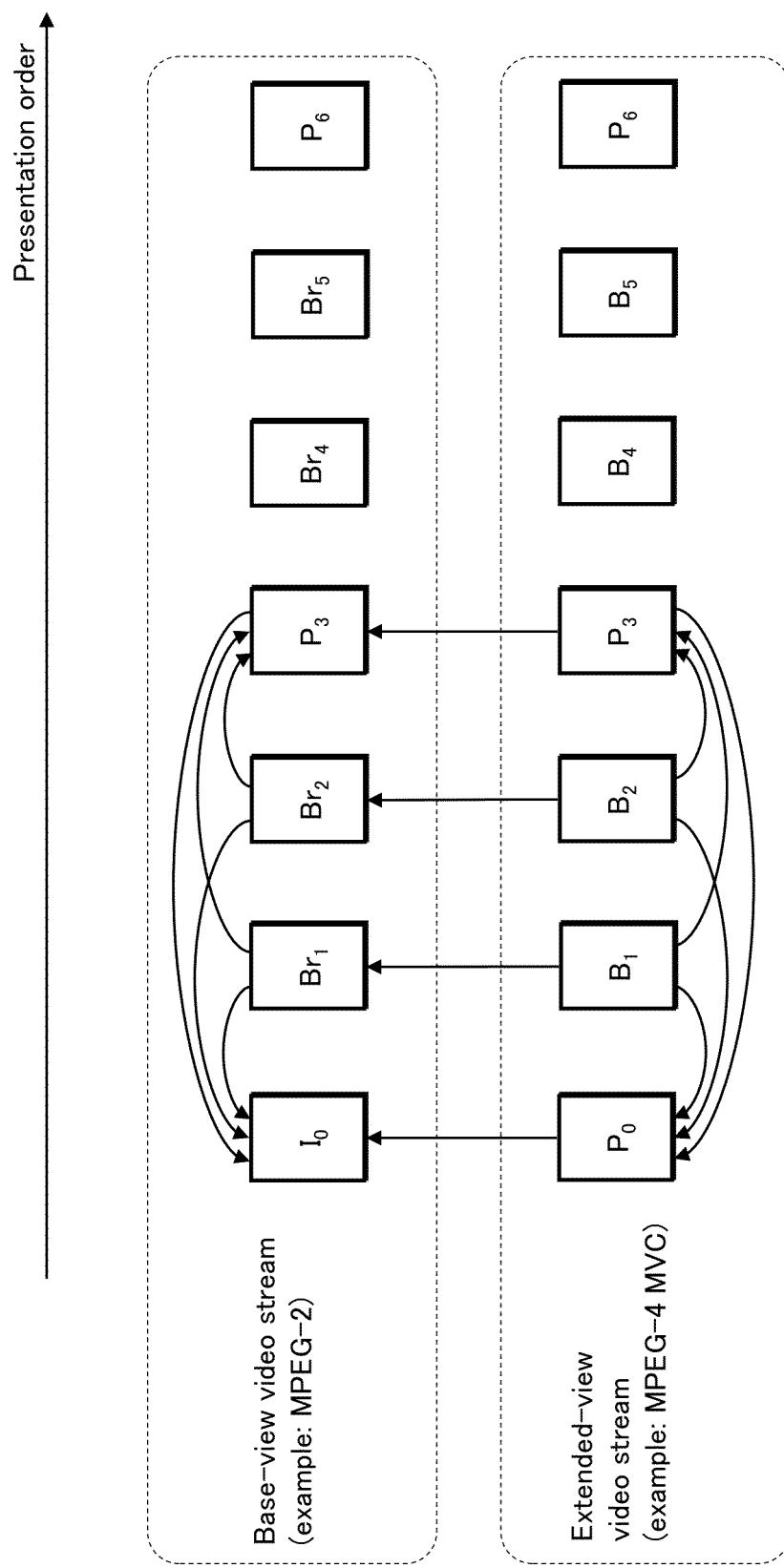
FIG. 3 illustrates picture reference in a case where a compression encoding method differs between base-view and dependent-view.

In this case, as illustrated in FIG. 3, pictures in the dependent-view video stream in the MPEG-4 MVC format directly refer to pictures in the video stream in the MPEG-2 format.

When the base-view video stream in the MPEG-4 MVC format is multiplexed into the transport stream, however, resulting data has a high affinity for the conventional encoding device and playback device supporting the MPEG-4 MVC format as the data format is substantially the same. Therefore, the encoding device and the playback device supporting the video stream data in the present embodiment can be implemented with a little improvement.

Figure 33:
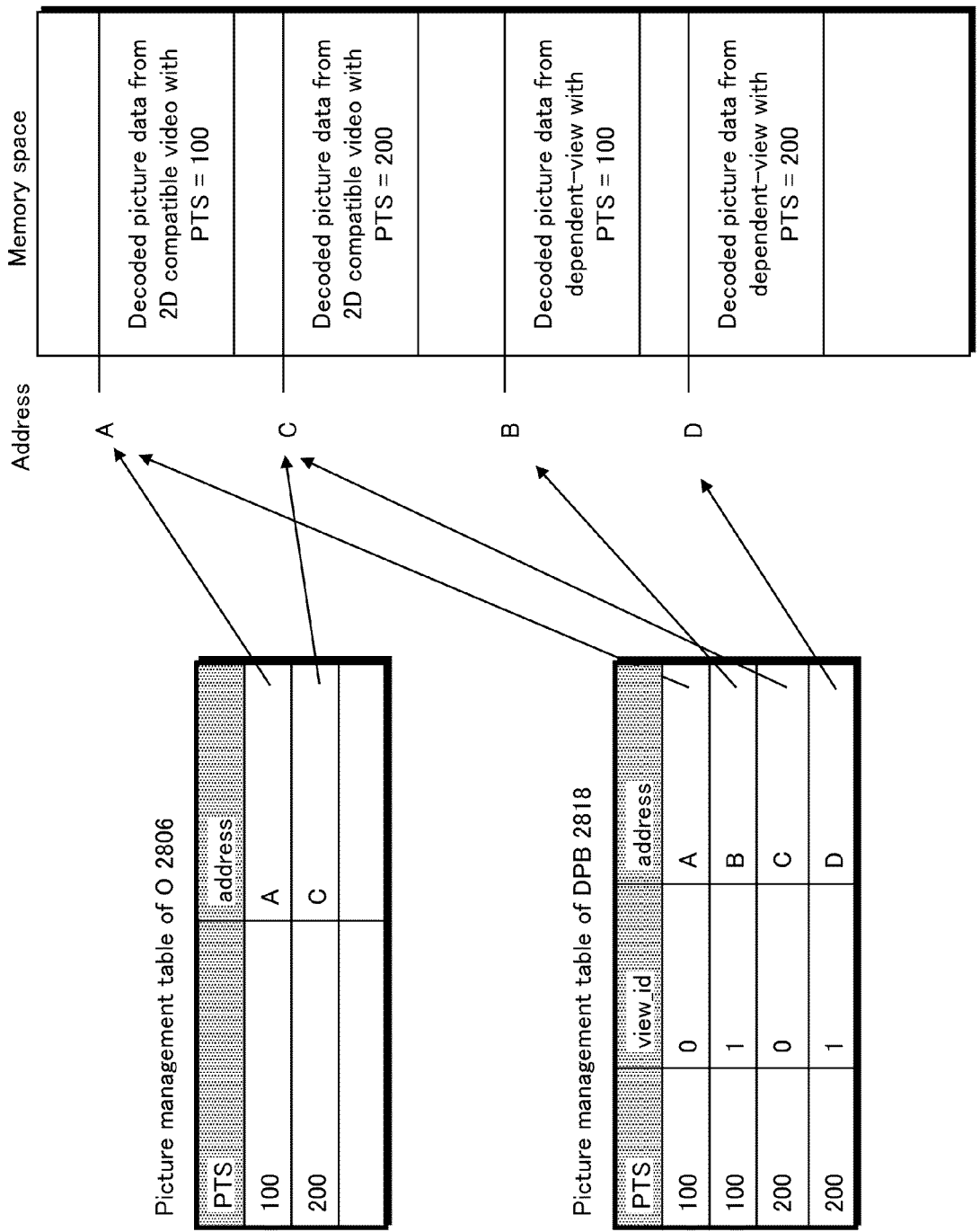
FIG. 33 illustrates a method of sharing a buffer in the playback device, pertaining to Embodiment 1, for playing back 3D video images.

(4) In the playback device in the present embodiment, the O 2806 and the DPB 2818 are treated as separate memory regions. As shown in FIG. 33, however, these may share the same memory space. For example, in the example shown in FIG. 33, 2D compatible video pictures respectively with PTS=100 and PTS=200 are overwritten in step S3003 with base-view pictures in the inter-view buffer 2816 that have the same PTS. In this case, data is stored in the DPB 2818 only by setting addresses of pictures to be referred to in the management table of the DPB 2818, and overwriting can be omitted. Specifically, in the example in FIG. 33, in the picture management table of the DPB 2816, the addresses of base-view (having the smallest View_ID value) pictures with PTS=100 and PTS=200 are configured to point to the addresses of decoded picture data for the 2D compatible video with PTS=100 and PTS=200 as pointed to by the addresses in the management table of the O 2806.

This structure allows for a reduction in the amount of memory used for storage of pictures.

(5) In the playback device in the present embodiment, the inter-view buffer 2816 and the DPB 2818 are treated as separate buffers, but these may be the same buffer. For example, if these buffers are consolidated in the DPB 2818, it suffices to replace the decoded pictures from the base-view video stream with the same PTS and same View ID within the DPB 2818 with the decoded pictures from the 2D compatible video stream.

(6) In compression encoding processing in the present embodiment, such constraint may be imposed that among a picture in the 2D compatible video stream, a picture in the base-view video stream having the same presentation time, and a picture in the dependent-view video stream having the same presentation time, if at least one picture is a B picture (including a Br picture), then the types of all of the picture in the 2D compatible video stream, the picture in the base-view video stream, and the picture in the dependent-view video stream having the same presentation time must be B pictures (including Br pictures). When a playback device performs trickplay by selecting only an I picture and a P picture, this structure facilitates processing for trickplay.

Figure 24:
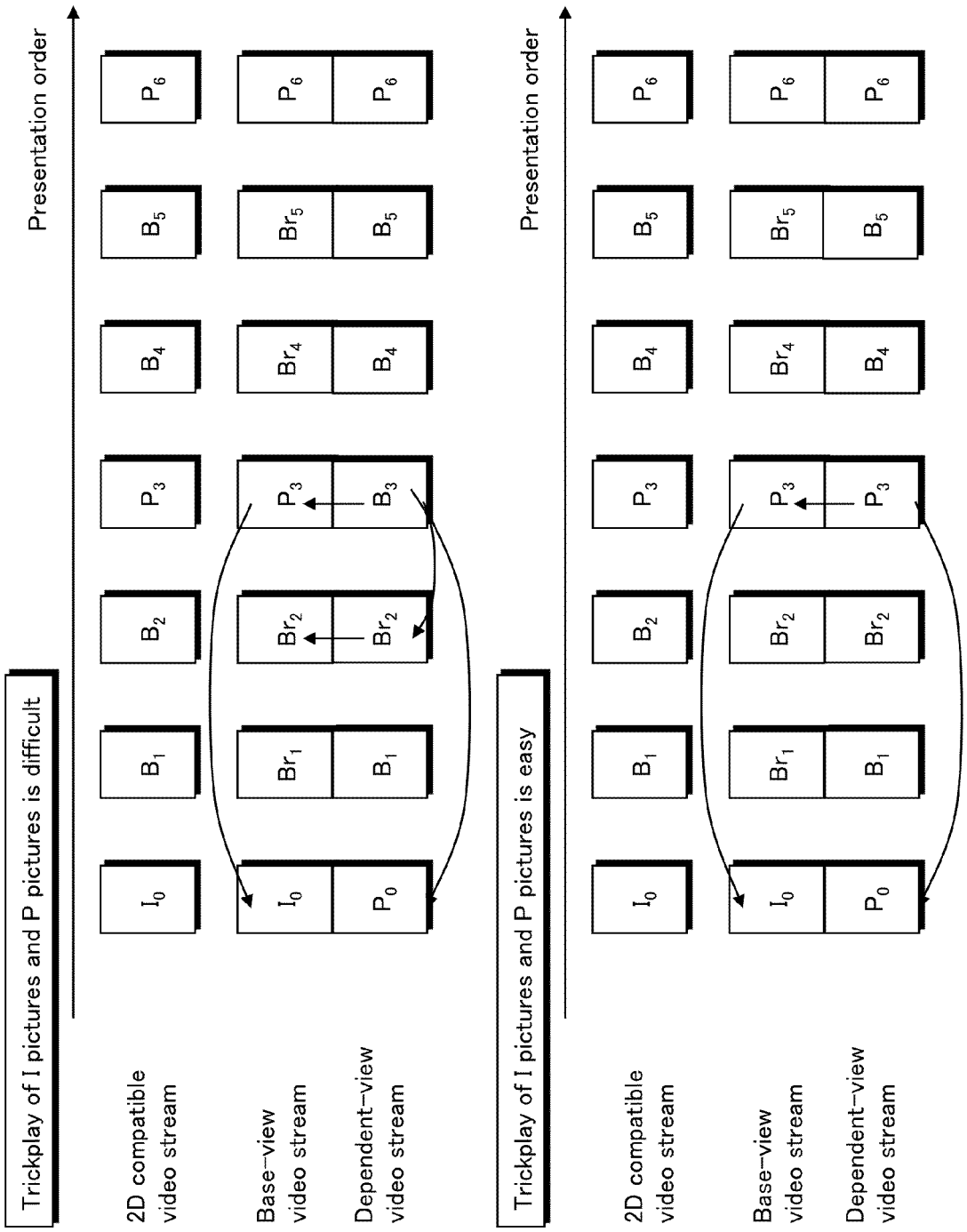
FIG. 24 illustrates a picture type relationship, among the 2D compatible video stream, the base-view video stream, and the dependent-view video stream, that is beneficial for facilitating trickplay.

FIG. 24 is used to describe the trickplay. The upper tier of FIG. 24 shows a case where the above constraint is not imposed. In this case, the third picture in the presentation order is a P picture ($P_3$) in the 2D compatible video stream and in the base-view video stream, whereas the third picture is a B picture ($B_3$) in the dependent-view video stream.

As a result, in order to decode the dependent-view video stream, it is necessary to decode the picture $Br_2$ in the dependent-view video stream as well as the picture $Br_2$ in the base-view video stream. On the other hand, the lower tier of FIG. 24 shows a case where the above constraint is imposed. In this case, the third picture in the presentation order is a P picture in all of the streams, i.e. the 2D compatible video stream, the base-view video stream, and the dependent-view video stream. It therefore suffices to decode only the I pictures and the P pictures in each of the video streams, thus facilitating trickplay processing that selects I pictures and P pictures.

(7) In the data creation device in the present embodiment, although the video streams are set to have different PIDs in multiplexing into the transport stream, the same PID may be allocated to the base-view video stream and the dependent-view video stream.

With this structure, in accordance with the specifications of the compression encoding method for the multi-view video stream, access units of the video streams may be merged and transferred.

Figure 45:
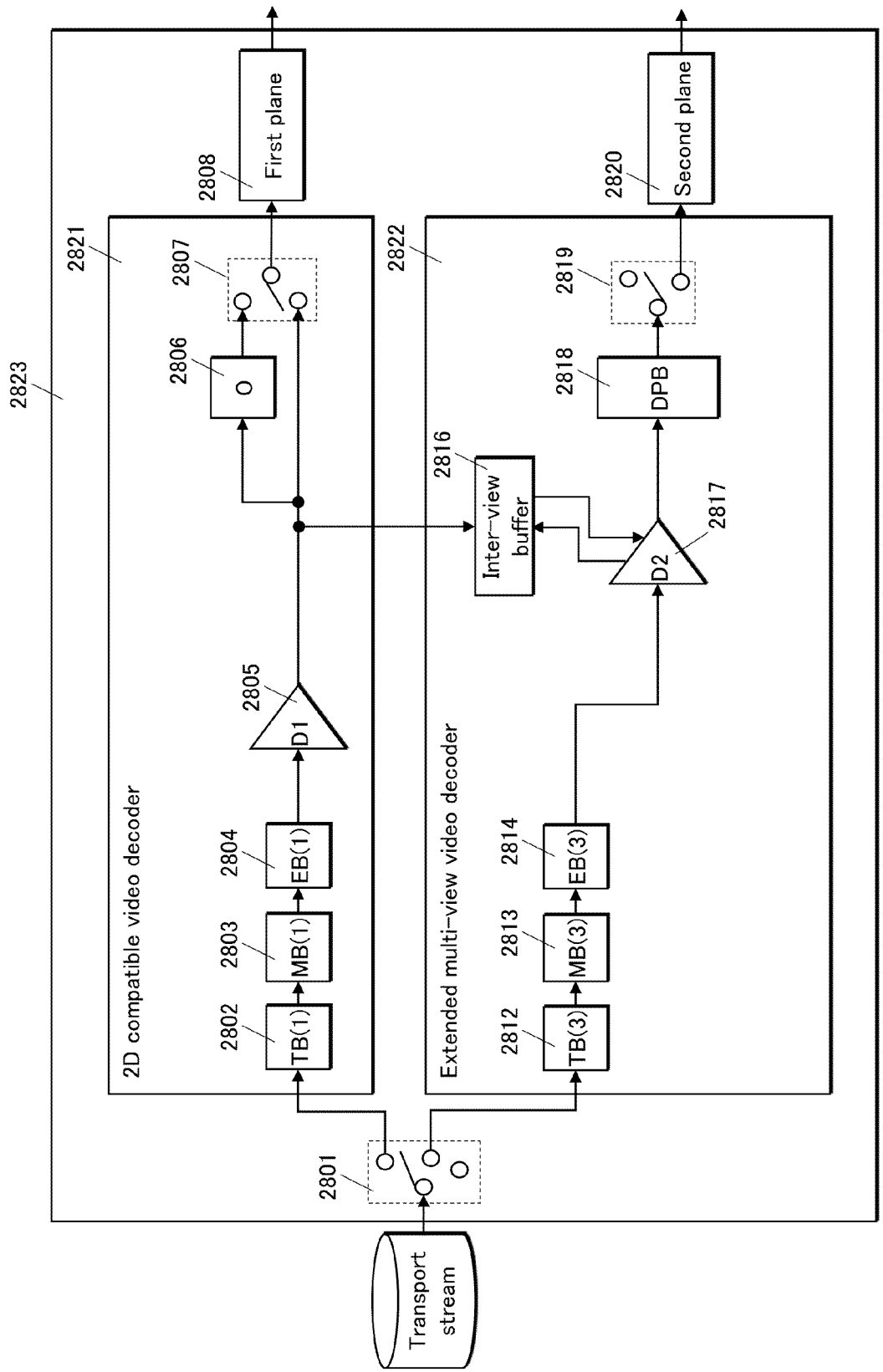
FIG. 45 is a block diagram showing the functional structure of the playback device, pertaining to the present embodiment, for playing back 3D video images in a case where a base-view video and a dependent-view video are transmitted in the same stream.

In this case, the base-view video stream and the dependent-view stream are merged in accordance with the specifications of the compression encoding method. The playback device then adopts a structure as shown in FIG. 45 to unify the data transfer line in the extended multi-view video decoder.

The base-view video stream and the dependent-view video stream may share header (e.g. a sequence header and a picture header) information of each access unit storing therein pictures at the same presentation time. That is to say, only the base-view video stream may be provided with the header information, and, when the dependent-view video stream is decoded, the header information necessary for decoding may be decoded while referring to the header information of the base-view video stream. Therefore, in the dependent-view video stream, addition of the header information necessary for decoding can be omitted.

(8) In the data creation device in the present embodiment, as described with reference to FIG. 23, the pictures in the 2D compatible video stream and the dependent-view video stream at the same presentation time are provided with the same DTS, and the pictures in the dependent-view video stream and the base-view video stream are also provided with the same DTS. The pictures in the video streams at the same presentation time, however, may not be provided with the same DTS. For example, as shown in FIG. 35, the DTS of the 2D compatible video stream may be set so that the 2D compatible video stream is decoded before the base-view/dependent-view video streams (for example, one frame before).

Adopting this structure allows for decoding of the 2D compatible video stream to be performed in advance, thus providing for leeway when overwriting the inter-view buffer or when decoding pictures in the dependent-view video stream.

Figure 35:
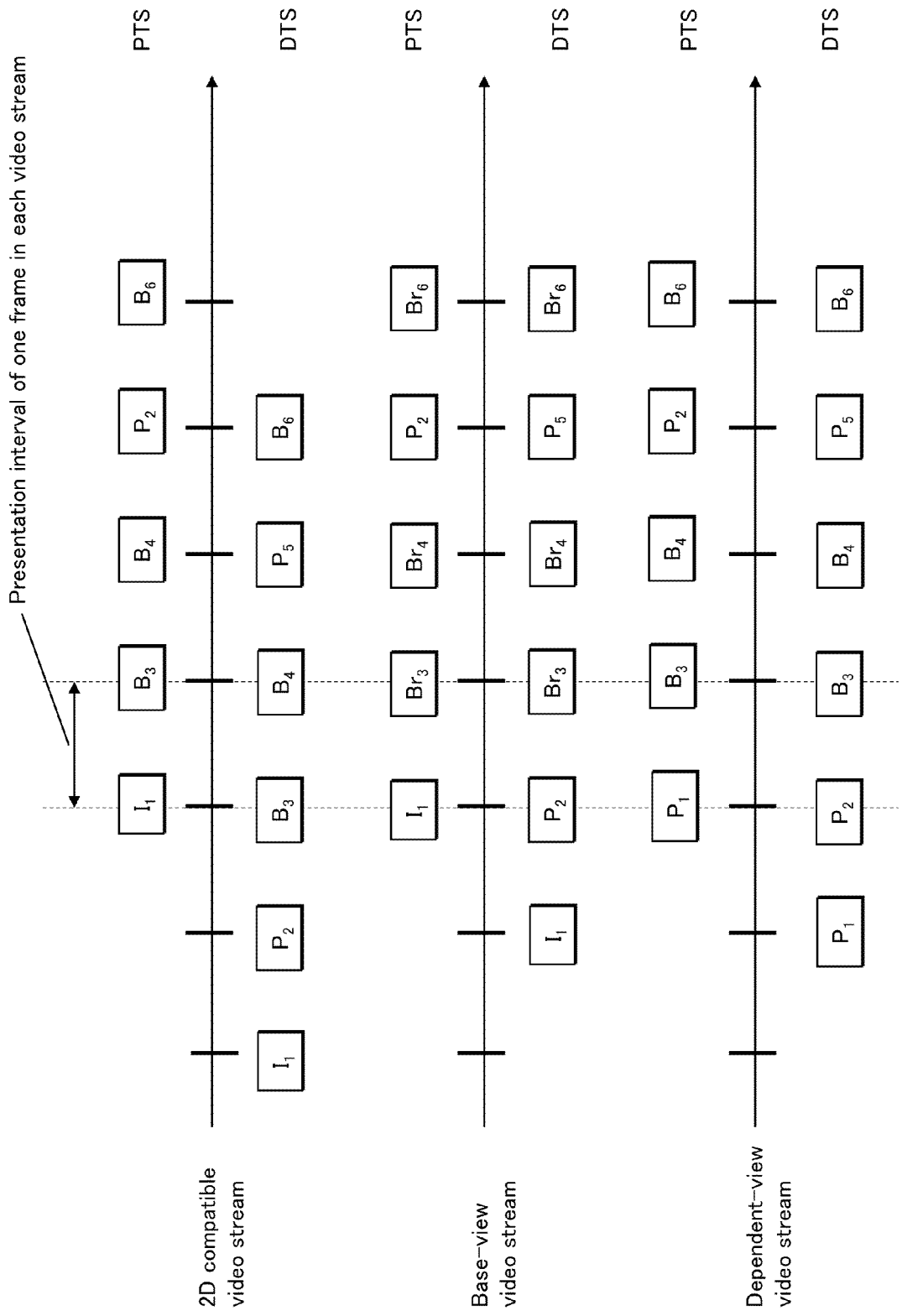
FIG. 35 illustrates a modification to a method of assigning the PTS and the DTS to the transport stream for 3D video images pertaining to Embodiment 1.

Note that, in FIG. 35, the PTS of the pictures in the 2D compatible video stream that store parallax images at the same presentation time have the same value as that of the PTS of the pictures in the dependent-view video stream. In order to perform decoding of the 2D compatible video stream in advance, however, the PTS of the pictures in the 2D compatible video stream that store parallax images at the same presentation time may be set to be before the base-view/dependent-view video streams (for example, one frame before).

If the value of the PTS is thus set differently between the 2D compatible video stream and the multi-view video stream, for example, by setting the PTS of pictures in the 2D compatible video stream to be one frame before the PTS of pictures in the dependent-view video stream, then when pictures of the base-view video stream in the inter-view buffer are replaced, pictures in the base-view video stream may be replaced with pictures in the 2D compatible video stream whose PTS is one frame less.

Note that even if the values of the PTS/DTS allocated to actual data are set as shown in FIG. 23, decoding processing may be configured to correct the values internally, so that the DTS/PTS of pictures in the 2D compatible video stream are moved up.

Figure 34:
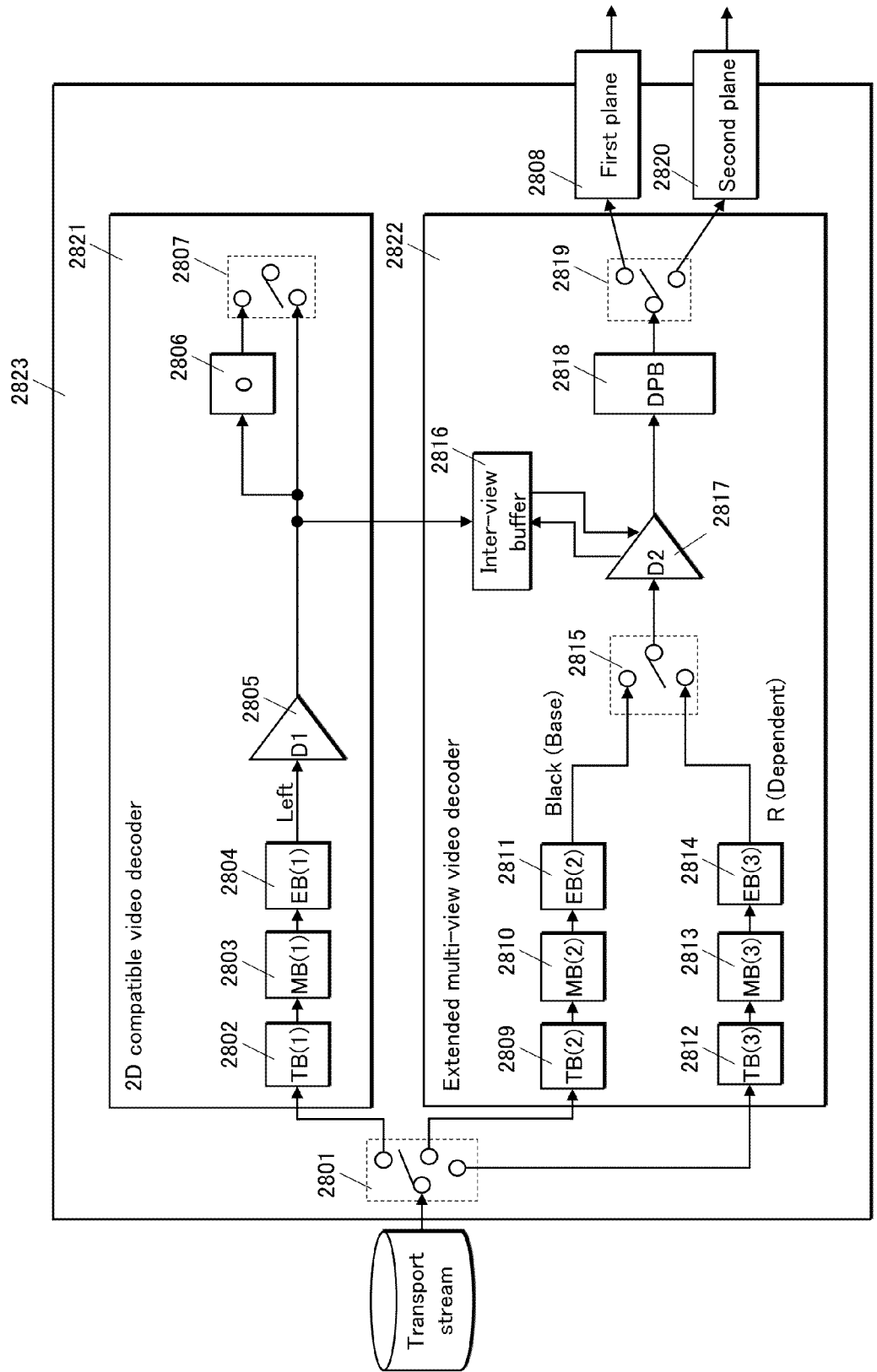
FIG. 34 illustrates a modification to video image output in the playback device, pertaining to Embodiment 1, for playing back 3D video images.

(9) In the playback device in the present embodiment, in step S3005, the 2D compatible video decoder 2821 outputs a decoded picture from the 2D compatible video stream to the first plane 2808 in accordance with each PTS. As shown in FIG. 34, however, the extended multi-view video decoder 2822 may output both video images using the output plane switch 2819.

Adopting this structure allows for direct use of the mechanism for plane output to play back 3D video images using the existing multi-view video stream.

(10) In the present embodiment, the multiplex format has been described as a transport stream, but the multiplex format is not limited in this way.

For example, the MP4 system format may be used as the multiplex format. A file multiplexed in MP4, as an input of FIG. 34, is separated into the 2D compatible video stream, the base-view video stream, and the dependent-view video stream and decoded. The pictures in the dependent-view video stream are decoded with reference to the pictures obtained by overwriting the pictures in the 2D compatible video stream with the pictures in the base-view video stream in the inter-view buffer 2816. While the MP4 system format does not involve PTSs, header information (stts, stsz, and the like) in the MP4 system format may be used to identify time information for each access unit.

(11) In the base-view video stream and the dependent-view video stream of the present embodiment, the pictures referred to by the dependent-view video stream are the decoded pictures for the 2D compatible video stream, which differs from the structure of a regular multi-view video stream. In this case, the stream type or the stream_id assigned to the PES packet header may be set to a different value than in a conventional multi-view video stream.

By adopting this structure, the playback device can determine the playback method for 3D video images in the present embodiment by referring to the stream type or the stream_id, and change the playback method accordingly.

(12) Described in the present embodiment is the playback format stored in the descriptor explained with reference to FIG. 38. The method of switching the playback format, however, may be achieved as shown in FIG. 40.

A playback device 2823b illustrated in FIG. 40 has basically the same structure as the playback device 2823 described with reference to FIG. 28. An inter-codec reference switch 2824, a plane selector 2825, and a third plane 2826, however, have been added to the playback device 2823b.

Figure 40:
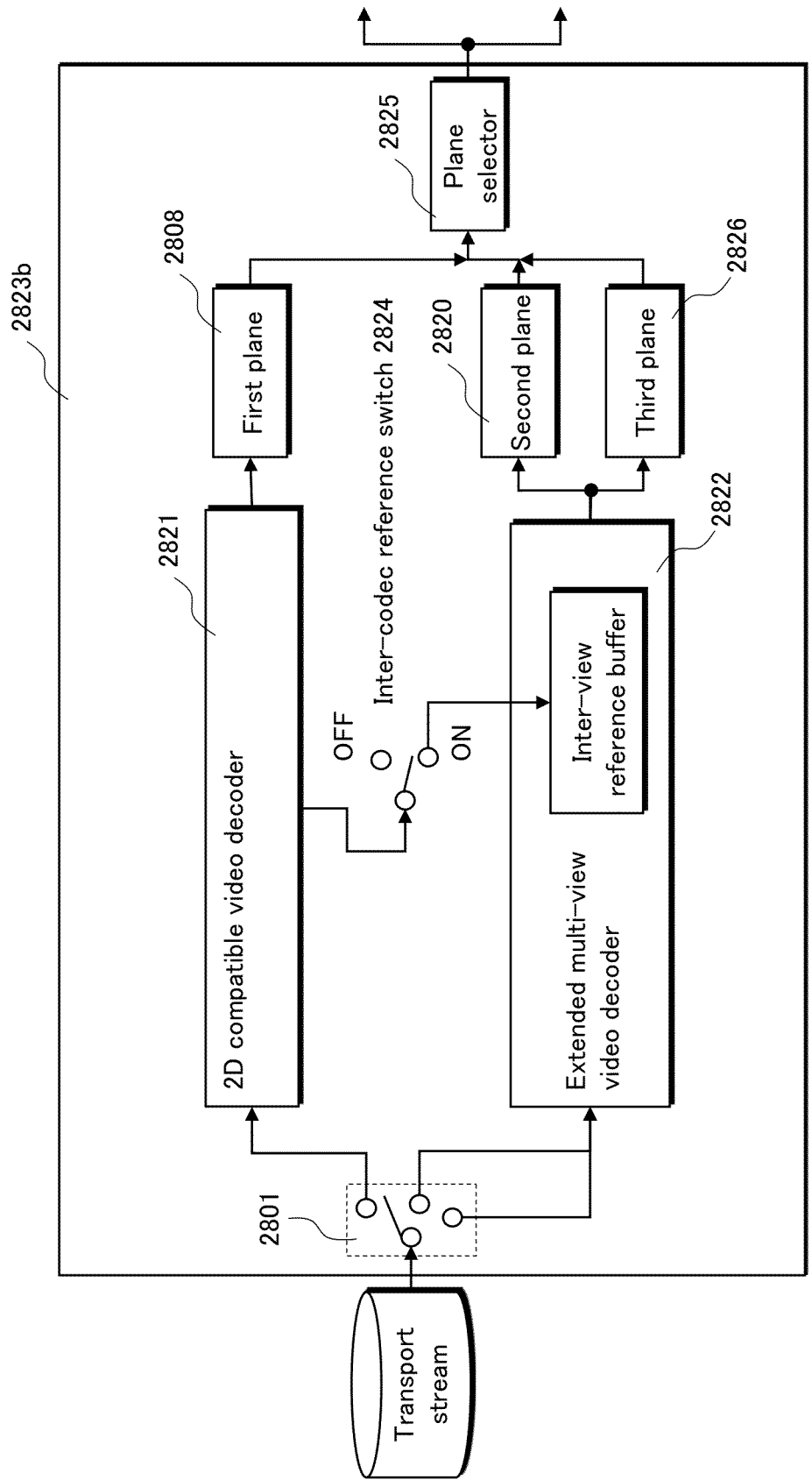
FIG. 40 illustrates a switching method that conforms to the playback format of the playback device, pertaining to the present embodiment, for playing back 3D video images.

When the inter-codec reference switch 2824 is ON as illustrated in FIG. 40, the data transfer described in step S3003 from the 2D compatible video decoder to the inter-view buffer in the extended multi-view video decoder is performed. When inter-codec reference switch 2824 is OFF, the data transfer is not performed.

The plane selector 2825 selects which of the following planes to output for the 2D video images, or left-view images or right-view images of 3D video images: the first plane 2808, to which the 2D compatible video decoder outputs pictures; the second plane 2820, to which the extended multi-view video decoder outputs pictures in the base-view video stream; and the third plane 2826, to which the extended multi-view video decoder outputs pictures in the dependent-view video stream.

By switching outputs by the inter-codec reference switch 2824 and the plane selector 2825 in accordance with the playback format, the playback device 2823b can change the playback mode.

A specific process to change the playback method for the example of the playback format in FIG. 38 is described with reference to FIG. 41.

Figure 41:
FIG. 41 illustrates the relationship among the playback format, an inter-codec reference switch, and a plane selector.

The lower tier of FIG. 41 shows ON-OFF switching performed by the inter-codec reference switch 2824 and examples of a plane selected by the plane selector 2825.

When the playback format is "0", the playback device 2823b turns the inter-codec reference switch 2824 OFF. The plane selector 2825 selects the first plane 2808 for 2D video images.

When the playback format is "1", the playback device 2823b turns the inter-codec reference switch 2824 ON. The plane selector 2825 selects the first plane 2808 or the second plane 2820 for left-view video images and the third plane 2826 for right-view video images.

When the playback format is "2", the playback device 2823b turns the inter-codec reference switch 2824 OFF. The plane selector 2825 selects the second plane 2820 for left-view video images and the third plane 2826 for right-view video images.

When the playback format is "3", the playback device 2823b turns the inter-codec reference switch 2824 OFF. The plane selector 2825 selects the first plane 2808 for left-view video images and the first plane 2808 for right-view video images.

Figure 42:
FIG. 42 illustrates a 2D transition interval for a smooth transition when switching the playback format.

(13) In the present embodiment, when a transport stream in which the playback format is switched from 3D video image playback using the 2D compatible video stream and the dependent-view video stream to 2D video image playback using the 2D compatible video stream is generated, as shown in FIG. 42, the same images as the 2D compatible video stream may be compression encoded in the dependent-view video stream at the point at which the playback format changes, considering delay in decoding. Such an interval during which the same images as the 2D compatible video stream are compression encoded in the dependent-view video stream is denoted as a 2D transition interval, as shown in the upper tier of FIG. 42. During the 2D transition interval, 2D video images are played back regardless of which format is used, thus presenting a smooth image transition to the viewer. The 2D transition interval may be adopted when transitioning from 2D video image playback to 3D video image playback. Furthermore, the 2D transition interval may be adopted when the value of "playback format" indicating the signaling information shown in FIG. 37 is switched from "0" to any of "1", "2", and "3".

(14) The value of temporal_reference, included in each picture in compression encoding in the MPEG-2 format to indicate the presentation order, may be configured to be the same as the POC of a picture in the dependent-view video stream having the same presentation time.

This allows for compression encoding and decoding of the video stream in the MPEG-2 format using values in the video ES, without using the PTS.

Furthermore, the POC of the dependent-view video stream having the same presentation time may be included in user data in each picture in the 2D compatible video stream.

This allows for the value of temporal_reference to be set independently, thus increasing the degree of freedom during compression encoding.

Figure 43:
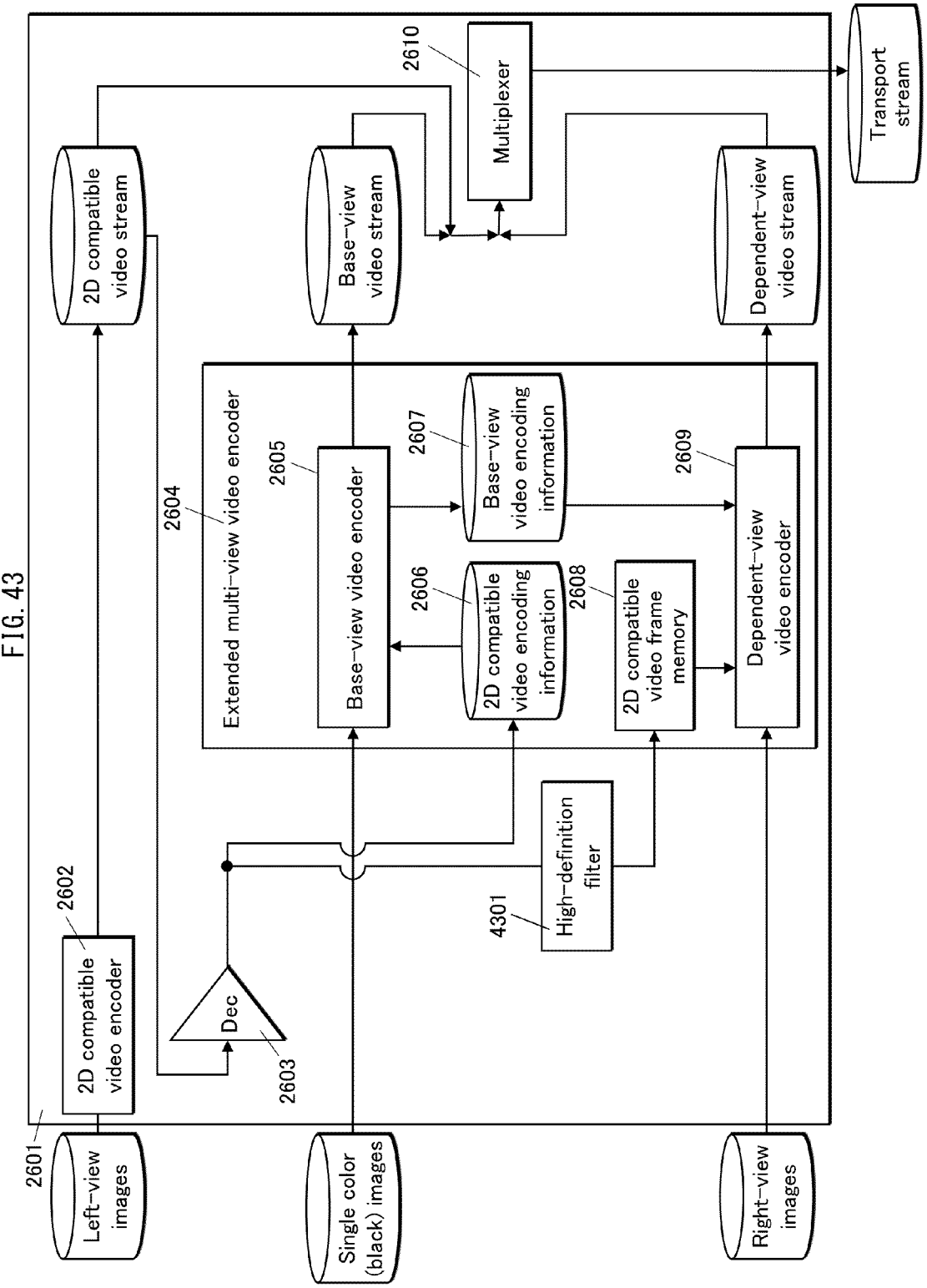
FIG. 43 is a block diagram showing the functional structure of an encoding device in a case where a high-definition filter is applied to the results of decoding the 2D compatible video stream.
Figure 44:
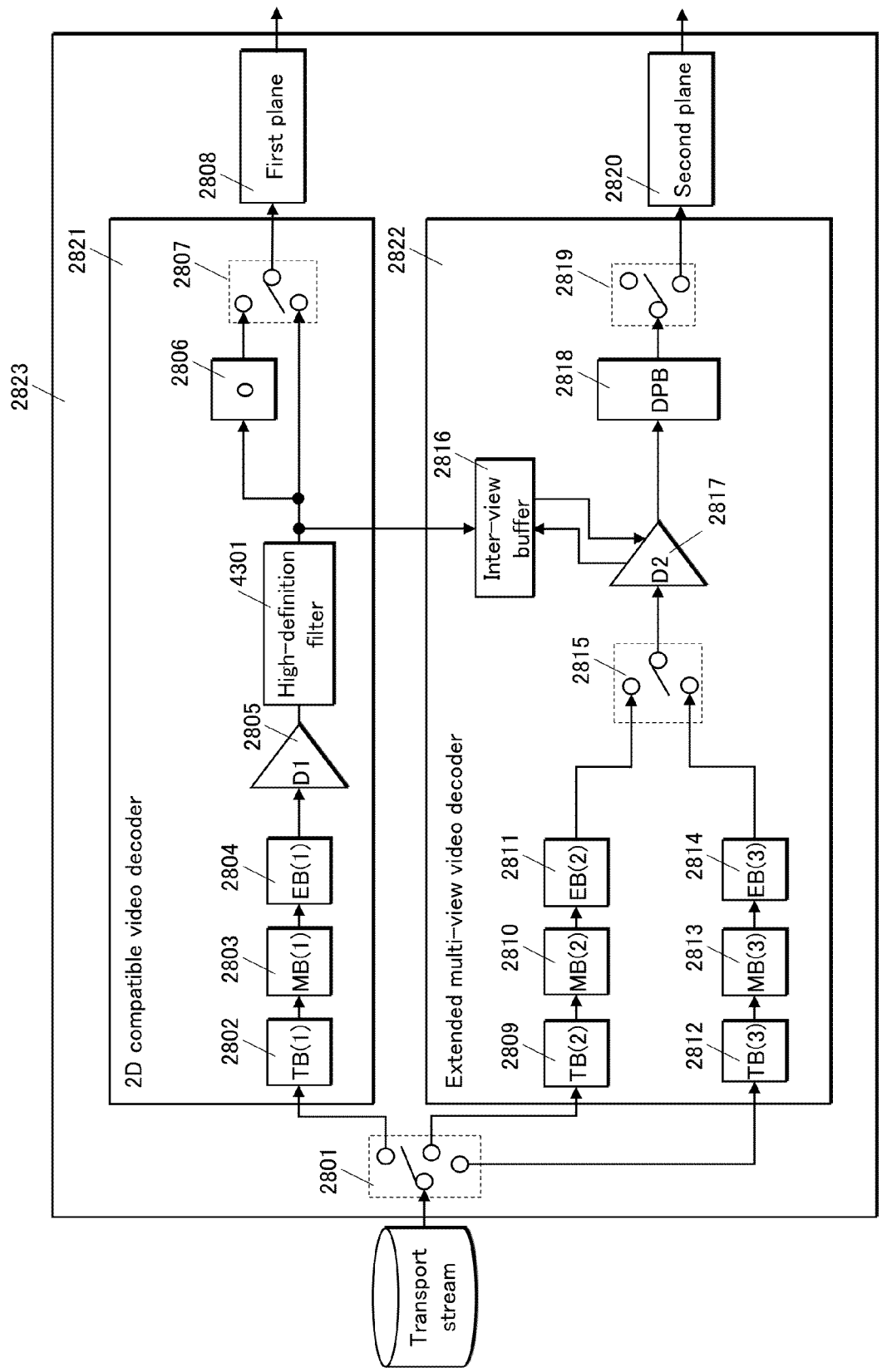
FIG. 44 is a block diagram showing the functional structure of a playback device in the case where a high-definition filter is applied to the results of decoding the 2D compatible video stream.

(15) In the present embodiment, a high-definition filter 4301 may be applied to the decoding results for the 2D compatible video stream, as shown in FIGS. 43 and 44.

The high-definition filter 4301 is, for example, a deblocking filter to reduce block noise as stipulated by MPEG-4 AVC. A flag is prepared to indicate whether the high-definition filter 4301 is applied. For example, when the flag is ON, the high-definition filter 4301 is applied, and, when the flag is set OFF, the high-definition filter 4301 is not applied.

The flag may be included in a descriptor of the PMT, in supplementary data of the stream, or the like.

If the flag is ON, the playback device applies the filter to the decoding results before transmitting data to the inter-view buffer 2816.

Adopting this structure increases definition of 2D video images in the 2D compatible video stream. Furthermore, decoding of the dependent-view video stream is performed while referring to the high-definition pictures. As a result, definition of 3D video images is also increased. Note that a plurality of high-definition filters 4301 may be adopted. Instead of a flag, the type of the filter may then be designated according to use.

(16) In the present embodiment, the case of one dependent-view video stream has been described, but there may be a plurality of dependent-view video streams.

In this case, the extended multi-view video stream may be configured to allow processing of a plurality of dependent-view streams. When replacing pictures in the inter-view buffer 2816 with pictures from the 2D compatible video stream, pictures in the base-view that have the same PTS may then be replaced. The 2D compatible video stream may be configured to specify the replaced View ID. In this way, the base-view pictures are not necessarily replaced; rather, pictures that are replaced may be selected from among a plurality of views.

(17) In the present embodiment, the 2D compatible video stream has been described as a video stream in the MPEG-2 format, and the multi-view video stream (the base-view video stream and the dependent-view video stream) as a video stream in the MPEG-4 MVC format, but the type of the compression encoding method is not limited to these examples.

The structures of the playback device and the data creation device of the present embodiment may be changed as necessary in accordance with the specifications of the compression encoding method. For example, if the 2D compatible video stream is in the MPEG-4 AVC format and the multi-view video stream is in a new compression encoding format, then the 0 2806 included in the playback device illustrated in FIG. 34 may be replaced with a DPB, and pictures in the inter-view buffer 2816 may be managed in accordance with the new compression encoding format.

(18) As an example of a method for viewing 3D video images using the video stream of the present embodiment, a method of having the viewer wear the 3D glasses provided with liquid crystal shutters has been described. The method of viewing 3D video images, however, is not limited to this method.

For example, a left-view picture and a right-view picture may be lined up in alternate rows within one screen to be displayed, and the picture may pass through a hog-backed lens, referred to as lenticular lens, on the display screen so that pixels constituting the left-view picture form an image for only the left eye, whereas pixels constituting the right-view picture form an image for only the right eye, thereby showing the left and right eyes a parallax picture perceived as 3D video images. Instead of using a lenticular lens, a device with a similar function, such as a liquid crystal element, may be used.

Another method referred to as a polarization method may be used. In the polarization method, a longitudinal polarization filter is provided for left-view pixels, and a lateral polarization filter is provided for right-view pixels, and the viewer looks at the display while wearing polarization glasses provided with a longitudinal polarization filter for the left eye and a lateral polarization filter for the right eye.

In implementing stereoscopic viewing using parallax images, a depth map that indicates a depth value for each pixel in a 2D video image may separately be prepared when a right-view image and a left-view image are prepared, and parallax images consisting of a left-view image and a right-view image may be generated based on the 2D video image and the depth map.

FIG. 4 schematically shows an example of generating parallax images consisting of a left-view image and a right-view image from a 2D video image and a depth map.

The depth map contains a depth value for each pixel in the 2D video image. In the example in FIG. 4, the depth map includes information indicating that the circular object in the 2D video image is on a near side (with a high depth value), whereas other regions are further than the circular object (with a low depth value). This information may be represented as a bit string for each pixel, or as a video image (such as a video image that is "black" to indicate a low depth value and "white" to indicate a high depth value). The parallax images can be created by adjusting the parallax amount of the 2D video image in accordance with the depth values in the depth map. In the example in FIG. 4, since the depth value of the circular object in the 2D video image is high, the parallax amount of the pixels for the circular object is set high when creating the parallax images. By contrast, since the depth value of the region other than the circular object is low, the parallax amount of the pixels is set low. A left-view image and a right-view image are then created. Stereoscopic viewing is possible by displaying these left-view and right-view images using the alternate frame sequencing method or the like.

(19) A part or all of the components constituting each of the above-mentioned devices may be composed of a single system LSI. The system LSI is a super-multifunctional LSI manufactured by integrating a plurality of components on a single chip, and is specifically a computer system including a microprocessor, ROM (Read Only Memory), and RAM (Random Access Memory). A computer program is stored in the RAM. By the microprocessor operating according to the computer program, the system LSI achieves its functions.

While referred to here as LSI, depending on the degree of integration, the terms IC (Integrated Circuit), system LSI, super LSI, or ultra LSI are also used.

A method of integration is not limited to LSI, and a dedicated circuit or a general-purpose processor may be used. A FPGA (Field Programmable Gate Array), which is LSI that can be programmed after manufacture, or a reconfigurable processor, which is LSI whose connections between internal circuit cells and settings for each circuit cell can be reconfigured, may be used.

Additionally, if technology for integrated circuits that replaces LSI emerges, owing to advances in semiconductor technology or to another derivative technology, the integration of functional blocks may naturally be accomplished using such technology.

(20) Each of the data creation device and the playback device described above may be a computer system including a microprocessor, ROM, RAM, and a hard disk unit. A computer program is stored in the RAM or the hard disk unit. By the microprocessor operating according to the computer program, each device achieves its functions. The computer program includes a combination of a plurality of instruction codes each instructing a computer to achieve a predetermined function.

(21) The present invention may be a method described above. The present invention may also be a computer program that causes a computer to achieve the method, or may be a digital signal including the computer program.

The present invention may also be a computer-readable recording medium, such as a flexible disk, a hard disk, a CD-ROM, an MO, a DVD, DVD-ROM, DVD-RAM, a BD (Blu-ray Disc) and semiconductor memory, having been recorded thereon the computer program or the digital signal. The present invention may be the computer program or the digital signal recorded on any of these recording media.

The present invention may also be implemented by transmitting the computer program or the digital signal via an electric communication line, a wireless or a wired communication line, a network represented by the interne, a data broadcast and the like.

(22) The above-mentioned embodiment and modifications may be combined with one another in an appropriate manner.

(23) The following describes the structures, modifications and effects of the data creation device and the playback device pertaining to one embodiment of the present invention.

(a) A data creation device pertaining to one embodiment of the present invention is a data creation device that performs compression encoding on first frame images chronologically showing a view from a first viewpoint and second frame images chronologically showing a view from a second viewpoint, including: a first encoding unit configured to generate a stream in an MPEG-2 format by performing compression encoding on the first frame images; a second encoding unit configured to generate a base-view video stream and a dependent-view video stream in a format conforming to an MPEG-4 MVC format; and a transmission unit configured to transmit the stream in the MPEG-2 format, the base-view video stream, and the dependent-view video stream, wherein the second encoding unit generates, for use as the base-view video stream, a stream of dummy data having the same number of frames as the stream in the MPEG-2 format and having a smaller total data amount than the stream in the MPEG-2 format, and generates, for use as the dependent-view video stream, a stream obtained by performing compression encoding on each frame of the second frame images, with reference to a frame of the stream in the MPEG-2 format to be presented at the same time as a frame of the base-view video stream corresponding to the frame of the second frame images.

The data creation device having this structure can achieve inter-view reference between video streams compression encoded with different encoding methods. With this structure, when the dependent-view video stream is decoded in the extended video stream constituting the 3D video images, the video stream enabling decoding of the extended video stream is generated with reference to a view in the 2D compatible video stream without referring to pictures in the base-view video stream. As a result, the video stream is generated with a reduced data amount while ensuring compatibility with the conventional compression encoding method.

(b) In the data creation device, the stream of dummy data may be generated by performing compression encoding on identical frame images.

In compression encoding of images in the MPEG-2 format and in the MPEG-4 MVC format, an efficiency of performing compression encoding on consecutive images having little difference is extremely high, thereby enabling compression encoding with a reduced data amount. Since the data creation device having this structure uses, as dummy data, data obtained by performing compression encoding on images that do not change over time, video streams can be generated with a reduced data amount of the base-view video stream.

(c) The identical frame images may be of a single color.

With this structure, since images of a single color (e.g. black with no brightness) are compression encoded, video streams can be generated with a reduced data amount.

(d) In the data creation device, the base-view video stream may be generated at a bit rate lower than a bit rate at which the stream in the MPEG-2 format is generated.

Since the data creation device having this structure uses a bit rate lower than a bit rate at which the dependent-view video stream is generated as a bit rate used for compression encoding for generating the base-view video stream, video streams can be generated with a reduced data amount of the base-view video stream.

(e) In the data creation device, the second encoding unit may set, as a value of a PTS (Presentation Time Stamp) of a picture constituting each frame of the dependent-view video stream, the same value as a PTS of a picture constituting a frame of the stream in the MPEG-2 format to be presented at the same time as a frame of the base-view video stream corresponding to the frame of the dependent-view video stream.

The data creation device having this structure can set the same value as values of PTSs of compression encoded pictures of corresponding frame images from the first viewpoint and from the second viewpoint. With this structure, correspondence relationships between pictures referred to in different compression encoding methods can easily be known, video streams can be generated so that inter-view reference is easily performed between video streams compression encoded in the different compression encoding methods.

(f) In the data creation device, compression encoding on the first frame images and on the second frame images may be performed with the same aspect ratio, and attribute information showing the same aspect ratio may be included in each of the stream in the MPEG-2 format, the base-view video stream, and the dependent-view video stream.

The data creation device having this structure can set the same aspect ratio as aspect ratios of the video streams generated in different compression encoding methods. With this structure, video streams can be generated so that conversion processing on reference images is simplified when decoding is performed using inter-view reference between video streams generated in different compression encoding methods.

(g) In the data creation device, the second encoding unit may set, as a value of a DTS of a picture constituting each frame of the dependent-view video stream, a value indicating a time that is N frames (N is an integer satisfying N≥1) after a time indicated by a DTS of a picture constituting a frame of the stream in the MPEG-2 format to be presented at the same time as a frame of the base-view video stream corresponding to the frame of the dependent-view video stream.

The data creation device having this structure can set values of the DTSs of pictures when corresponding frame images from the first viewpoint and from the second viewpoint are compression encoded so that a DTS of a picture of the second frame generated by performing compression encoding indicates a time that is N frames after a time indicated by a DTS of a picture of the first frame generated by performing compression encoding. Adopting this structure allows for decoding of reference pictures in the first stream data to be performed in advance when the dependent-view video stream is decoded, thus providing for leeway when overwriting the inter-view buffer or when decoding pictures in the second stream data.

(h) In the data creation device, the number of frames in each GOP (Group of Pictures) of each of the base-view video stream and the dependent-view video stream may be equal to the number of frames in each GOP of the stream in the MPEG-2 format including a frame to be presented at the same time as any of the frames in each GOP of each of the base-view video stream and the dependent-view video stream.

In the data creation device having this structure, the number of frame images in each GOP of the first stream data including frame images and the number of frame images in each GOP of the second stream data including corresponding frame images can be made identical. With this structure, since a picture at the top of each GOP from the first viewpoint corresponds to a picture at the top of each GOP from the second viewpoint with the same presentation time, video streams can be generated so that trickplay such as interrupt playback can easily be performed.

(i) In the data creation device, when a type of a picture constituting a frame of the stream in the MPEG-2 format is an I picture, a picture constituting a frame of the base-view video stream to be presented at the same time as the picture constituting the frame of the stream in the MPEG-2 format is an I picture.

In the data creation device having this structure, pictures in the first stream data and pictures in the second stream data with the same PTS can both be set as I pictures. Since the first stream and the second stream can be decoded at the time indicated by the same PTS of the I pictures, video streams can be generated so that decoding at the time of trickplay such as interrupt playback can easily be performed.

(j) A playback device pertaining to one embodiment of the present invention includes: an acquisition unit configured to acquire, from the data creation device pertaining to one embodiment of the present invention, the stream in the MPEG-2 format, the base-view video stream, and the dependent-view video stream; a first decoding unit configured to acquire the first frame images by decoding the stream in the MPEG-2 format; a second decoding unit configured to acquire the second frame images by decoding the base-view video stream, and by decoding each frame of the dependent-view video stream with reference to a frame of the stream in the MPEG-2 format to be presented at the same time as a frame of the base-view video stream corresponding to the frame of the dependent-view video stream; and a playback unit configured to play back the acquired first frame images and second frame images.

The playback device having this structure can decode the dependent-view video stream compression encoded in the MPEG-4 MVC format with reference to frame images generated by decoding the first stream data generated by performing compression encoding in the MPEG-2 format instead of referring to frame images generated by decoding the base-view video stream. Since the dependent-view video stream can be decoded with reference to images generated by decoding the video streams compression encoded in different methods, video streams can be played back with a reduced data amount as a whole while ensuring compatibility with the conventional compression encoding method.

(k) In the playback device, each frame of the dependent-view video stream may be decoded with reference to a frame of the stream in the MPEG-2 format including a picture whose PTS has the same value as a PTS of a picture constituting a frame of the second frame images.

The playback device having this structure can use, as reference images, pictures in the video stream from the first viewpoint compression encoded in the MPEG-2 format that are frame images generated by decoding pictures with the same PTS as pictures in the dependent-view video stream to be decoded, when the dependent-view video stream is decoded. Frame images from the second viewpoint can thus be reproduced with reference to frame images from the first viewpoint with the same presentation time.

<3. Supplemental Note>
<Video Compression Technology>
<2D Video Compression Technology>

The following briefly describes a method for encoding 2D video images in the MPEG-2 format and in the MPEG-4 AVC format (a compression encoding method based on which MPEG-4 MVC is achieved), which are the standards for compression encoding on 2D video images used in the data creation device and the playback device pertaining to the present embodiment.

These compression encoding methods utilize spatial and temporal redundancy in video in order to perform compression encoding on the amount of data.

One method for using redundancy to perform compression encoding is inter-picture predictive encoding. When a certain picture is encoded with inter-picture predictive encoding, a picture that has an earlier or later presentation time is used as a reference picture. The amount of motion as compared to the reference picture is detected, motion compensation is performed, and the difference between the motion compensated picture and the picture that is to be encoded is compressed.

Figure 1:
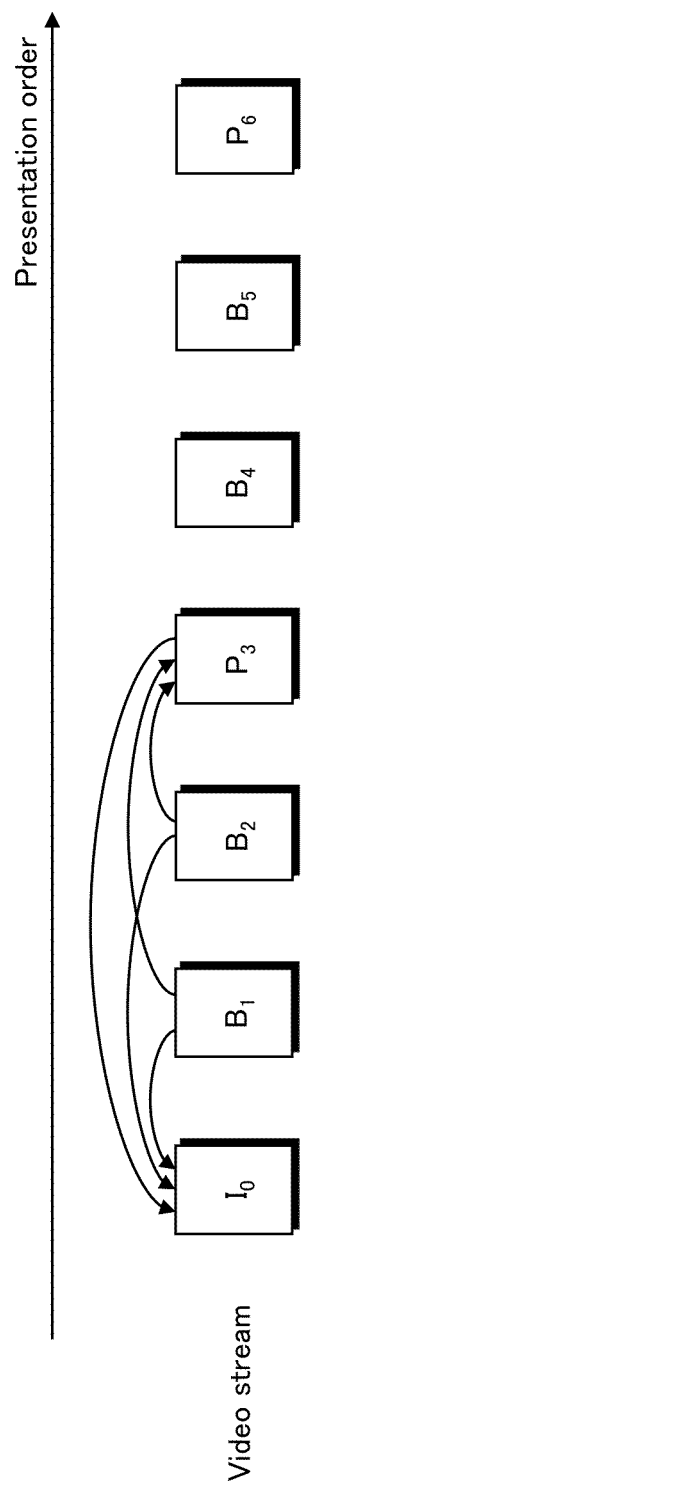
FIG. 1 illustrates reference relationships among pictures in a video stream.

FIG. 1 illustrates reference relationships among pictures in a video stream. In FIG. 1, picture $P_3$ is compression encoded with reference to $I_0$. Pictures $B_1$ and $B_2$ are compression encoded with reference to both $I_0$ and $P_3$. Using this sort of temporal redundancy allows for highly efficient compression encoding.

<3D Video Compression Technology>

Next, a method for playing back 3D video images on a display or the like by using parallax images, specifically a compression encoding method in the MPEG-4 MVC format as the multi-view encoding method, is briefly described.

In a method for stereoscopic viewing using parallax images, right-view images (R images) and left-view images (L images) are prepared, and stereoscopic viewing is achieved by presenting corresponding pictures to each of the right eye and the left eye.

Video constituted by left-view images is referred to as left-view video, and video constituted by right-view images is referred to as right-view video.

Figure 13:
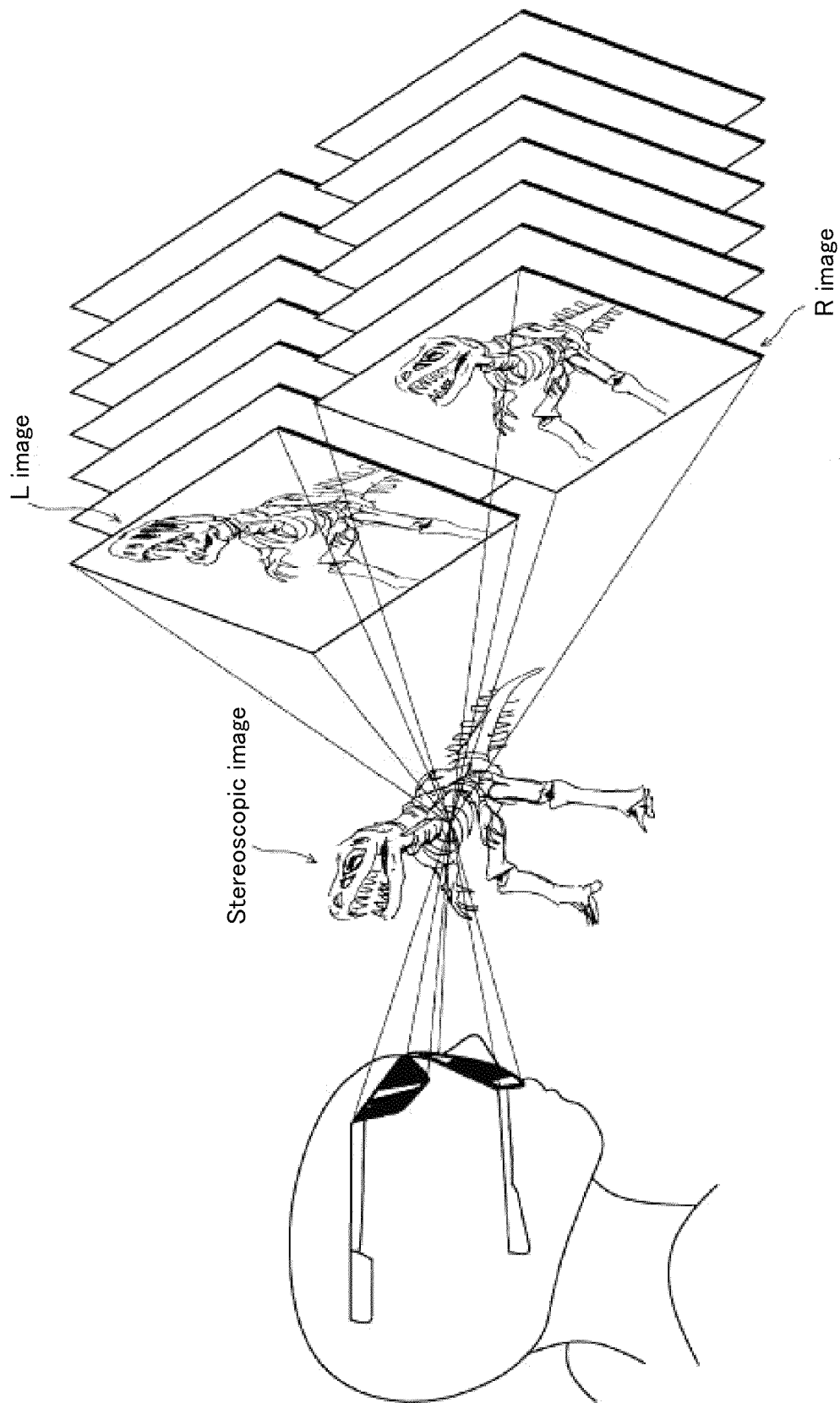
FIG. 13 shows an example of display of a stereoscopic video image.

FIG. 13 shows an example of display of a stereoscopic video image. FIG. 13 shows an example of displaying left-view images and right-view images of the skeleton of a dinosaur as a target object. By repeatedly transmitting and blocking light to the right and left eyes using 3D glasses, the left and right scenes are overlaid within the viewer's brain due to the afterimage phenomenon of the eyes, causing the viewer to perceive a stereoscopic image as existing along a line extending from the user's face.

3D video methods to perform compression encoding on left-view video and right-view video include a frame alternating method and a multi-view encoding method.

Figure 14:
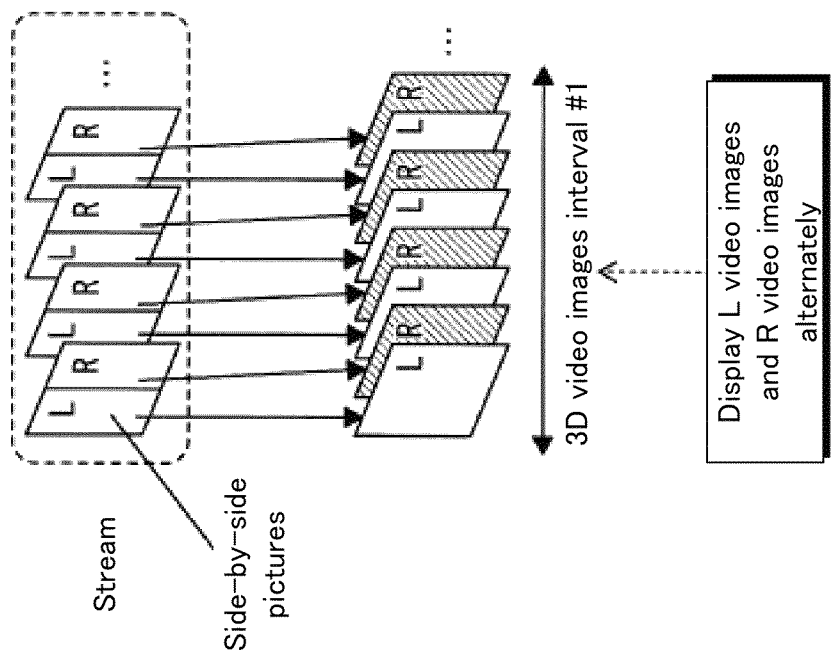
FIG. 14 is a conceptual diagram showing a Side-by-Side method.

In a frame alternating method, pictures corresponding to the left-view video and the right-view video are selectively discarded or compressed and combined into one picture to perform compression encoding. As an example, FIG. 14 shows the Side-by-Side method. In the Side-by-Side method, pictures corresponding to the left-view video and the right-view video showing a view at the same presentation time are compressed horizontally by a factor of ½ and are then placed side-by-side to form one picture. Video composed of the combined pictures is compression encoded in the 2D video image compression encoding method (e.g. MPEG-2), thus yielding a video stream. At the time of playback, the video stream is decoded based on the same compression encoding method as that used to generate the video stream. Each decoded picture is separated into left and right images, which are horizontally expanded by a factor of two to yield pictures corresponding to the left-view video and the right-view video. The resulting pictures of the left-view video (L images) and of the right-view video (R images) are alternately displayed to achieve stereoscopic images, as shown in FIG. 13.

In contrast, the multi-view encoding method is a method in which pictures of the left-view video and of the right-view video are separately compression encoded without being combined into a single picture.

In contrast, the multi-view encoding method is a method in which pictures of the left-view video and of the right-view video are separately compression encoded without being combined into a single picture.

Figure 2:
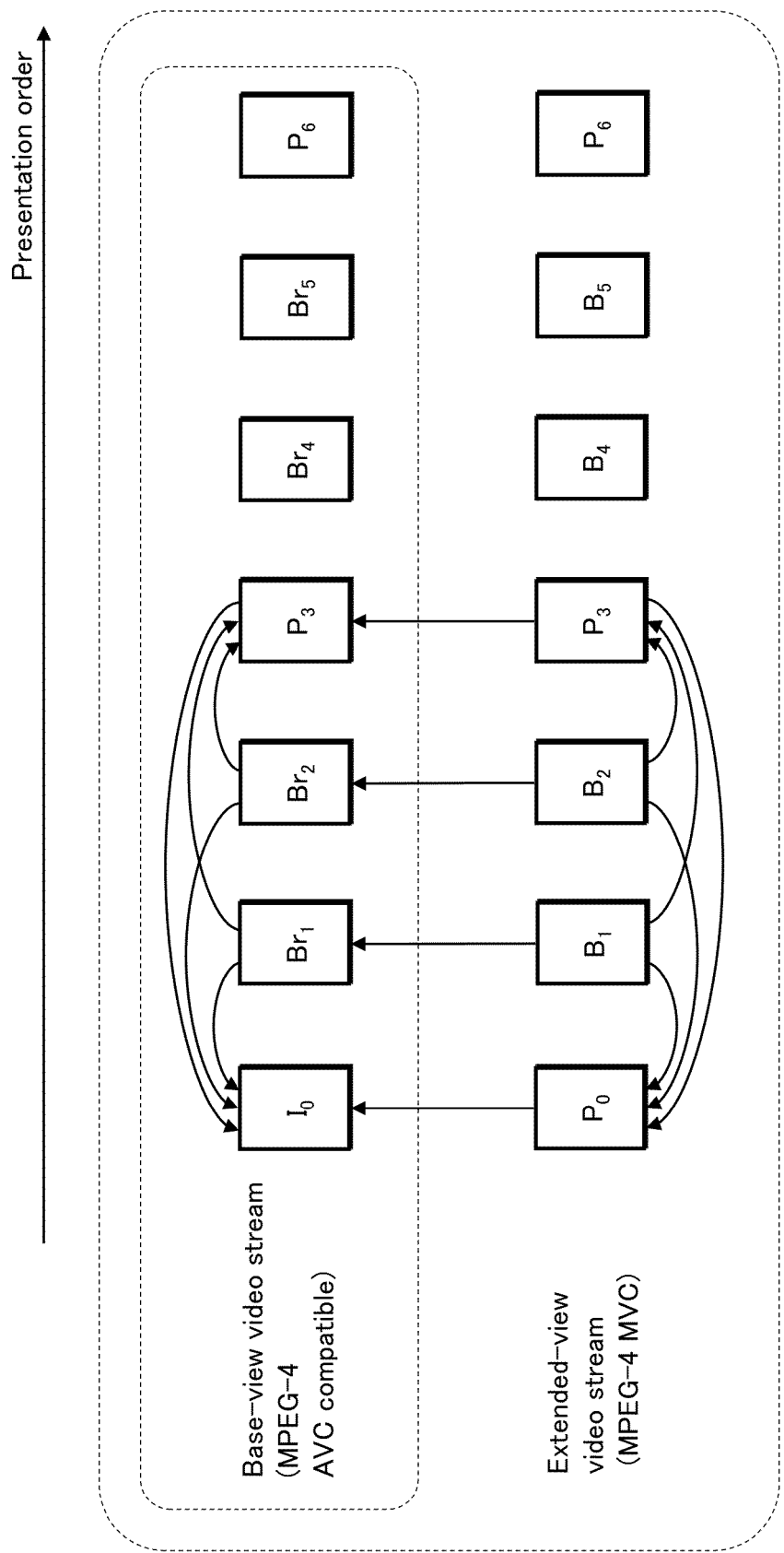
FIG. 2 illustrates a compression encoding method in the MPEG-4 MVC format.

FIG. 2 illustrates encoding in the MPEG-4 MVC format, which is the multi-view encoding method.

The video stream in the MPEG-4 MVC format includes a base-view video stream that can be played back by conventional devices for playing back video streams in the MPEG-4 AVC format and a dependent-view video stream that, when processed simultaneously with the base-view video stream, allows for playback of images from a different viewpoint.

The base-view video stream is compression encoded by inter-picture predictive encoding that only uses redundancy between images from the same viewpoint without referring to images from a different viewpoint, as shown by the base-view video stream in FIG. 2.

On the other hand, the dependent-view video stream is compression encoded by, in addition to the inter-picture predictive encoding that uses reference to an image from the same viewpoint, inter-picture predictive encoding that uses redundancy between images from different viewpoints.

Pictures in the dependent-view video stream are compression encoded with reference to pictures in the base-view video stream having the same presentation time.

The arrows in FIG. 2 show reference relationships. A picture $P_o$, which is the top P picture in the dependent-view video stream, refers to a picture $I_0$, which is an I picture in the base-view video stream. A picture $B_1$, which is a B picture in the dependent-view video stream refer to a picture $Br_1$, which is a Br picture in the base-view video stream. A picture $P_3$, which is the second P picture in the dependent-view video stream, refers to a picture $P_3$, which is a P picture in the base-view video stream.

Since the base-view video stream does not refer to pictures in the dependent-view video stream, the base-view video stream can be decoded and played back alone.

On the other hand, the dependent-view video stream is decoded with reference to the base-view video stream, and therefore the dependent-view video stream cannot be played back alone. The dependent-view video stream, however, is subjected to inter-picture predictive encoding by using a picture showing a view at the same time from a different viewpoint. Since right-view images and left-view images with the same presentation time generally have a similarity (are highly correlated with each other), and compression encoding is performed on the difference between the right-view images and left-view images, the amount of data in the dependent-view video stream can be greatly reduced as compared to the base-view video stream.

<Explanation of Stream Data>

Digital streams in the MPEG-2 transport stream format are used to transmit digital television broadcast waves or the like.

The MPEG-2 transport stream is a standard for transmission by multiplexing a variety of streams, such as video and audio. The MPEG-2 transport stream is standardized in ISO/IEC 13818-1 as well as ITU-T Recommendation H222.0.

Figure 6:
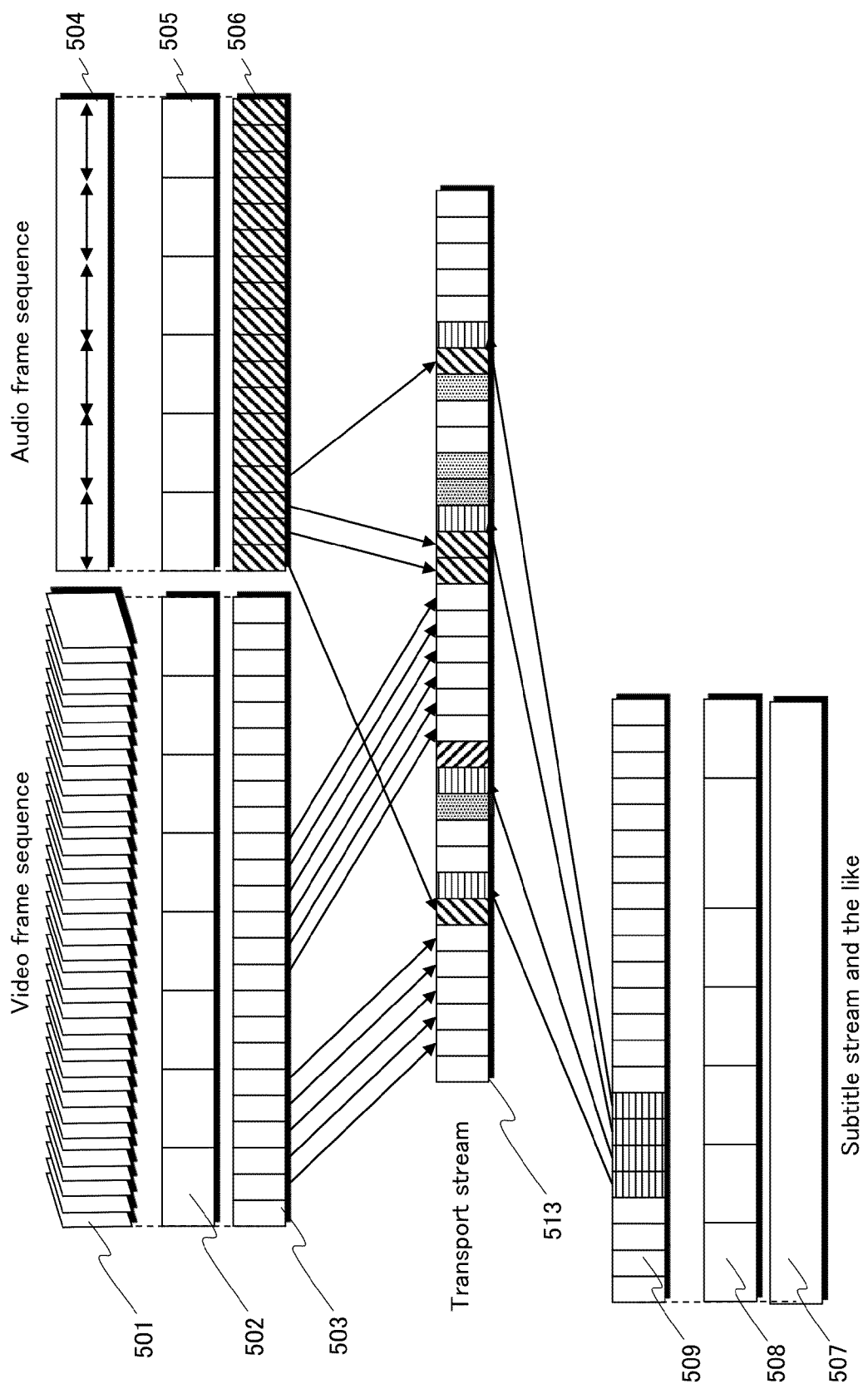
FIG. 6 is a conceptual diagram showing the structure of a digital stream in a transport stream format.

FIG. 6 shows the structure of a digital stream in the MPEG-2 transport stream format.

As illustrated in FIG. 6, a transport stream 513 is obtained by multiplexing a video TS (Transport Stream) packet 503, an audio TS packet 506, a TS packet 509 of a subtitle stream, and the like. Primary video for a program is stored in the video TS packet 503. Primary and secondary audio for the program is stored in the audio TS packet 506. Subtitle information for the program is stored in the TS packet 509 of the subtitle stream.

A video frame sequence 501 is compression encoded with a method such as MPEG-2, MPEG-4 AVC, or the like. An audio frame sequence 504 is compression encoded with an audio encoding method such as Dolby AC-3, MPEG-2 AAC, MPEG-4 AAC, HE-AAC, or the like.

Each stream stored in the transport stream is identified by a stream ID called a PID. A playback device can extract a target stream by extracting packets with the corresponding PID. The correspondence between PIDs and streams is stored in the descriptor of a PMT packet as described below.

In order to generate a transport stream, a video stream 501 composed of a plurality of video frames and an audio stream 504 composed of a plurality of audio frames are respectively converted into PES packet sequences 502 and 505. The PES packet sequences 502 and 505 are respectively converted into TS packets 503 and 506. Similarly, the data for a subtitle stream 507 is converted into a PES packet sequence 508, and then converted into TS packets 509. An MPEG-2 transport stream 513 is formed by multiplexing these TS packets into one stream. The PES packets and TS packets are described later.

<Data Structure of Video Stream>

The following describes the data structure of a video stream obtained by performing compression encoding on a video in the above-mentioned encoding method.

Figure 7:
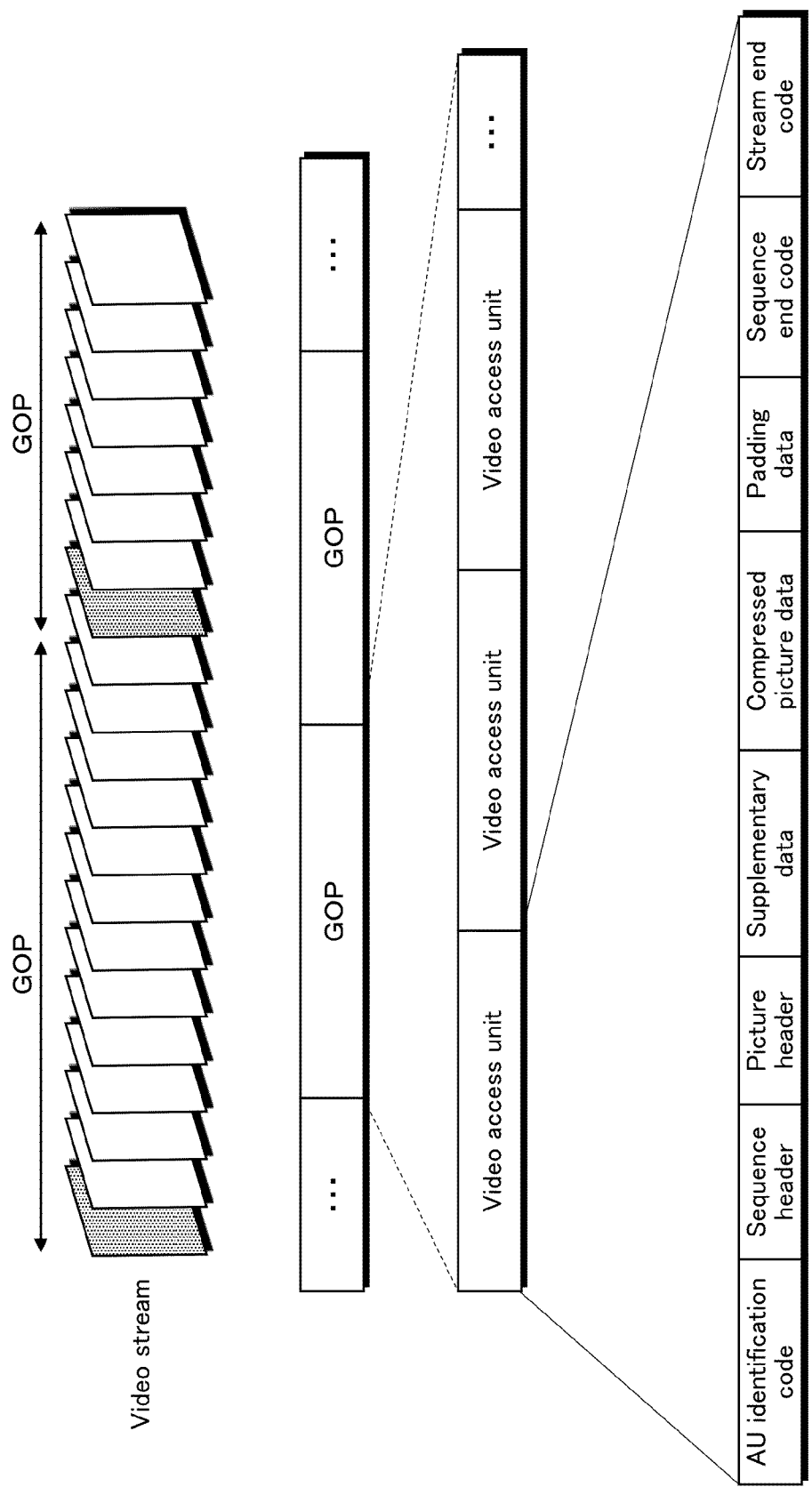
FIG. 7 is a conceptual diagram showing the structure of the video stream.

A video stream has a hierarchical structure as shown in FIG. 7. A video stream is composed of a plurality of Groups of Pictures (GOP). Using GOPs as the primary unit of encoding allows for moving images to be edited or randomly accessed.

A GOP is composed of one or more video access units. A video access unit is a unit of storage of compression encoded data in a picture, storing one frame in the case of a frame structure, and one field in the case of a field structure. Each video access unit includes an AU identification code, a sequence header, a picture header, supplementary data, compressed picture data, padding data, a sequence end code, a stream end code, and the like. In the case of MPEG-4 AVC, each piece of data is stored in a unit called an NAL unit.

The AU identification code is a starting code indicating the top of an access unit.

The sequence header stores information that is shared across a playback sequence composed of a plurality of video access units, specifically information such as a resolution, a frame rate, an aspect ratio, a bit rate, and the like.

The picture header stores information such as the encoding method of the entire picture.

The supplementary data is additional information not necessary for decoding of compressed picture data and for example stores closed caption text information to be displayed on a television in synchronization with a video, information on the GOP structure, and the like.

The compressed picture data stores data of a picture that has been compression encoded.

The padding data stores data for maintaining the format. For example, the padding data is used as stuffing data for maintaining a determined bit rate.

The sequence end code is data indicating the end of a playback sequence.

The stream end code is data indicating the end of the bit stream.

The structure of the AU identification code, the sequence header, the picture header, the supplementary data, the compressed picture data, the padding data, the sequence end code, and the stream end code varies by video encoding method.

For example, in the case of MPEG-4 AVC, the AU identification code corresponds to an AU (Access Unit) Delimiter, the sequence header to a SPS (Sequence Parameter Set), the picture header to a PPS (Picture Parameter Set), the compressed picture data to a plurality of slices, the supplementary data to SEI (Supplemental Enhancement Information), the padding data to Filler Data, the sequence end code to an End of Sequence, and the stream end code to an End of Stream.

For example, in the case of MPEG-2, the sequence data corresponds to sequence_Header, sequence_extension, and group_of_picture_header. The picture header corresponds to picture_header and picture_coding_extension. The compressed picture data corresponds to a plurality of slices. The supplementary data corresponds to user_data, and the sequence end code to sequence_end_code. There is no AU identification code, but the dividing line between access units can be determined using the start code of the various headers.

Not all of these data are always necessary. For example, a structure may be adopted in which the sequence header is only necessary in a video access unit at the top of a GOP and may be omitted from other video access units. A picture header may be omitted from a video access unit, with reference being made to the picture header of the previous video access unit in the encoding order.

Figure 16:
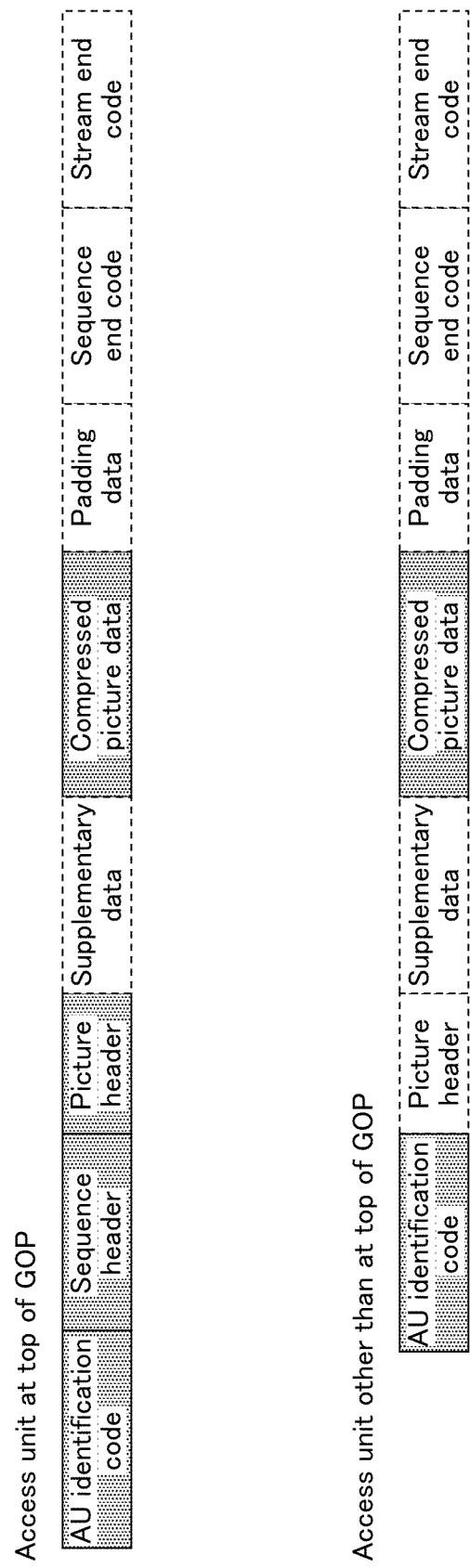
FIG. 16 is a conceptual diagram showing the internal structure of an access unit in the video stream.

As shown in FIG. 16, the video access unit at the top of a GOP stores data of an I picture as compressed picture data and always includes the AU identification code, the sequence header, the picture header, and the compressed picture data. The video access unit at the top of a GOP may also store the supplementary data, the padding data, the sequence end code, and the stream end code if necessary. Video access units other than at the top of a GOP always store the AU identification code and the compressed picture data and may store the supplementary data, the padding data, the sequence end code, and the stream end code if necessary.

Figure 10:
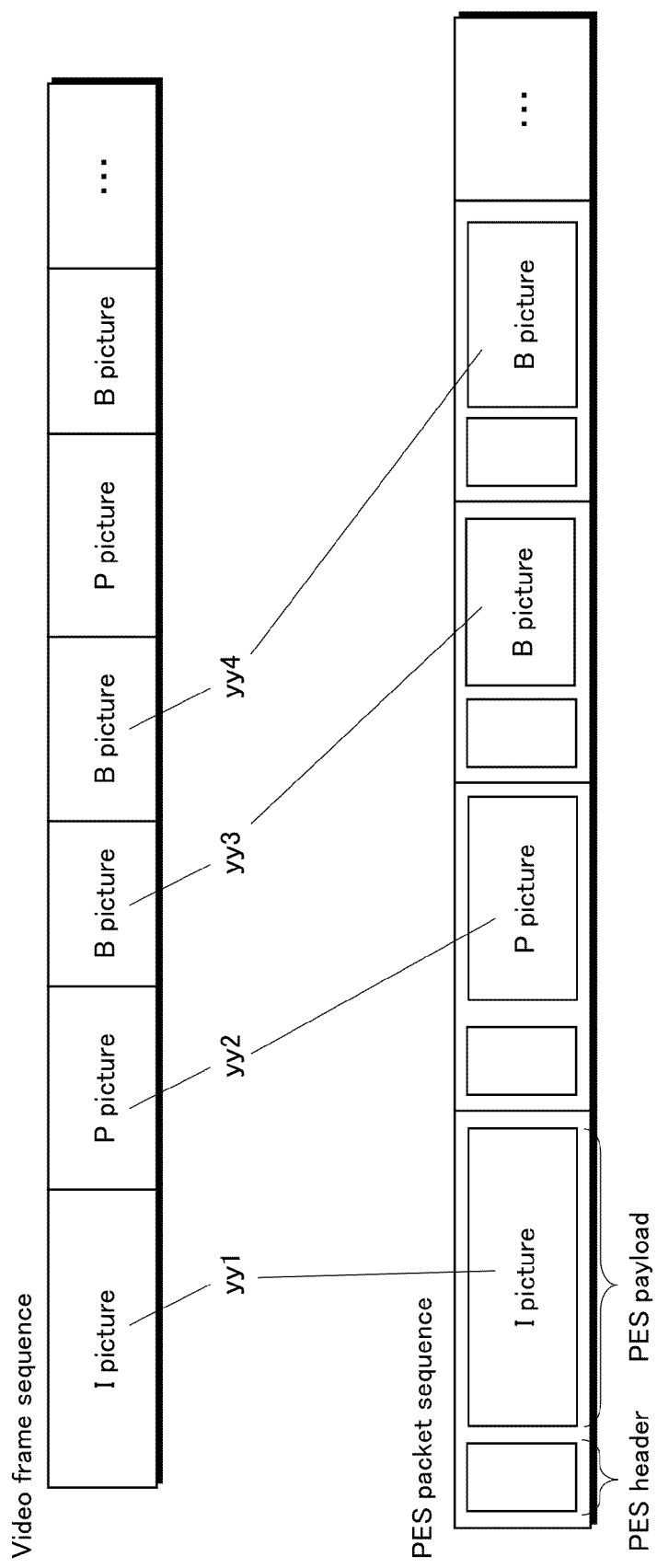
FIG. 10 is a conceptual diagram showing the structure of a PES packet.

FIG. 10 shows how video streams are stored in a PES packet sequence.

The first tier in FIG. 10 shows a video frame sequence in the video stream. The second tier shows a PES packet sequence.

As shown by the arrows yy1, yy2, yy3, and yy4 in FIG. 10, the I picture, B pictures, and P pictures, which are a plurality of Video Presentation Units in the video stream, are separated picture by picture and stored in the payload of a PES packet. Each PES packet has a PES header storing a PTS, which is the presentation time of the picture, and a DTS, which is the decoding time of the picture.

Figure 11:
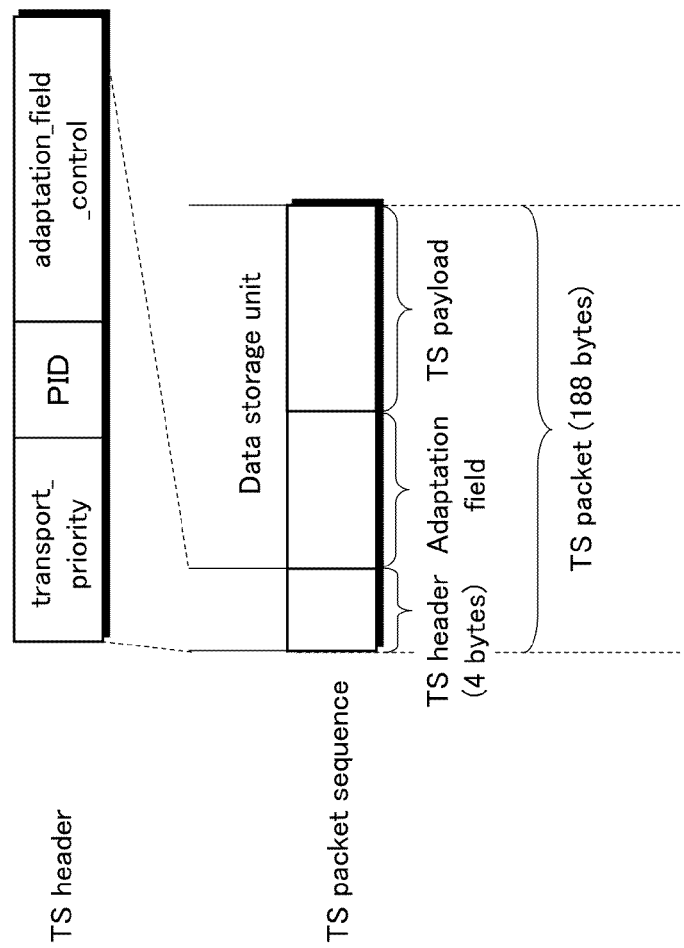
FIG. 11 illustrates the data structure of TS packets constituting a transport stream.

FIG. 11 illustrates the data structure of TS packets constituting a transport stream.

Each TS packet has a fixed length of 188 bytes and is composed of a 4 byte TS header, an adaptation field, and a TS payload. The TS header is composed of a transport_priority, a PID, an adaptation_field_control, and the like. The PID is an ID identifying the stream multiplexed in the transport stream, as described above.

The transport_priority identifies the type of packet among TS packets with the same PID.

The adaptation_field_control is information for controlling the structure of the adaption field and the TS payload. It may be the case that only one of the adaptation field and the TS payload may exist, or that both exist. The adaptation_field_control indicates which is the case.

When the adaptation_field_control is 1, only the TS payload exists. When the adaptation_field_control is 2, only the adaptation field exists. When the adaptation_field_control is 3, both the TS payload and the adaptation field exist.

The adaptation field is a storage area for information such as a PCR (Program Clock Reference) and for data for stuffing the TS packet to reach the fixed length of 188 bytes. A PES packet is divided up and stored in a TS payload.

Other than TS packets of the video, audio, subtitle, and other streams, the transport stream also includes TS packets of a PAT (Program Association Table), a PMT, a PCR, and the like. These packets are referred to as PSI (Program Specific Information).

The PAT indicates what the PID of a PMT used in the transport stream is. The PID of the PAT itself is registered as 0.

Figure 12:
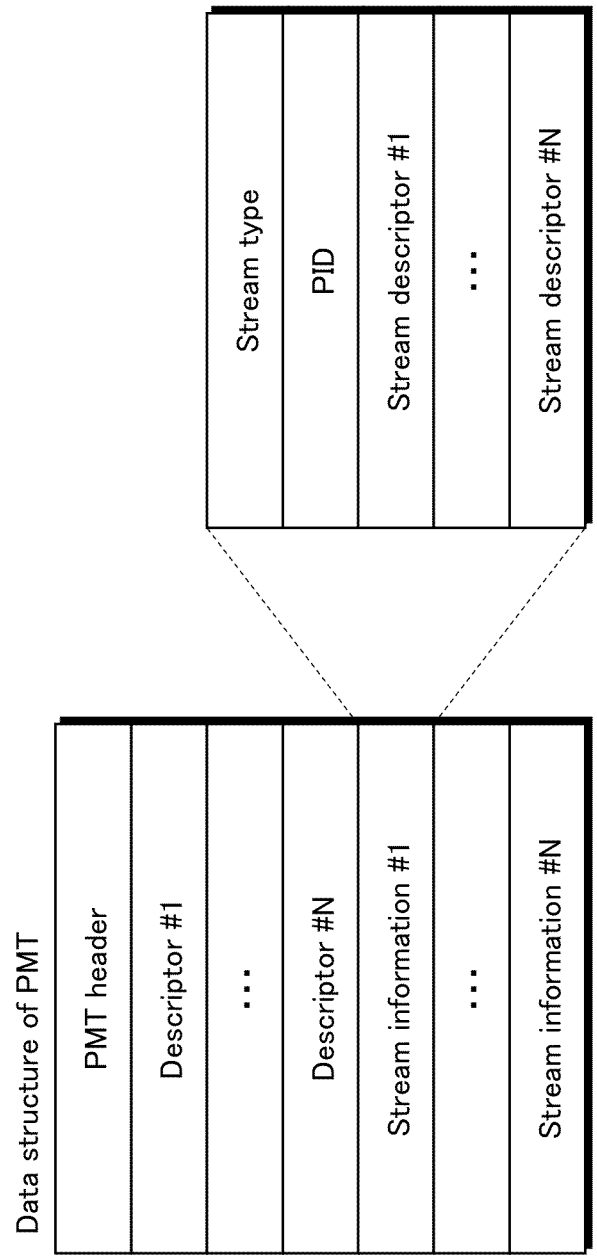
FIG. 12 illustrates the data structure of a PMT.

FIG. 12 illustrates the data structure of a PMT.

The PMT lists PMT headers, various descriptors related to the transport stream, and stream information related to each video, audio, subtitle, and other streams included in the transport stream.

Information of the length of data included in the PMT and the like are recorded on the PMT header.

The descriptors related to the transport stream include, for example, copy control information indicating whether or not copying of each video and audio stream is permitted.

Each piece of stream information is composed of a stream type indicating the compression encoding method or the like of the stream, the PID of the stream, and stream descriptors listing attribute information of the stream (the frame rate, the aspect ratio, and the like).

In order to synchronize the arrival time of TS packets to the decoder with the STC (System Time Clock), which is the time axis for the PTS/DTS, the PCR includes information on the STC time corresponding to the time at which the PCR packet was transferred to the decoder.

In the encoding in the MPEG-2 format and in the MPEG-4 MVC format, an actually displayed region within a compression encoded frame region may be changed.

When pictures of the dependent-view video stream in the MPEG-4 MVC format are decoded while referring to pictures of the video stream in the MPEG-2 format by inter-view reference, it is necessary to adjust the attribute information so that the same cropping region and scaling are shown in a view at the same presentation time.

Next, the cropping region information and the scaling information are described with reference to FIG. 8.

Figure 8:
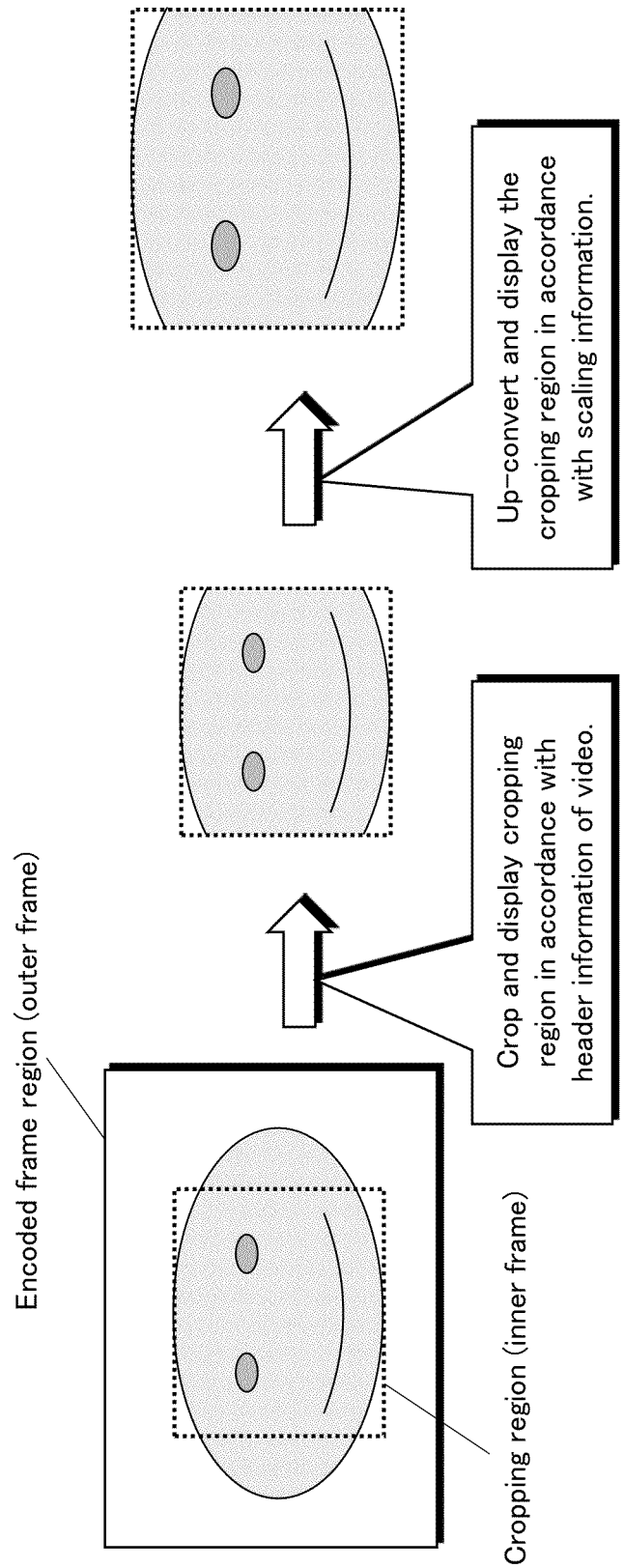
FIG. 8 is a conceptual diagram showing cropping region information and scaling information.

As shown in FIG. 8, the region actually displayed may be specified as a cropping region within the compression encoded frame region. For example, in the case of MPEG-4 AVC, this region is specified using the frame_cropping information stored in the SPS. As shown to the left in FIG. 9, the frame_cropping information specifies the top, bottom, left, and right crop amounts as a top line, bottom line, left line, and right line in the cropping region and the offset from the compression encoded frame region of the top line, bottom line, left line, and right line. In more detail, the cropping region is specified by setting a frame_cropping_flag to 1 and specifying the top, bottom, left, and right crop amounts respectively as a frame_crop_top_offset, frame_crop_bottom_offset, frame_crop_left_offset and frame_crop_right_offset.

Figure 9:
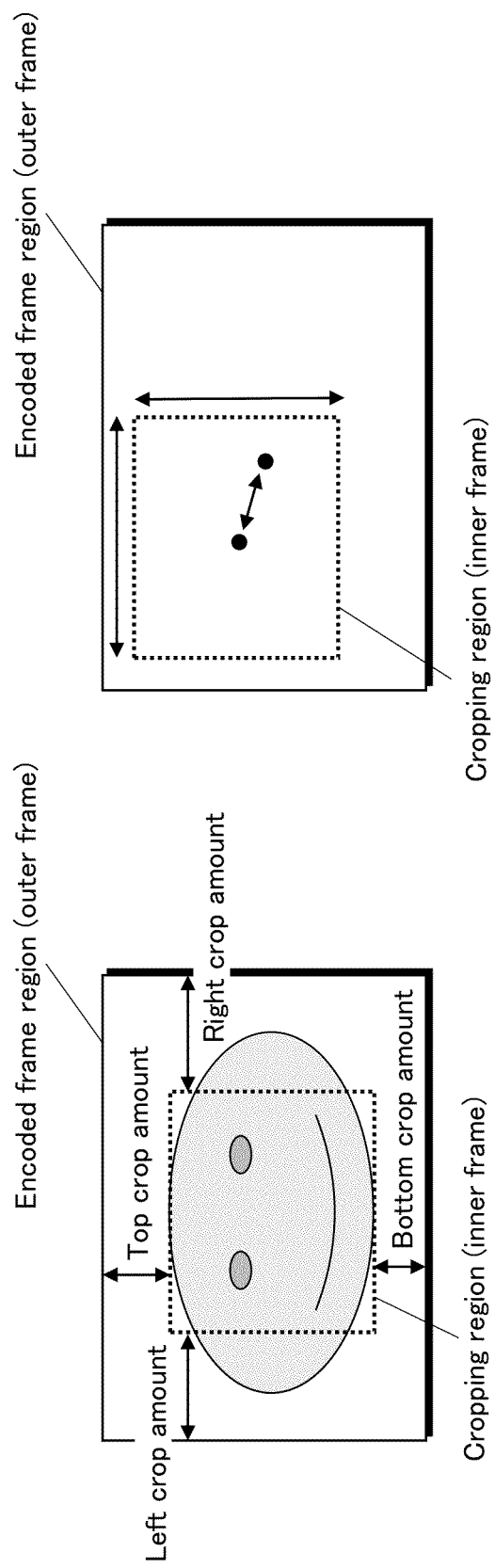
FIG. 9 illustrates a specific example of a method for designating the cropping region information and the scaling information.

In the case of MPEG-2, as shown to the right in FIG. 9, the cropping region is specified using the horizontal and vertical sizes of the cropping region (display_horizontal_size and display_vertical_size of sequence_display_extension) and information on the offset of the center of the cropping region from the center of the compression encoded frame region (frame_centre_horizontal_offset and frame_centre_vertical_offset of picture_display_extension). Furthermore, scaling information indicating a scaling method when a cropping region is actually displayed on the television or the like is set as an aspect ratio. The playback device uses the information on the aspect ratio to up-convert and display the cropping region. For example, in the case of MPEG-4 AVC, information on the aspect ratio (aspect_ratio_idc) is stored in the SPS as scaling information. For example, an aspect ratio 4:3 is specified to expand a 1440×1080 cropping region to 1920×1080 and then display the region. In this case, the region is horizontally up-converted by a factor of 4/3 (1440×4/3=1920) to be expanded to 1920×1080 and then displayed.

In the case of MPEG-2 as well, information on the aspect ratio (aspect_ratio_information) is stored in the attribute information referred to as the sequence_header. By appropriately setting a value of the attribute information, processing similar to the above processing is realized.

<Data Structure of Video Stream in MPEG-4 MVC Format>

Next, the video stream in the MPEG-4 MVC format is described.

Figure 15:
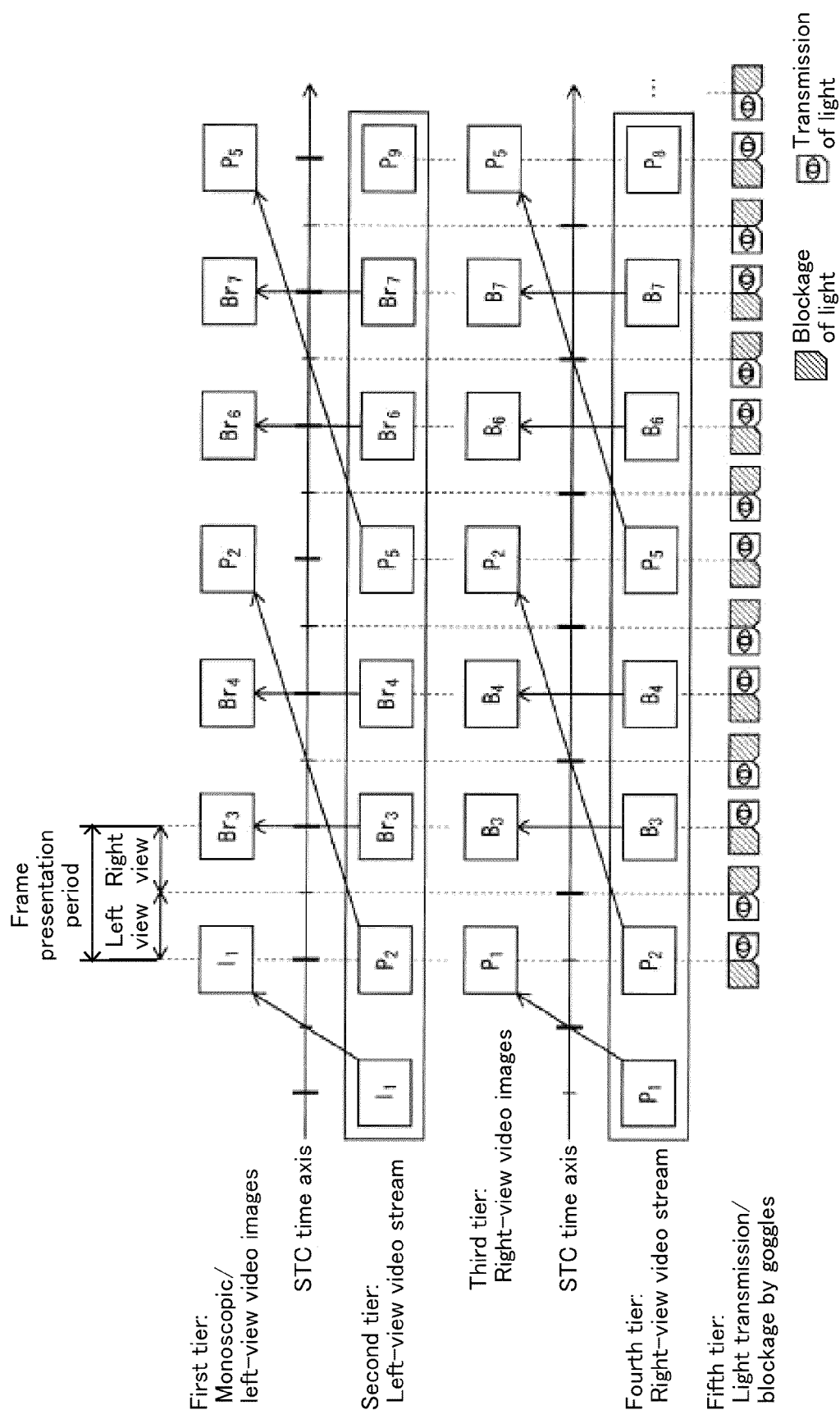
FIG. 15 illustrates an example of the internal structure of a video stream in the MPEG-4 MVC format.

FIG. 15 illustrates an example of the internal structure of the video stream in the MPEG-4 MVC format.

In FIG. 15, pictures in the right-view video stream are compression encoded with reference to pictures having the same presentation time in the left-view video stream. Pictures $P_1$ and $P_2$ in the right-view video stream respectively refer to pictures $I_I$ and $P_2$ in the left-view video stream. Pictures $B_3$, $B_4$, $B_6$, and $B_7$ in the right-view video stream respectively refer to pictures $Br_3$, $Br_4$, $Br_6$, and $Br_7$ in the left-view video stream.

The second tier in FIG. 15 shows the internal structure of the left-view video stream. The left-view video stream includes pictures $I_1$, $P_2$, $Br_3$, $Br_4$, $P_5$, $Br_6$, $Br_7$, and $P_9$. These pictures are decoded in accordance with the time set to the DTSs.

The first tier indicates left-view video images to be displayed on a display and the like. The left-view video images are displayed in accordance with the time set to the PTSs of the decoded pictures $I_1$, $P_2$, $Br_3$, $Br_4$, $P_5$, $Br_6$, $Br_7$, and $P_9$ in the second tier, i.e. in the order of $I_1$, $Br_3$, $Br_4$, $P_2$, $Br_6$, $Br_7$, and $P_5$.

The fourth tier in FIG. 15 shows the internal structure of the right-view video stream. The right-view video stream includes pictures $P_1$, $P_2$, $B_3$, $B_4$, $P_5$, $B_6$, $B_7$, and $P_8$. These pictures are decoded in accordance with the time set to the DTSs.

The third tier indicates right-view video images to be displayed on a display and the like. The right-view video images are displayed in accordance with the time set to the PTSs of the decoded pictures $P_1$, $P_2$, $B_3$, $B_4$, $P_5$, $B_6$, $B_7$, and $P_8$ in the fourth tier, i.e. in the order of $P_1$, $B_3$, $B_4$, $P_2$, $B_6$, $B_7$, and $P_5$. Presentation of one of the pair of a left-view video image and a right-view video image having the same PTS, however, is delayed by half of the interval between PTSs.

The fifth tier shows how the state of the 3D glasses 200 changes. As shown in the fifth tier, when a left-view video image is viewed, the shutter for the right eye closes, and vice-versa.

The following describes the relationship between access units in the base-view video stream and the dependent-view video stream.

Figure 17:
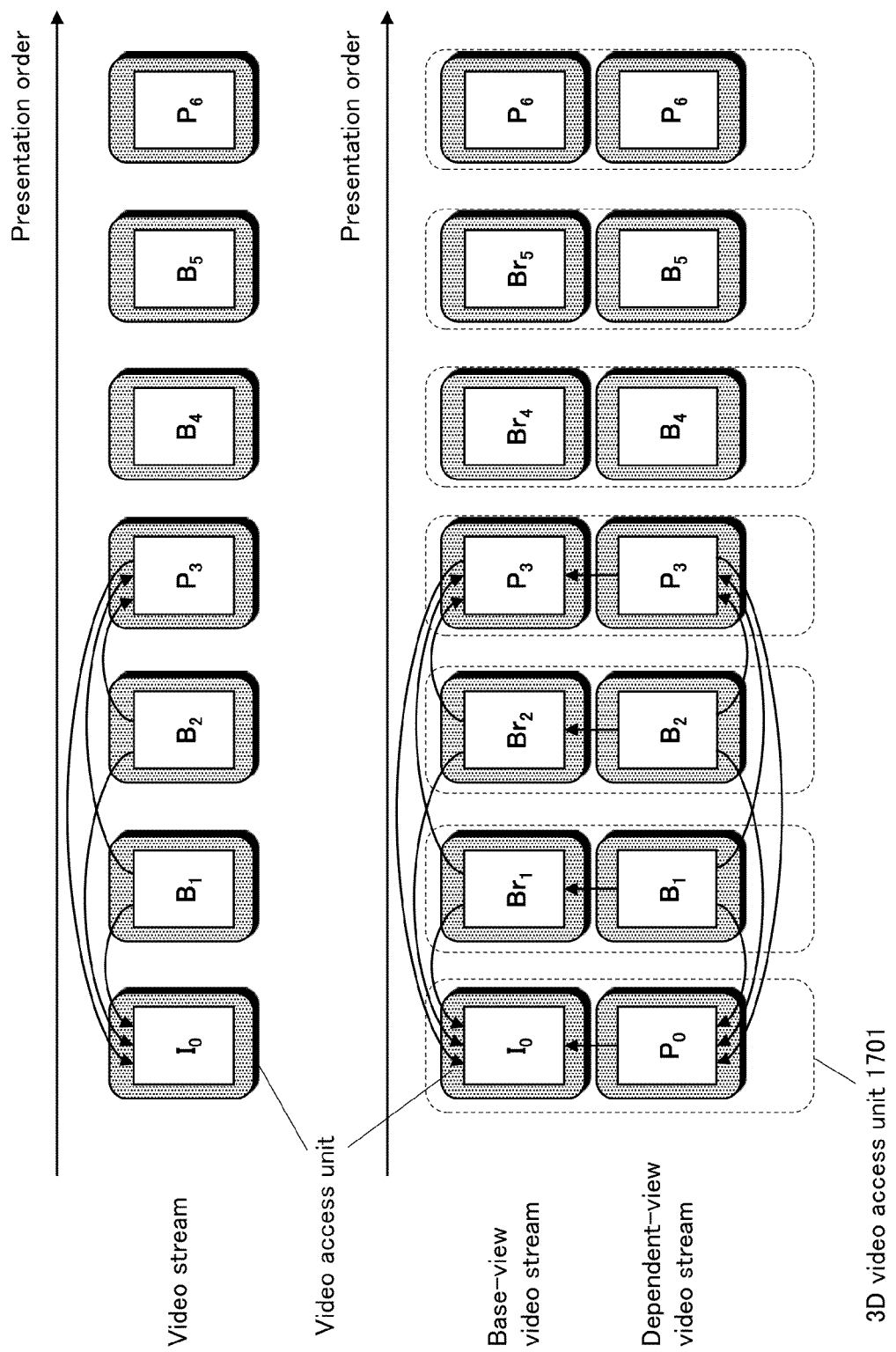
FIG. 17 illustrates the structure of a video access unit in each picture of a base-view video stream and each picture of a right-view image video stream.

FIG. 17 shows the structure of video access units for pictures in the base-view video stream and in the dependent-view video stream. As described above, the base-view video stream is configured such that one picture corresponds to one video access unit, as shown in the upper tier of FIG. 17.

Similarly, as shown in the lower tier of FIG. 17, the dependent-view video stream is configured such that one picture corresponds to one video access unit. The data structure differs, however, than that of the video access unit in the base-view video stream.

A video access unit in the base-view video stream and a video access unit in the dependent-view video stream with the same PTS constitute a 3D video access unit 1701. The playback device performs decoding of one 3D video access unit at a time.

Figure 18:
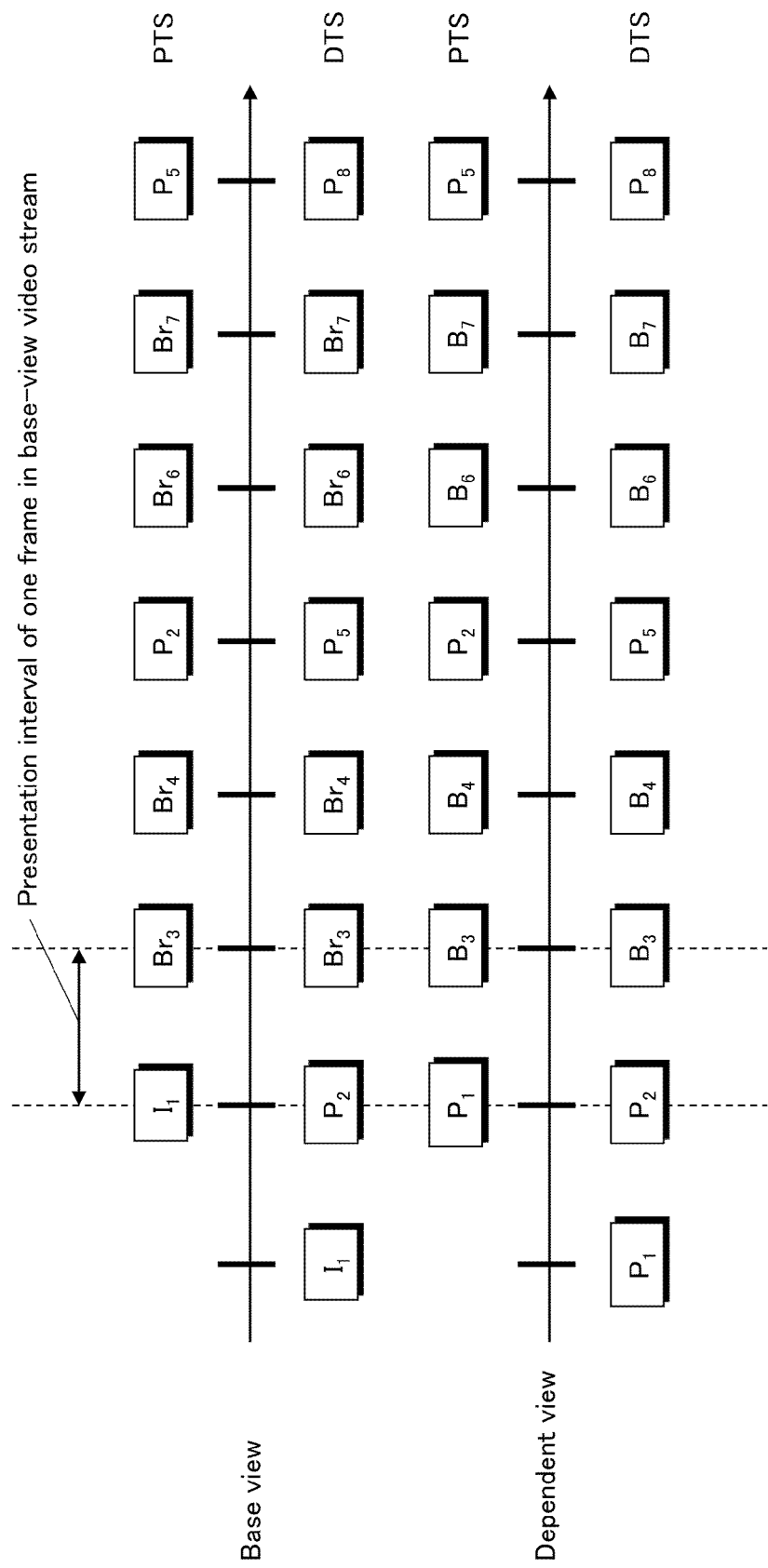
FIG. 18 illustrates relationships between a PTS and a DTS allocated to each video access unit in the base-view video stream and a dependent-view video stream.

FIG. 18 shows an example of the relationship between the PTS and the DTS allocated to each video access unit in the base-view video stream and the dependent-view video stream within the video stream.

A picture in the base-view video stream and a picture in the dependent-view video stream that store parallax images showing a view at the same presentation time are set to have the same DTS/PTS.

With this structure, the playback device that decodes pictures in the base-view video stream and pictures in the dependent-view video stream can decode and display one 3D video access unit at a time.

Figure 19:
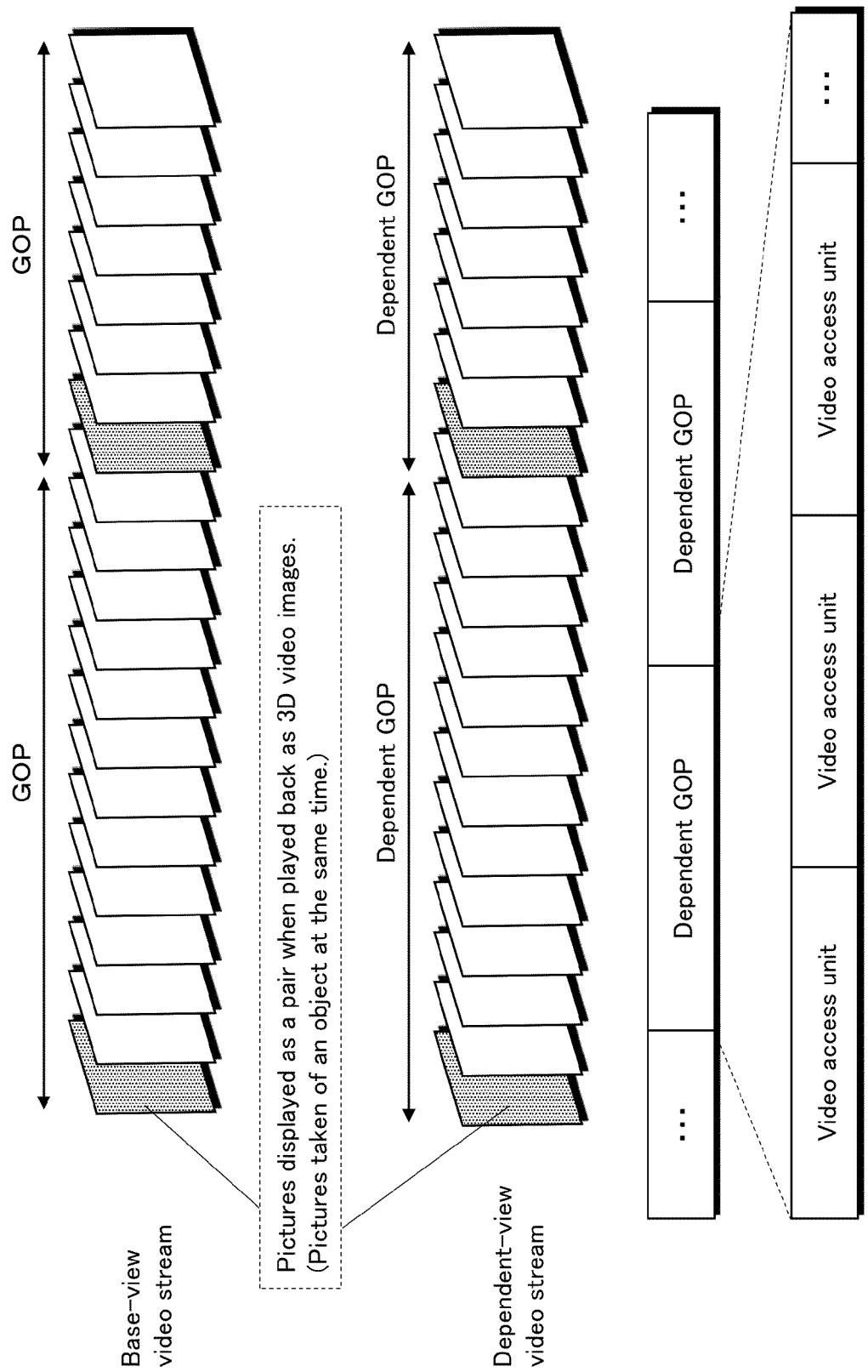
FIG. 19 illustrates the GOP structure of the base-view video stream and the dependent-view video stream.

FIG. 19 illustrates the GOP structure of the base-view video stream and the dependent-view video stream.

The GOP structure of the base-view video stream is the same as the structure of a conventional video stream and is composed of a plurality of video access units.

The dependent-view video stream is also composed of a plurality of dependent GOPs.

When playing back 3D video images, the top picture in a dependent GOP is the picture displayed as a pair with the I picture in the top GOP of the base-view video stream and has the same PTS as the PTS of the I picture in the top GOP of the base-view video stream.

FIG. 20 shows the data structures of video access units included in the dependent GOP.

As shown in FIG. 20, the compressed picture data stored in the video access unit at the top of a dependent GOP is data for a picture displayed at the same time as the I picture at the top of a GOP in the base-view video stream. The video access unit at the top of the dependent GOP always stores a sub-AU identification code, a sub-sequence header, a picture header, and compressed picture data. The video access unit at the top of the dependent GOP may also store supplementary data, padding data, a sequence end code, and a stream end code if necessary.

The sub-AU identification code is a starting code indicating the top of an access unit.

The sub-sequence header stores information that is shared across a playback sequence composed of a plurality of video access units, specifically information such as a resolution, a frame rate, an aspect ratio, a bit rate, and the like. The values for the frame rate, the resolution, and the aspect ratio in the sub-sequence header are the same as the frame rate, the resolution, and the aspect ratio of the sequence header included in the video access unit at the top of a GOP in the corresponding base-view video stream.

Video access units other than at the top of the GOP always store the sub-AU identification code and the compressed picture data. The video access units other than at the top of the GOP may store the supplementary data, the padding data, the sequence end code, and the stream end code.

INDUSTRIAL APPLICABILITY

The data creation device or the playback device for a video stream pertaining to the present invention can create or play back a stream corresponding to 3D video images with a reduced data amount while ensuring playback in a conventional playback device supporting a video stream in the MPEG-2 format, and is therefore useful for a device and the like for generating or playing back 3D video images.

REFERENCE SIGNS LIST 2601 data creation device
2602 2D compatible video encoder
2603 2D compatible video decoder
2604 extended multi-view video encoder
2605 base-view video encoder
2606 2D compatible video encoding information
2607 base-view video encoding information
2608 2D compatible video frame memory
2609 dependent-view video encoder
2610 multiplexer
2801 PID filter
2802 TB(1)
2803 MB(1)
2804 EB(1)
2805 D1 (2D compatible video compressed image decoder)
2806 O (Re-ordering Buffer)
2807 switch
2808 first plane
2809 TB(2)
2810 MB(2)
2811 EB(2)
2812 TB(3)
2813 MB(3)
2814 EB(3)
2815 decoding switch
2816 Inter-view buffer
2817 D2 (multi-view video compressed image decoder)
2818 DPB
2819 output plane switch
2820 second plane
2821 2D compatible video decoder
2822 extended multi-view video decoder
2823 playback device
2901 video decoder
2902 multi-view video decoder

The invention claimed is:

1. A data creation device that performs compression encoding on first frame images chronologically showing a view from a first viewpoint and second frame images chronologically showing a view from a second viewpoint, comprising:
a first encoding unit configured to generate a stream in a first encoding format by performing compression encoding on the first frame images;
a second encoding unit configured to generate a base-view video stream and a dependent-view video stream in a format conforming to a second encoding format using inter-view reference; and
a transmission unit configured to transmit the stream in the first encoding format, the base-view video stream, and the dependent-view video stream, wherein
the second encoding unit
generates, for use as the base-view video stream, a stream of dummy data having the same number of frames as the stream in the first encoding format, and
generates, for use as the dependent-view video stream, a stream obtained by performing compression encoding on each frame of the second frame images, with reference to a frame of the stream in the first encoding format to be presented at the same time as a frame of the base-view video stream corresponding to the frame of the second frame images.

2. The data creation device of claim 1, wherein
the stream of dummy data is generated by performing compression encoding on identical frame images.

3. The data creation device of claim 2, wherein
the identical frame images are of a single color.

4. The data creation device of claim 3, wherein the second encoding unit sets, as a value of a PTS (Presentation Time Stamp) of a picture constituting each frame of the dependent-view video stream, the same value as a PTS of a picture constituting a frame of the stream in the first encoding format to be presented at the same time as a frame of the base-view video stream corresponding to the frame of the dependent-view video stream.

5. The data creation device of claim 4, wherein
compression encoding on the first frame images and on the second frame images is performed with the same aspect ratio, and
attribute information showing the same aspect ratio is included in each of the stream in the first encoding format, the base-view video stream, and the dependent-view video stream.

6. The data creation device of claim 4, wherein
the second encoding unit sets, as a value of a DTS (Decoding Time Stamp) of a picture constituting each frame of the dependent-view video stream, a value indicating a time that is N frames (N is an integer satisfying N≥1) after a time indicated by a DTS of a picture constituting a frame of the stream in the first encoding format to be presented at the same time as a frame of the base-view video stream corresponding to the frame of the dependent-view video stream.

7. The data creation device of claim 4, wherein
the number of frames in each GOP (Group of Pictures) of each of the base-view video stream and the dependent-view video stream is equal to the number of frames in each GOP of the stream in the first encoding format including a frame to be presented at the same time as any of the frames in each GOP of each of the base-view video stream and the dependent-view video stream.

8. The data creation device of claim 4, wherein
when a type of a picture constituting a frame of the stream in the first encoding format is an I picture, a picture constituting a frame of the base-view video stream to be presented at the same time as the picture constituting the frame of the stream in the first encoding format is an I picture.

9. The data creation device of claim 1, wherein
the base-view video stream is generated at a bit rate lower than a bit rate at which the stream in the first encoding format is generated.

10. A playback device, comprising:
an unit configured to acquire, from the data creation device of claim 1, the stream in the first encoding format, the base-view video stream, and the dependent-view video stream;
a first decoding unit configured to acquire the first frame images by decoding the stream in the first encoding format;
a second decoding unit configured to acquire the second frame images by decoding the base-view video stream, and by decoding each frame of the dependent-view video stream with reference to a frame of the stream in the first encoding format to be presented at the same time as a frame of the base-view video stream corresponding to the frame of the dependent-view video stream; and
a playback unit configured to play back the acquired first frame images and second frame images.

11. The playback device of claim 10, wherein
each frame of the dependent-view video stream is decoded with reference to a frame of the stream in the first encoding format including a picture whose PTS (Presentation Time Stamp) has the same value as a PTS of a picture constituting a frame of the second frame images.

12. A data encoding method for performing compression encoding on first frame images chronologically showing a view from a first viewpoint and second frame images chronologically showing a view from a second viewpoint, comprising:
a first encoding step of generating a stream in a first encoding format by performing compression encoding on the first frame images;
a second encoding step of generating a base-view video stream and a dependent-view video stream in a format conforming to a second encoding format using inter-view reference; and
a transmission step of transmitting the stream in the first encoding format, the base-view video stream, and the dependent-view video stream, wherein
the second encoding step
generates, for use as the base-view video stream, a stream of dummy data having the same number of frames as the stream in the first encoding format, and
generates, for use as the dependent-view video stream, a stream obtained by performing compression encoding on each frame of the second frame images, with reference to a frame of the stream in the first encoding format to be presented at the same time as a frame of the base-view video stream corresponding to the frame of the second frame images.

13. A non-transitory computer-readable recording medium having recorded thereon a program for causing a data creation device to perform compression encoding on first frame images chronologically showing a view from a first viewpoint and second frame images chronologically showing a view from a second viewpoint, the program causing the data creation device to perform:
a first encoding step of generating a stream in a first encoding format by performing compression encoding on the first frame images;
a second encoding step of generating a base-view video stream and a dependent-view video stream in a format conforming to a second encoding format using inter-view reference; and
a transmission step of transmitting the stream in the first encoding format, the base-view video stream, and the dependent-view video stream, wherein
the second encoding step
generates, for use as the base-view video stream, a stream of dummy data having the same number of frames as the stream in the first encoding format, and
generates, for use as the dependent-view video stream, a stream obtained by performing compression encoding on each frame of the second frame images, with reference to a frame of the stream in the first encoding format to be presented at the same time as a frame of the base-view video stream corresponding to the frame of the second frame images.

14. An integrated circuit constituting a data creation device that performs compression encoding on first frame images chronologically showing a view from a first viewpoint and second frame images chronologically showing a view from a second viewpoint, comprising:
a first encoding unit configured to generate a stream in a first encoding format by performing compression encoding on the first frame images;
a second encoding unit configured to generate a base-view video stream and a dependent-view video stream in a format conforming to a second encoding format using inter-view reference; and
a transmission unit configured to transmit the stream in the first encoding format, the base-view video stream, and the dependent-view video stream, wherein
the second encoding unit
generates, for use as the base-view video stream, a stream of dummy data having the same number of frames as the stream in the first encoding format, and
generates, for use as the dependent-view video stream, a stream obtained by performing compression encoding on each frame of the second frame images, with reference to a frame of the stream in the first encoding format to be presented at the same time as a frame of the base-view video stream corresponding to the frame of the second frame images.

15. A playback method, comprising:
- an step of acquiring, from the data creation device of claim 1, the stream in the first encoding format, the base-view video stream, and the dependent-view video stream;
- a first decoding step of acquiring the first frame images by decoding the stream in the first encoding format;
- a second decoding step of acquiring the second frame images by decoding the base-view video stream, and by decoding each frame of the dependent-view video stream with reference to a frame of the stream in the first encoding format to be presented at the same time as a frame of the base-view video stream corresponding to the frame of the dependent-view video stream; and
- a playback step of playing back the acquired first frame images and second frame images.

16. A non-transitory computer-readable recording medium having recorded thereon a program for causing a playback device to play back the stream in the first encoding format, the base-view video stream, and the dependent-view video stream transmitted from the data creation device of claim 1, the program causing the playback device to perform:
- an acquisition step of acquiring the stream in the first encoding format, the base-view video stream, and the dependent-view video stream;
- a first decoding step of acquiring the first frame images by decoding the stream in the first encoding format;
- a second decoding step of acquiring the second frame images by decoding the base-view video stream, and by decoding each frame of the dependent-view video stream with reference to a frame of the stream in the first encoding format to be presented at the same time as a frame of the base-view video stream corresponding to the frame of the dependent-view video stream; and
- a playback step of playing back the acquired first frame images and second frame images.

17. An integrated circuit constituting a playback device that plays back the stream in the first encoding format, the base-view video stream, and the dependent-view video stream transmitted from the data creation device of claim 1, comprising:
- an acquisition unit configured to acquire the stream in the first encoding format, the base-view video stream, and the dependent-view video stream;
- a first decoding unit configured to acquire the first frame images by decoding the stream in the first encoding format;
- a second decoding unit configured to acquire the second frame images by decoding the base-view video stream, and by decoding each frame of the dependent-view video stream with reference to a frame of the stream in the first encoding format to be presented at the same time as a frame of the base-view video stream corresponding to the frame of the dependent-view video stream; and
- a playback unit configured to play back the acquired first frame images and second frame images.

* * * * *